(12) United States Patent
Gesang et al.

(10) Patent No.: US 12,291,188 B2
(45) Date of Patent: May 6, 2025

(54) FUEL-SAVING ROBOT SYSTEM FOR ACE HEAVY DUTY TRUCKS

(71) Applicants: LCB International Inc., Tortola (VG); Wangjie Gesang, Shanghai (CN); Wei Cha, Shanghai (CN)

(72) Inventors: Wangjie Gesang, Shanghai (CN); Wei Cha, Shanghai (CN)

(73) Assignees: LCB International Inc., Torola (VG); Wangjie Gesang, Shanghai (CN); Wei Cha, Shanghai (CN)

( * ) Notice: Subject to any disclaimer, the term of this patent is extended or adjusted under 35 U.S.C. 154(b) by 294 days.

(21) Appl. No.: 17/919,985

(22) PCT Filed: Apr. 4, 2021

(86) PCT No.: PCT/CN2021/087661
§ 371 (c)(1),
(2) Date: Oct. 19, 2022

(87) PCT Pub. No.: WO2021/213253
PCT Pub. Date: Oct. 28, 2021

(65) Prior Publication Data
US 2023/0303052 A1 Sep. 28, 2023

(30) Foreign Application Priority Data
Apr. 21, 2020 (CN) .......................... 202010315606.X

(51) Int. Cl.
*B60W 20/15* (2016.01)
*B60K 6/26* (2007.10)
(Continued)

(52) U.S. Cl.
CPC ............... *B60W 10/08* (2013.01); *B60K 6/26* (2013.01); *B60L 7/18* (2013.01); *B60W 10/06* (2013.01);
(Continued)

(58) Field of Classification Search
CPC ...... B60W 10/06; B60W 10/08; B60W 20/14; B60W 20/15; B60W 30/18;
(Continued)

(56) References Cited

U.S. PATENT DOCUMENTS

2003/0033074 A1 2/2003 Lippa et al.
2012/0277058 A1* 11/2012 Ishikawa ................. B60L 50/15
477/3

(Continued)

FOREIGN PATENT DOCUMENTS

| CN | 1994773 A | 7/2007 |
|---|---|---|
| CN | 103863087 A | 6/2014 |

(Continued)

OTHER PUBLICATIONS

International Search Report for PCT/CN2021/087661 dated Jul. 14, 2021 (5 pages).

*Primary Examiner* — Edwin A Young
(74) *Attorney, Agent, or Firm* — Hamilton, Brook, Smith & Reynolds, P.C.

(57) ABSTRACT

A Level IV fuel-saving robot system for ACE HDTs of the present disclosure focuses on the minimization of actual fuel consumption (L/100 km) for long-haul freight at first based on an electrical power split device (ePSD) and a mixed hybrid powertrain architecture. A basic model Level I fuel-saving robot realizes a longitudinal L1 automatic driving function through a predictive adaptive cruise (PACC) technology within an Operational Design Domain (ODD) for highways and reduces the actual fuel consumption of an ACE HDT by more than 20% compared with modern diesel HDTs, and the energy-saving and emission-reducing effect of the basic model Level I fuel-saving robot is decoupled from both the technical level of a vehicle engine and the driving level of a driver; an advanced Level IV fuel-saving robot has a L4 automatic driving function within the ODD (Continued)

for highways, operates in a "shadow mode" or "detached mode", automatically generates a discrepancy report or detachment report, completes the "3R" batch validation for an L4 system on a billion mile scale quickly with high cost effectiveness on the premise of ensuring the traffic safety of existing road users and reduces the total validation expense by more than 65% compared with the modern HDT with internal combustion engine equipped with the L4 system, promoting the early commercialization of the Level IV fuel-saving robot.

10 Claims, 2 Drawing Sheets

(51) Int. Cl.
  *B60L 7/18*   (2006.01)
  *B60W 10/06*  (2006.01)
  *B60W 10/08*  (2006.01)
  *B60W 20/14*  (2016.01)
  *B60W 30/18*  (2012.01)
  *B60W 50/00*  (2006.01)

(52) U.S. Cl.
  CPC .......... *B60W 20/14* (2016.01); *B60W 20/15* (2016.01); *B60W 30/18* (2013.01); *B60W 30/18127* (2013.01); *B60W 2050/0031* (2013.01); *B60W 2300/125* (2013.01)

(58) Field of Classification Search
  CPC .... B60W 2050/0031; B60W 2300/125; B60K 6/26; B60L 7/18
  See application file for complete search history.

(56) References Cited

U.S. PATENT DOCUMENTS

| | | | |
|---|---|---|---|
| 2012/0292917 A1* | 11/2012 | Nishikawa | H02P 9/02 290/1 A |
| 2015/0214782 A1* | 7/2015 | Alexander | H02J 9/061 307/22 |
| 2021/0078415 A1* | 3/2021 | Ohata | H02J 7/02 |

FOREIGN PATENT DOCUMENTS

| | | |
|---|---|---|
| CN | 107161140 A | 9/2017 |
| CN | 108394403 | 8/2018 |
| CN | 108973979 A | 12/2018 |
| CN | 109823188 A | 5/2019 |
| CN | 111746259 A | 10/2020 |
| JP | 2008049829 A | 3/2008 |
| JP | 2016-199151 A | 12/2016 |

* cited by examiner

FUEL-SAVING ROBOT SYSTEM FOR ACE HEAVY DUTY TRUCKS

This application is the U.S. National Stage of International Application No. PCT/CN2021/087661, filed Apr. 16, 2021, which designates the U.S., published in Chinese, and claims priority under 35 U.S.C. § 119 or 365(c) to Chinese Application No. 202010315606.X, filed Apr. 21, 2020. The entire teachings of the above applications are incorporated herein by reference.

FIELD

The fuel-saving robot system for ACE heavy-duty trucks (HDTs) of the present disclosure realizes a software-defined fully digital powertrain based on a double-motor mixed hybrid powerttain architecture; it is possible to dynamically regulate and control the transmission path, direction and amplitude of hundred-kilowatt-level mechanical power flow or electric power flow between vehicle-mounted electromechanical power subsystems through a vehicle-loud collaborative machine learning (ML) algorithm or software over-the-air (OTA) to meet a vehicle dynamics equation in real time, continuously improve the existing functions of the vehicle or add new functions, and achieve simultaneous optimization of multiple beneficial effects, such as vehicle power performance, fuel consumption (L/100 km), exhaust emission under the RDE meeting the standard stably, and active safety. The basis function of the L1 fuel-saving robot for ACE HDTs is the SAE L1 longitudinal automatic driving function within an Operational Design Domain (ODD) for highways, and the problem of energy management optimization of ACE HDTs can be transformed into an equivalent narrow AI problem Computer Go based on predictive adaptive cruise control (PACC); the actual energy-saving and emission-reducing effect of the HDT is basically decoupled from the performance of a ACE HDT engine or the driving level of a driver and defeats human drivers, and the actual fuel consumption of the ACE HDT is reduced by more than 25% compared with the modern HDT with an internal combustion engine; an advanced function of the Level IV fuel-saving robot includes operation in an L2 "shadow mode" or L3 "disengagement mode", the Level IV fuel-saving robot automatically generates a "discrepancy report" or "detachment report" through a real-time comparison between drive-by-wire signals from the driver and the Level IV fuel-saving robot respectively to vehicle movement, completes the "3R" batch validation on a ten billion mile scale within the ODD for highways with high cost effectiveness, and the actual total validation expense can be reduced by more than 80% compared with that for the modern HDT with an internal combustion engine equipped with the L4 system; it is statistically proved with high confidence that the level IV fuel-saving robot is safer and more reliable than driving by human drivers, promoting the timely commercialization of the Level IV fuel-saving robot.

BACKGROUND

Road logistics is crucial to all major economics in the world. Long haul logistics (with average daily driving of more than 500 km; more than 80% of the driving mileage for closed highways) heavy-duty trucks (HDTs) are both the backbone of the road freight industry and the major fuel consumers and polluters in the transportation field. They are one of the focuses of energy-saving and emission reduction supervision and rectification for governments in the world throughout the year. At present, the mandatory regulations of Europe and America on emissions from large commercial vehicles (with a gross weight of more than 15 tons) including long-haul HDTs ("HDTs" for short) have turned from the Euro VI standard (fully implemented in Europe from 2014) focusing on reducing exhaust pollutant emissions and EPA-2010 (fully implemented in America from 2010) to a series of new emission regulations focusing on reducing various carbon emissions of greenhouse gas (GHG) dominated by carbon dioxide ($CO_2$) in exhaust. The carbon emission ($CO_2$ g/km) of the vehicle is proportional to the fuel consumption (L/100 km) of the vehicle, and reducing fuel consumption (or improving fuel economy MPG; in mile/gallon) is equivalent to reducing carbon emissions.

The regulations on greenhouse gas from medium duty/heavy duty engines and commercial vehicles (GHG Phase II) issued by the American Federal Government in 2016 explicitly specify the detailed mandatory standards for vehicle fuel economy (FE, mile/gallon) of all new medium duty/heavy duty engines and commercial vehicles sold in America is improved year by year and the fuel consumption (FC, L/100 km) and carbon emissions (g/km) are reduced from 2021 to 2027 on the premise of maintaining the emission limits for exhaust pollutants in EPA-2010 unchanged. In early 2019, the European Union approved the first mandatory regulations on carbon emissions from HDTs (i.e., Euro VII) in its history. The regulations require that the carbon emissions (g $CO_2$/km) from new HDTs in Europe will be reduced by 15% by 2025 and the carbon emissions from new HDTs will be reduced by 30% by 2030 with diesel HDTs in 2019 as a benchmark on the premise of maintaining the emission limits for exhaust pollutants in Euro VI unchanged. China began to implement the China V mandatory regulations on emissions from large commercial vehicles nationwide from 2017, and implemented the China VI mandatory regulations on emissions nationwide from July 2021. The China VI vehicle emission standards are basically the same as Euro VI and EPA-2010 in the aspect of limits for emissions of exhaust pollutants, and some limits are even more strict.

Emission regulations are the main driving force of vehicle powertrain technology development all over the world. The powertrain of HDTs that meet the China VI vehicle emission standards will be at the same technical platform level as that of North America and Europe for the first tune in history. Based on the historical experience in the past 20 years that all the regulations China I to VI are formulated and promulgated by reference to regulations Euro I to VI, it is expected that China will follow the EU and quickly introduce the China VII regulations focusing on carbon emission intensity and fuel consumption of HDTs. Obviously, alter 2020, the mandatory emission regulations and industry focus of China, America and European Union as the three major HDT markets in the world will be turned to reduction of fuel consumption and carbon emissions from HDTs year by year from continued reduction of exhaust pollutant emissions from HDs. The average fuel cost of a HDT for long-haul freight is approximately USD 60K per year in Europe and America, and up to RMB 400K per year in China. The total fuel cost of more than 2 million HDTs in America is more than USD 100 billion per year, and the total fuel cost of more than 4 million HDTs in China is more than RMB 1 trillion per year. The fuel consumption and emissions of the HDTs are reduced through technical innovation, which is of great significance to OEMs, drivers, fleets, shippers, governments, societies and other stake-holders.

America has always been in the forefront of the world in terms of the formulation of regulations on emissions and fuel consumption of HDTs as well as technology research and development. The USA Department of Energy (DOE) led and funded the SuperTruck 1 (2011-2016) project totaling USD 100 million, and all the four super HDT prototypes created by four technical teams led by top four major HDT OEMs in America through live years of research and development overfulfilled the goals of improving the fuel economy (gallon/ton-mile) by 50% for freight HDTs compared with 2009 and the brake thermal efficiency (BTE) of 50% for diesel engines by the end of 2016. From 2017 to 2022, The USA Department of Energy funded live technical teams with another USD 80 million to implement the SuperTruck II project, and the five prototypes are expected to achieve the goals of brake thermal efficiency (BTE) of 55% for diesel engines and improvement in fuel economy (gallon/ton-mile) by 100% for freight HDTs in 2022. For each technical team led by the HUT OEMs, the total resource inputs of the enterprises are higher than the funded capital they receive from the American Government. The SuperTruck I&II in the USA took a total of a decade (2011-2022), with a total cost of more than USD 400 million, and the technical route and R&D achievements of nine prototypes represent the top technical level of the HDT industry in the world today.

The SuperTruck project in the USA integrates various HDT energy-saving and emission-reducing technologies that the HDT industry in North American believes may be mass-produced and put into commercial use by 2025. The main challenge in the future is how to improve the comprehensive cost effectiveness of the producibility of various energy-saving technologies and accelerate the pace of commercialization. At present, the medium and long-term challenges in the U.S. HDT industry are how to achieve the mandatory requirements for 2027 HDT fuel consumption of GHG PhaseII on the premise of controlling the price rise of new HDTs effectively. It is worth noting that none of the above nine technical teams adopts the technical route of full hybrid HDTs. All the stake-holder of the HDT industry in China need to face the severe test that the retail prices of new HDTs meeting the requirements of the Limits and Measurement Methods for Emissions from Light-duty Vehicles (China VI) mass-produced and sold from 2020 are estimated to rise greatly compared with the selling price of current HDTs meeting the requirements of the Limits and Measurement Methods for Emissions from Light-duty Vehicles (China V).

In last decade, in the world's major automobile markets, especially the world's largest Chinese automobile market, there are successful cases of mass commercial use of electric or hybrid passenger vehicles and large buses heavily subsidized by the government. However, on the Chinese/American/European Union's markets of the largest, most technologically advanced HDT for long-haul freight, domestic and foreign industry experts agreed that the mass commercial use of electric HDTs or Full Hybrid Trucks for long-haul freight cannot be achieved without subsidies before 2030 due to limitations of industrializable power battery technologies and performance limits. For details, refer to the following European and American unclassified industry research reports: 1) Ricardo (2017). "Heavy Duty Vehicle Technology Potential and Cost Study", Final Report for ICCI; 2) "European Heavy-Duty Vehicles: a white paper "European Heavy-Duty Vehicles: Cost Effectiveness of Fuel-Efficiency Technologies for Long-Haul Tractor-Trailers in the 2025-2030 Timeframe" published by Oscar Delgado and other experts of the International Council on Clean Transportation (ICCT) in January 2018; 3) an academic report "HDV Fuel Efficiency Technologies" published by Dr. Felipe Rodriguez from ICCT on Jun. 28, 2018; 4) a report "Adoption of New Fuel Efficient Technologies from SuperTruck" presented by the USA Department of Energy to the USA Congress in June 2016. 5) an investigation report "Viable Class 7/8 Electric, Hybrid and Alternative Fuel Tractors", North American Council for Freight Efficiency. December 2019.

The actual fuel consumption (L/100 km) of a hybrid vehicle is highly related to its driving conditions. Vehicles under urban conditions have low average speed and frequent active acceleration, deceleration or braking; vehicles under high-speed conditions have high average speed and infrequent active acceleration, deceleration or braking. Hybrid vehicles recover energy mainly through regenerative braking of the driving motors to achieve the beneficial effects of energy saving and emission seduction. The global automotive industrial and academic circles have the following "consensus" on the fuel saving potential of hybrid vehicles (light vehicles and large commercial vehicles) for a long time: hybrid vehicles have a more obvious fuel saving effect than traditional fuel vehicles under urban conditions, and the overall fuel consumption can be reduced by more than 30%; however, the engine can work stably in its high efficiency zone under full high speed conditions (average speed is above 60 km/h; active acceleration or braking deceleration is infrequent), hybrid vehicles have a less obvious fuel saving elect than traditional fuel vehicles, and it is impossible to reduce the overall fuel consumption by more than 10%; especially, series hybrid vehicles have a fuel saving effect not as good as that of parallel hybrid vehicles under high-speed conditions and may even consume more fuel than traditional fuel vehicles because multiple energy conversion runs are required for the power generation drive of the engine.

Diesel engines account for more than 95% of the engines of commercial HDTs that have been mass-produced in the world; the diesel engines of HDTs can stably work in their high efficiency combustion area under high-speed conditions, after decades of continuous improvements, the fuel saving benefits decrease progressively, the technical challenge of further reducing the fuel consumption and emissions of traditional diesel engines is growing, and the increase in cost also reaches a higher level; in the past 25 years, the annual decline in average fuel consumption (L/100 km) was less than 1.5% for the industry of HDTs for long-haul freight in America. Europe and China; for HDT manufacturers in Europe and America or China, year-by-year obvious reduction of actual combined fuel consumption (L/100 km) of HDTs for long-haul freight with market-recognized high cost effectiveness poses great technical and commercial challenges. Refer to the position paper "The European Commission Proposal on $CO_2$ Standards for New Heavy-Duty Vehicles" of Association des Constructeurs Européens d'Automobiles (ACEA) on EU Euro VII emission standard legislation for HDTs in August 2018. ACEA believes that the EU's Euro VII carbon emission standard to be approved, which aims to reduce fuel consumption by 15% in 2025 and 30% in 2030, is too radical, the development of the new HDT powertrain takes a long time, there is no available cost-effective technical route that enables timely mass production to achieve the objectives of the EU fuel-saving regulation in 2025, which shows that further reduction in the fuel consumption of modern HDTs by double-digit percentage points is extremely challenging technically and commercially. Obviously, any fuel-saving technology has the dual benefits of reducing vehicle exhaust pollutant emissions and greenhouse gas (or carbon) emissions.

In addition to the two constant challenges of energy saving and emission reduction, active driving safety is also the most important for HDTs for long-haul freight. The vast majority (90%+) of traffic accidents on roads are originated from distraction to drivers, fatigue driving, operation errors and other human factors. In recent years, the popular automatic driving technology worldwide, especially SAE L3/L4 automatic driving technology, aims to replace human drivers with artificial intelligence (AI) drivers, eliminate human factors, and greatly improve the active safety of vehicles. Experts in the scientific and technological circles and the automotive industry believe that the HDT for long-haul freight equipped with the L3/L4 autonomous driving system is one of the key points for the implementation and commercialization of automatic driving technology as soon as possible within an Operational Design Domain (ODD) for highways; L3/L4 automatic driving commercial vehicles must be configured with redundant power systems, braking systems, steering systems, power supplies and the like in order to meet the functional safety level requirements of vehicles as specified in ISO 26262.

A highly automated vehicle (HAV) refers to a vehicle equipped with SAE L3/L4/L5 autonomous driving system. Over the past live years, players front traditional OEMs/component suppliers, technology giants, start-ups, transportation operators and the like have invested tens of billions of dollars to develop and test the HAV worldwide. The commercialization of the HAV in batches will have a huge and far-reaching impact on the global passenger vehicle industry and road freight industry at a trillion-dollar level. The greatest selling point of the HAV is to significantly reduce the road traffic accident rate and improve the active driving safety by partially or completely replacing human drivers with AI drivers. Industry experts universally acknowledge that the HDT for long-haul freight is one of the core scenarios for commercialization of the HAV; the HAV has completed the hatch validation "3R" tests (Real Vehicle, Real Road, Real Payload) on a billion mile scale on national highways, which proves with high confidence in a statistical sense that AI drivers are safer than human drivers, which is the only route which must be passed before the commercialization of the HAV, the HAV on open roads could bring additional traffic risks to other road users, and such a risk can be defined as the product of traffic accident severity and accident incidence; both subjective and objective risks of testing on HAV HDTs within an Operational Design Domain (ODD) for highways are greater than those of testing on HAV passenger vehicles since the shape and weight of HDTs are one order of magnitude greater than those of passenger vehicles; more than 95% of the vehicles (light or medium-sized vehicles) running on the highways are Vulnerable Road Users compared with HAV HDTs. Currently, governments around the world, represented by the USA and China, have vigorously promoted the research and development of HAVs and have revised the current traffic laws and regulations in succession, allowing 3R Tests (Real Vehicle. Real Road. Real Payload) to be performed on HAV passenger vehicles configured with a Safety Driver on public roads, and commercial trial operation of HAV taxis is even allowed within a specific Operational Design Domain (ODD) in California, Nevada, Arizona and the like; however, with regard to the 3R Tests of HAV HDTs on highways, governments of various countries are very cautious about approving the 3R Tests of HAV HDTs on public roads because both subjective and objective traffic risks of HAV HDTs running at high speed are much greater than those of HAV passenger vehicles for existing road users; as of March, 2020, all countries in the world have expressly prohibited the L3 or L4 3R Tests on HAV HDTs for long-haul freight on highways across the country, which has made the commercialization of HAV HDTs fall into the paradoxical dilemma of "chicken or egg first". How to complete the 3R road tests of HAV HDTs within the ODD for highways without increasing the traffic risk for the existing road users, accumulate the 3R batch validation data at the level of one billion miles to ten billion miles and prove with high statistical confidence that AI drivers are safer and more reliable than human drivers is a worldwide technical and commercial difficult problem that must be solved before the commercialization of HAV HDTs. However, no effective technical solution to the above problem has been found in the world. The global HAV leader Waymo completed nearly 20 million miles of 3R Tests of HAV passenger vehicles (with a total weight of less than 3.5 tons) on suburban roads (including highways) and 10 billion mile-level computer simulation "3V Tests" (Virtual Vehicle, Virtual Road, Virtual Payload) in America from 2010 to the end of 2019. However, the accumulated mileage of 3R Tests of HAV HDTs for long-haul freight from Waymo up to now is far less than one million miles, one of the main reasons is the legal barrier (i.e., AI drivers have no "right of way") for the 3R Tests of HAV HDTs, and the other is the extremely high expense for the 3R Tests of HAV HDTs; HDT drivers must hold a Commercial Driver's License (CDL), accounting fit less than 3% of all drivers, and the labor cost of HDT drivers is significantly higher than that of ordinary drivers; the fuel consumption of HDTs is more than 30 L/100 km, while the fuel consumption of passenger vehicles with internal-combustion engines, especially hybrid passenger vehicles, is less than 10 L/100 km; thus, the variable cost per unit (mainly refers to the costs for the driver and fuel) for the 3R Tests of HAV HDTs exceeds USD 1/mile, which is nearly 200% higher than that of HAV passenger vehicles; moreover, data of the 3R Tests of HDTs and that of passenger vehicles are not interchangeable for their L4 AI drivers as compared with the vast majority of passenger vehicle drivers who are incapable of driving HDTs. In other words, a lot of 3R Tests data or commercial operation data of HAV passenger vehicles have little reference value for the batch validation and commercialization of HAV HDTs.

Optimization of energy saving, emission reduction and active safety of complete vehicles are the three ultimate goals that the global automotive industry has been pursuing for a long time on the premise of ensuring the power performance of complete vehicles; over the past two decades, mainstream HDT OEMs and related research institutions in Europe and America have invested a lot of human and material resources to actively explore and develop a variety of fuel-saving technologies for HDTs, and by the end of 2019, none of the mainstream HDT OEMs and primary supplies in Europe and America had disclosed a new technical route or solution for the full hybrid HDT powertrain that could meet the 2025 carbon emission target value of the Euro VII regulation or the 2027 carbon emission target value of the USA GHG-II regulation and could be industrialized timely.

The information in this Background section is only intended to increase the understanding of the general technical background of the present invention, and should not be deemed to recognize or imply in any form that the information has become the prior art well known to those of ordinary skill in the art.

Invention Specification

The present invention provides a new class of HDT fuel-saving robot system for long-haul freight, which is a non-humanoid intelligent industrial robot capable of autonomous learning and evolution intended to solve the worldwide problem that it is difficult to find a technical route for high cost effectiveness HDT powerttain allowing mass production and commercialization, which meets the 2025 carbon emission target of the new Euro VII regulation for emissions and the 2027 carbon emission target of the American greenhouse gas Phase II (GHG-II) regulation due to slow improvement in fuel consumption (annual decline is less than 1.5% on average) of the new diesel HDT year by year in the prior art. In the application scenarios of long-haul freight, the overall fuel consumption (L/100 km) of an Automated Connected Electrified (ACE) HDT with fuel-saving robot under the real driving environment (RDE) can be reduced by more than 25% on the premise of ensuring the power performance and rate of attendance of the vehicle compared with the modem HDT with diesel engine. In addition, the active safety of vehicle driving can also be improved, and it can ensure that the exhaust emission under the RDE meets the standard stably within 700,000 km. All the main subsystems of the fuel saving robot of the ACE HDT in this disclosure have been industrialized, which can realize mass production and commercial application in 2023 and meet the 2025 carbon emission target of the Euro VII regulation or the 2027 carbon emission target of the American greenhouse gas Phase II (GHG-II) regulation in advance without relying on any products or technologies that are not mature or cannot be mass-produced in the near future. This will be described in detail later.

The fuel-saving robot of ACE HDT of the present invention can be divided into five levels; an ACE1 HDT refers to an ACE HDT equipped with SAE L1 autonomous driving system (hereinafter referred to as L1 system), which has the function of one-dimensional longitudinal control-predictive adaptive cruise control (PACC) and focuses on optimization of the actual fuel consumption and emission of HDTs for long-haul freight, and this fuel-saving robot is a basic type fuel-saving robot, i.e., Level I fuel-saving robot; all the following four types are upgraded versions of the Level I fuel-saving robot, and each advanced fuel-saving robot is downward compatible with all functions and properties related to energy saving and emission reduction or active driving safety of ACE HDTs; an ACE2 HDT refers to a HDT equipped with L2 system, i.e., Level II fuel-saving robot; an ACE3 HDT refers to a HDT equipped with L3 system, i.e., Level III fuel-saving robot; an ACE4 HDT refers to a HDT equipped with L4 system, i.e., Level IV fuel-saving robot; an ACE5 HDT refers to a HDT equipped with L5 system, i.e., Level V fuel-saving robot. The L5 system must rely on a general artificial intelligence (GAI) technology that will appear in the future, and it is extremely difficult to industrialize before 2030; firstly, the present invention focuses on the technical solution to achieve the optimization of energy saving and emission reduction of ACE HDTs in the application scenarios of long-haul freight on the premise of ensuring the power performance of complete vehicles; secondly, the present invention focuses on the technical solution of completing the 3R batch validation of Level IV fuel-saving robot (i.e., L4 system) of the ACE HDT with high cost effectiveness within the ODD for highways nationwide on the premise of ensuring the traffic safety of existing road users. Unless explicitly marked, the ACE HDT can represent any of the live types of HDTs from ACE1 to ACE5; the fuel-saving robot of HDT can refer to any of Level I to Level V fuel-saving robots; the advanced driver assistance system (ADAS) refers to the L1 or L2 system. When the technical solution of the present invention is described, it focuses on the Level II fuel-saving robot or Level IV fuel-saving robot, and the Level I fuel-saving robot or Level III fuel-saving robot can be regarded as a separate simplified special ease of the above two robots.

In order to solve the above technical problems and achieve the above beneficial technical effects, the present invention is realized through the following technical solution.

The energy of current various hybrid passenger vehicles or large commercial vehicles is effectively recovered by restricting the engine to operate at the high efficiency zone and regenerative braking of a driving motor to charge the battery pack under the urban or suburban conditions where the vehicles need to actively accelerate and apply brakes frequently at the average speed less than 40 km/h, which greatly reduces the overall fuel consumption (L/100 km) (with a fuel saving ratio up to 30%-60%) compared with traditional engine vehicles, with obvious energy saving and emission reduction effects and high cost effectiveness, thus having achieved the mass commercial use of the hybrid vehicles in the world's major automotive markets. However, with regard to HDTs for long-haul freight, most of the run time and mileage (over 85%) within their product life cycles are under highway conditions, with few active acceleration or braking; the highway networks in economically developed regions in China are congested throughout the year, the average speed of HDTs for long-haul freight is about 60 km/h, while the average speed of HDTs for long-haul freight in America is about 95 km/h. The engines of traditional diesel HDTs with few active acceleration or braking stably work at the high efficiency zone under the expressway conditions, with optimized overall fuel consumption and limited further improvement space; while the regenerative braking energy recovery function of the hybrid vehicles is useless due to infrequent active braking of the vehicles; in addition, the hybrid vehicles, especially range-extended series hybrid vehicles, have additional loss due to multiple energy conversions among chemical energy, mechanical energy, electric energy and mechanical energy, so there has been a "consensus" among experts and ordinary technicians in the global automobile and road transportation industry for a long time that the drop of the overall fuel consumption of hybrid HDs for long-haul freight (hereinafter referred to as "hybrid HDTs") is limited compared with the traditional diesel HDTs, it is unlikely that the largest fuel saving rate exceeds 10%, especially series hybrid vehicles which may even have slightly increased overall fuel consumption when running under high-speed conditions. According to the technical level and industrial development status of the current three major powers (battery, motor and electronic control) in the world, compared with traditional diesel HDTs, the vehicle purchasing cost growth of hybrid HDTs is obvious. If the fuel saving ratio cannot exceed 20%, the cost effectiveness of the hybrid HDTs will be low (for example, the return on investment (ROI) of making up the comprehensive cost difference between hybrid HDTs and traditional fuel HDTs by saving fuel cost is longer than three years) without government subsidies, and the sustainable market competitiveness is insufficient.

As described above, experts and ordinary technicians in the global HDT industry agree that it is difficult to achieve the mass commercial use of the hybrid HDTs fir long-haul freight without government subsidies in the three major HDT markets, including China, America and Europe, before 2030. In addition, subject to the technical limits of today's automotive power lithium batteries and the limitations of industrial development, electric HDTs for long-haul freight need to be equipped with a battery pack with an effective capacity of at least 100) kWh, and the battery pack is too large, too heavy, too expensive and cannot be quickly charged (sub-hour level); it is difficult to be commercialized in batches before 2030 without high government subsidies. Hydrogen-electric hybrid HDTs with hydrogen fuel cells as low carbon clean range extenders cannot be commercially available until 2030 due to the restrictions of technology, industrial chain, immaturity and high cost of hydrogen production/hydrogenation infrastructures and other factors. In other words, significantly different from the rapid growth of the market share of pure electric passenger vehicles, the HDTs for long-haul freight will continue to use internal combustion engines, especially diesel engines, as the core power source assisted by hybrid in the next 20 years.

The highway freight industry in Europe and America faces another major challenge that the vacancy rate of HDT drivers and turnover rates are high throughout the year. For the same HDTs, loads and road sections, drivers with different levels can result in the actual overall fuel consumption (L/100 km) difference up to 20%; the actual fuel consumption of HDTs for long-haul freight varies from person to person, the daily management and training of drivers occupy fleet management resources and are inefficient, which is another major shortcoming of the highway logistics industry. Lots of freight transport companies reduce the difference between the actual fuel consumption and the optimal fuel consumption caused by human factors of drivers though various methods, such as driver training, fuel-efficient rewards and punishments, installation of onboard sensors, big data analysis of driver's driving behavior and fuel saving guidance; however, the above methods can solve the symptoms but not the root causes. For most fleets of long-haul freight, the actual fuel consumption of HDTs varies from person to person with high dispersion is always a major shortcoming in the industry.

The cost effectiveness of ACE HDTs for long-haul freight must be greatly improved in order to compete and win with the traditional fuel HDTs in a sustainable manner without government subsidies and realize large-scale commercial use as soon as possible. The average selling price (retail price USD 150,000/vehicle or RMB 400,000/vehicle) of a complete HDT for long-haul freight is live to eight times the price of a common passenger vehicle in the market of America or China, but the annual fuel cost of the HDT for long-haul freight is more than 30 times the annual fuel cost of a family passenger vehicle. The retail price of gasoline or diesel in America and China is obviously lower than the retail price of the gasoline or diesel in Europe, and the proportion of the price of passenger vehicles to HDTs and the annual fuel expense in Europe is similar to that in China and America. Iwo effective methods for improving the cost effectiveness of the hybrid diesel HDTs for long-haul freight are provided, one is to increase the fuel saving ratio compared with that of traditional diesel vehicles, and the other is to reduce the price difference between the sum of the one-time purchase cost and the accumulated vehicle operation and maintenance cost of the hybrid diesel HDTs and that of the traditional diesel vehicles (i.e., Total Ownership Cost, TOC), i.e., to broaden sources of income and reduce expenditure. The saved fuel cost can be directly converted into the profit of the fleet on the premise of ensuring the power, safety and rate of attendance of the ACE HDTs.

Based on the objective fact that the actual fuel saving effect of most hybrid passenger vehicles (with gross weight of less than 3.5 tons, series, parallel, or mixed hybrid system architecture) is not obvious under high-speed conditions, global automobile industry experts (especially HDT industry experts) make their subjective extensional speculation and conclude that the actual overall fuel saving ratio of hybrid HDTs for long-haul freight, in particular the series hybrid HDTs, cannot be higher than 10%, and there may even be a slight increase in fuel consumption. So far (end of 2019), no public report or academic paper on comparative analysis of the fuel consumption of Full Hybrid Truck (especially dual-motor extended-range series or mixed hybrid HDTs) vs. traditional diesel HDTs after large-scale road tests of "3R" (Real Vehicle, Real Road, Real Payload) in the application scenario of tong-haul freight has been found worldwide, not to mention any precedent for commercial use in batches. However, the above industry consensus, like the so-called "White Swan consensus", has its historical limitations and can be falsified through scientific experiments; the industry experts ignore the secret source for possibly reducing the actual fuel consumption of the hybrid HDTs fir long-haul freight greatly, that is the time-varying function $P_z(t)$ of grade power with amplitude of hundreds of kilowatts caused by small changes (1.0 degree) of the road longitudinal slope tilt ("longitudinal slope" for short) and many opportunities to recover kilowatt hour (kWh) electric energy through regenerative braking of 100 kW driving motor generated when the HDT is going downhill at high speed.

One of the cores of the present invention is an "electrical Power Split Device" (ePSD; also known as "electrical power diverter") based on a 100-kilowatt-class power electronic three-port network. By effectively integrating the vehicle engine plus double-motor Mixed Hybrid powertrain technology, Global Navigation Satellite System (GNSS), 3D e-map (3D map), Internet of Things, Big Data, artificial intelligence and other emerging technologies, a new class of HDT for long-haul freight, i.e., Automated, Connected, Electrified (ACE) HDT, is created. This vehicle is equipped with a Level I "fuel-saving robot" which enables automatic optimization and continuous improvement of the fuel saving strategy and commands the ACE HDT to implement the technical solution of predictive adaptive cruise control (PACC) to realize the SAE L1 longitudinal autonomous driving function, free up the driver's feet, and achieve multiple beneficial effects of optimization of fuel consumption and emissions, improvement of power, promotion of active safety, reduction of the labor intensity of drivers during long-distance driving and the like. The actual overall fuel consumption drop of ACE HDTs is up to 30% compared with that of the traditional diesel HDTs in the application scenarios of long-haul freight, and it can also eliminate the long-term industrial pain point of high discreteness of overall fuel consumption value of the HDT due to "human factors" of drivers; moreover. ACE HDTs can also continuously improve the existing functions of the vehicle or add new functions through software definition and over-the-air (OTA), greatly improve the cost effectiveness of ACE HDTs in the whole life cycle (up to 20 years in Europe and America), broaden sources of income and reduce expenditure, reduce cost and increase efficiency for the fleets. The Level I fuel-saving robot can also be upgraded to the Level IV fuel-saving robot; the "3R" batch validation of the Level IV fuel-saving robot on a one billion mile to ten billion mile scale accumulatively within the ODD for highways with high cost effectiveness is completed in two years through operation in a "shadow node" for L2 or "detached mode" for L3 on the premise of ensuring the traffic safety of existing road users to statistically prove with high confidence that the Level IV fuel-saving robots are safer and more reliable than human drivers; the total validation cost is 80% lower than that of the traditional diesel HDT configured with L4 system; the government and the public will be persuaded to revise relevant laws and regulations, and promote the Level IV fuel-saving robots (i.e., ACE4 HDTs) to enter the phase of commercial use in batches as soon as possible; the ACE4 HDT with a single driver will be enabled to run continuously and safely for 24 hours day and night, so that the labor productivity of human drivers can be improved by more than 50%, the consumed time and cost per unit (USD/ton-mile) of ultra-long freight events for long-haul freight on a thousand mile scale can be significantly reduced, which has a revolutionary impact on the long-haul freight industry on a trillion dollar scale for highways in the whole world. For the transport fleet, efficiency and safety are two eternal themes. Various electromechanical hardware and software on ACE HDTs plus the dynamically collaborative cloud-end AI training chip and vehicle-end AI inference chip combined with structured big data (i.e., fuel saving data set) about the operation of ACE HDTs on the cloud end and vehicle end and various fuel saving machine learning algorithms form a system device of "fuel saving robot" for ACE HDTs; this fuel-saving robot is a non-humanoid intelligent industrial robot which can assist human drivers to automatically optimize the energy and power management of HDTs for long-haul freight in real time, reducing the overall fuel consumption by more than 25% compared with the traditional diesel HDTs, and has the capability of autonomous learning and evolution; it is estimated that the mass commercial use of the fuel saving robot of ACE HDTs for long haul road freight can be realized in the three major HDT markets of America, China and the European Union in live years.

The first principle of the fuel-saving robot technology of the ACE HDTs is the dynamic equation (1-1) of vehicle longitudinal driving that the automobile industry is very familiar with:

$$P_v = \frac{V}{1000\eta}\left(Mgf_r\cos\alpha + \frac{1}{2}\rho_a C_D A_f V^2 + Mg\sin\alpha + M\delta\frac{dV}{dt}\right) \quad (1\text{-}1)$$

Where, $P_v$ is the vehicle power or the read load power, and the unit of all power items is kilowatt (kW).

The rolling power $P_r$ refers to the required power for overcoming the tire rolling friction resistance when the vehicle rums, which is a non-negative number, and the rolling power can be shown in the following formula (1-2):

$$P_r = \frac{V}{1000\eta}(Mgf_r\cos\alpha) \quad (1\text{-}2)$$

The air drag power $P_d$ refers to the required power for overcoming air resistance (calm weather) when the vehicle runs, which is a non-negative number, and the air drag power can be shown in the following formula (1-3):

$$P_d = \frac{V}{1000\eta}\left(\frac{1}{2}\rho_a C_D A_f V^2\right) \quad (1\text{-}3)$$

The longitudinal slope power $P_g$ refers to the required driving power (which is a positive number) for overcoming increasing gravitational potential energy when the vehicle runs uphill, and the longitudinal slope power of the vehicle running downhill is a negative number, representing the driving power generated by conversion between the potential energy and the kinetic energy of the vehicle; and the longitudinal slope power $P_r$ can be shown in the following formula (1-4):

$$P_g = \frac{V}{1000\eta}(Mg\sin\alpha) \quad (1\text{-}4)$$

The acceleration power $P_a$ refers to the required additional power for the vehicle reaching the predetermined acceleration when running on a level road. When the acceleration is a negative value, it represents deceleration braking, that is, either friction braking, which converts the kinetic energy of the vehicle into thermal energy for consumption, or non-friction regenerative braking, which converts part of the kinetic energy of the vehicle into electric energy and charges the battery pack to recover energy. The acceleration power $P_a$ can be shown in the following formula (1-5):

$$P_a = \frac{V}{1000\eta}\left(M\delta\frac{dV}{dt}\right) \quad (1\text{-}5)$$

In the above five formulas (1-1) to (1-5): V is the longitudinal linear speed of the vehicle (m/s); $\eta$ is the vehicle drive train efficiency; M is the gross vehicle mass (kg); g is the acceleration of gravity, and g=9.8 (m/s$^2$); $f_r$ is the tire rolling friction coefficient; a is the highway longitudinal slope angle, the positive value represents upslope, the negative value represents downslope, and zero represents the absolute level; $\rho_a$ is air density (kg/m$^2$); $C_D$ is the vehicle wind resistance coefficient; $A_f$ is the projection area (m$^2$) in front of the vehicle; $\delta$ is the rolling mass conversion coefficient; dV/dt is the vehicle longitudinal acceleration (m/s$^2$), the positive value represents acceleration, and the negative value represents deceleration or braking. The longitudinal slope of each highway is only a spatial function; unless the road is repaired, the longitudinal slope function does not vary with time; because the longitudinal speed of the vehicle during driving is a time-varying function, the longitudinal slope power is a time-varying function according to equation (1-4), and there is only one substantially and rapidly changing time-varying function in the dynamic equation (1-1) when the vehicle runs at a basically constant speed.

Active braking deceleration or acceleration is seldom performed by the vehicle under the expressway running condition. When the vehicle runs at a basically constant speed, according to the above dynamic equation (1-1), the acceleration power is approximately zero, the rolling power is basically unchanged on a highway section with a small longitudinal slope (i.e., the longitudinal slope within ±several degrees), the air drag power can also be approximated to a constant, only the longitudinal slope power is a time variable, and the change amplitude of the longitudinal slope power is proportional to the sine of longitudinal slope angle of the expressway section, vehicle speed and gross vehicle weight. The "longitudinal slope" is short for the road longitudinal slope and there are two unit of measurement; one is the included angle between the road surface and the horizontal plane, and the other is the proportion of the road surface elevation to the horizontal projection distance of the road section, shown in %. Most countries limit the longitudinal slope within the range of −7.0%-7.0% in highway design and construction, which is mainly based on consideration of ensuring that the full-load HDT runs on a highway safely. The gross weight of the HDT for long-haul freight in China is mostly below 41 tons, the maximum statutory speed limit is 90 km/h, major highways in China are often jammed, and the average speed of the HDTs in the road freight industry is about 60 km/h; the gross weight limit of the HDT for long-haul freight in America is 36 tons, the maximum statutory speed limit is up to 125 km/h, and the average running speed of the HDTs in the road freight industry is about 95 km/h. Most American transport companies generally limit the maximum speed of the HDTs to 105 km/h in view of fuel saving and safety.

For example, for a fully loaded HDT with the gross weight of 40 tons and the speed of 60 km/h, the required longitudinal slope power is up to 228 kW when the vehicle encounters a highway with a longitudinal slope of 2.0 degrees and goes upslope at a constant speed, and at the moment, the sum of the rolling resistance power and the air drag power of the vehicle is only 71 kW; if the power reserve of the powertrain is insufficient at the moment, the HDT must downshift and decelerate before continuing to go upslope. Compared with a passenger vehicle with the gross weight of 2 tons, when the passenger vehicle runs on a longitudinal slope at 2.0 degrees at the same constant speed, the longitudinal slope power for the vehicle at the moment is 11.4 kW (5.0% of the longitudinal slope power of the HDT), while the sum of the rolling friction power and the air drag power is only 3.6 kW; for passenger vehicles with the peak power of 100 kW, there is no need to worry about this slope, and the vehicle runs as easily as walking on firm earth. In other words, for each fully loaded HDT running at high speed, every 1.0 degree change, which is hard to see by naked eyes, of the road longitudinal slope means that the road load power of the HDT (mainly originated from longitudinal slope power changes) will have a great change of more than 100 kW. Going uphill must be followed by going downhill. When going downhill, the 100 kW level longitudinal slope power of the HDT is negative, a constant vehicle speed can be maintained through the regenerative braking of the driving motor (equivalent to negative acceleration power during active braking), part of mechanical energy generated when the vehicle goes downhill can be converted into electrical energy to charge the battery pack and recover energy. Although there are few active brakes for ACE HDTs under high-speed conditions, there are still many "passive braking" opportunities to recover kWh level electrical energy by regenerative braking while going downhill for ACE HDTs running at basically uniform speed because slight changes of 1.0 degree level along the longitudinal slope of the highway can bring 100 kW level longitudinal slope power changes. A small stream flows far, and many a little makes a mickle. This is the secret that ACE HDTs for long-haul freight have a more obvious fuel saving effect than that of the traditional diesel HDTs.

When the vehicle is running at the speed of 60 km/h, the required braking power is 67 kW for passenger vehicles with the gross weight of 2.0 tons to realize moderate-intensity braking with the deceleration or 2 m/s$^2$ (i.e., 0.2 g); however, for a HDT with the gross weight of 40 tons, the braking power required is as high as 1333 kW, the total mass of an urban electric bus is 20 tons, the average speed is about 30 km/li, and the braking power required for the urban bus to achieve the deceleration of 0.2 g is 333 kW. Limited by the peak power of the industrializable onboard driving motor and/or the motor control unit (power electronics), the peak power upper limit of hybrid vehicles to recover energy by regenerative braking is below 500 kW at present, however, the part of instantaneous vehicle braking power higher than 500 kW cannot be converted into electric energy by regenerative braking of the motors for charging the battery pack to recover energy, so this part of vehicle kinetic energy can only be converted into heat energy by the mechanical braking system of the vehicle and totally wasted; at present, the commercialized DC fast charging pile with the maximum power in the world is the 375 k W charging pile. Under the mixed running conditions of a city or a suburb where the acceleration/deceleration is frequent, the fuel saving of the hybrid vehicles (light-duty vehicles or large buses) is more obvious than that of traditional vehicles powered by engines, and the fuel saving ratio is 30%-60%. In other words, there are few active brakes for HDTs for long-haul freight under high-speed conditions, but there are still many opportunities for 100 kW-level passive braking (downhill); at the same time, during emergency braking of the HDT under the high-speed condition, it mainly depends on the mechanical braking system, and on the contrary, most of the kinetic energy of the HDT cannot be effectively recovered through regenerative braking.

Under the normal road conditions of highways with infrequent active acceleration and deceleration with an average vehicle speed of higher than 60 km/h, the traditional engine can work stably in its high efficiency zone, compared with the fuel saving effect of the traditional vehicles powered by engines, the fuel saving effect of the hybrid vehicle is not obvious (the fuel saving ratio is less than 10%), especially the series hybrid vehicles, and the overall fuel consumption may be even surging rather than falling because of the additional energy loss caused by multiple energy conversions; the above-mentioned "consensus" of the global automobile industry is applicable for all hybrid passenger vehicles (with gross weight less than 3.5 tons) and parallel hybrid (an engine with the peak power of greater than 250 kW is mechanically connected in parallel with a medium-sized motor with the peak power of less than 200 kW large commercial vehicles. However, inventors believe that the "consensus" of the industry is not applicable for the ACE HDTs with a 100 kW-level double-motor extended-range series hybrid or mixed hybrid (series-parallel) system architecture in the application scenario of long-haul freight. Although there are few active acceleration or brakes for ACE. HDTs under high-speed conditions, there are many passive braking opportunities to recover kWh level electrical energy through regenerative braking of driving motor using the 100 kW level longitudinal slope power while going downhill due to the slight changes of 1.0 degree level fully distributed along the longitudinal slope of the highway. A small stream flows far, and many a little make a mickle. In other words, when a loaded HDT runs along a highway at a constant speed, every small 1.0-degree-level change of the longitudinal slope function can lead to the 100 kW level longitudinal slope power changes, and the impact on road load power is equivalent to frequent active acceleration or braking of a passenger vehicle or bus on an urban horizontal road.

All the double-motor mixed hybrid ACE HDTs of the present disclosure contain an engine (diesel or natural gas) of HDT with the peak power of greater than 250 kW and two large motors with the peak power of greater than 200 kW. One motor (MG1) is mainly used as the generator, and the other motor (MG2) is mainly used as the driving motor. The driving motor is one of the decisive factors for the power performance of hybrid HDTs, and its peak power shall be greater than 254) kW; the larger the driving motor, the better the vehicle power performance, and the better the effect of regenerative braking energy recovery. To solve the problem that the cost of the conventional large driving motor stays in a high position without going down, a three-motor hybrid system with a standard primary driving motor (MG2) and an optional auxiliary driving motor (MG3) may also be considered.

In the recent decade, for some medium and high-end HDTs with internal combustion engines in Europe and America, fuel has been saved through the predictive cruise control (PCC) by using the vehicle-mounted 3D map comprising the road longitudinal slope information. However, the predictive cruise fuel saving of traditional HDTs has its limitations: firstly, a pure mechanical powertrain is not applicable for substantially and suddenly changing the output power of the engine instantaneously (sub-second level) at high frequency, or the automatic transmission shifts gears frequently; the predictive cruise control (PCC) is mainly applicable for long slopes with the longitudinal slope angle of greater than 2.0 degrees and the slope length of above several kilometers; secondly, the traditional HDT with internal combustion engine has no regenerative braking function, energy cannot be recycled when the vehicle is going down a long slope, and the actual overall fuel consumption decreases by less than 3.0%.

It is emphasized that there is no large-scale absolute highway in the world; even in vast plain areas, there are road sections with a 100-meter-level granularity connected in series along the highway, and the absolute value of the longitudinal slope function of these road sections probability fluctuates in the range of 0.2–3.0 degrees. For loaded HDs running at basically constant speed under the highway conditions, the sum of the rolling resistance power $P_r$ and the air drag power $P_d$ can be approximated as a constant, the factor with the biggest impact on the time variable of the vehicle road load power $P_v$ is the grade power $P_g$, which is proportional to the longitudinal slope angle; for every small upslope and downslope (with a longitudinal slope change of 1.0 degree) along the road, the change amplitude of longitudinal slope power is more than 100 kW, providing many opportunities to recover kWh level electric energy by 100 kW level regenerative braking power for ACE HDTs. A small stream flows far, and many a little make a mickle. If there is a vehicle-mounted 3D map on which the highway longitudinal meter-level interval density, the road positioning meter-level precision (longitude and latitude) and the longitudinal slope measurement accuracy up to 0.1 degree, by the aid of the collaborative teal time positioning (longitude and latitude) and orientation measurement (longitudinal slope) of Internet of Vehicles or the meter-level high-precision satellite navigation (GNSS) and Inertial Measurement Unit (IMU) and according to the vehicle dynamic equation (1-1), the vehicle control unit (VCU) can real-timely and accurately predict the road load power time-varying function ahead of the vehicle within hundreds of kilometers along the way, especially the 1000-kilowatt-level granularity time-varying function of the grade power $P_g(t)$ and the road load power $P_v(t)$ within the range of hundreds of kilometers of the electronic horizon in front of the vehicle; the predictive refresh frequency of the VCU can be up to 10.0 hertz (Hz), that is to say, the VCU can refresh the road load power function prediction within its electronic horizon every 2-3 meters that the vehicle runs.

Various ADAS e-maps that have been commercially available in hatches in countries around the world or HD Map that supports the commercial use of the HAV can be used as the 3D map of the present invention to provide priori information on the Electronic Horizon for vehicles; the Electronic Horizon refers to the road information, especially the 3D information of longitude, latitude and longitudinal slope of the highways along the way, contained in the 3D e-map within the specific range in front of the heading of the vehicle. The predictive cruise control (PCC) is implemented for the traditional diesel HDTs, and only the electronic horizon information within about 10 km can be used effectively because it is limited by the fact that the traditional diesel HDTs are not suitable for frequent and quick transformation of the working conditions of the engine or frequent gear shilling of transmissions and have no regenerative braking energy recovery function; however, the ACE HDTs of the present invention can effectively utilize various ranges of electronic horizon information ranging from 10 km to 100 km: refer to the following for details.

For the ACE HDT running normally on highways with active braking or acceleration seldom performed, its speed is basically constant, and the time variation of vehicle road load power is mainly originated from the longitudinal slope power change brought about by the longitudinal slope change of the highways. However, since both the vehicle running path and the distribution function of the longitudinal slopes along the highway are fixed and known in advance, the VCU of ACE HDT can calculate the time-varying function (if vehicle road load power within the electronic horizon in real time within one second according to the vehicle dynamic equation (1-1), vehicle configuration parameters, dynamic condition data, priori road information on the electronic horizon, and real-time road condition information, predict the time-varying function of vehicle road load power in the future (at the hour level or 100 km level) with a kW-level granularity, so that the fuel-saving robot can have forethought, make full use of the ten kilowatt hour level electric energy storage and hundred kilowatt level electric power peak load shifting function of the power-type battery pack, and perform predictive real-time control of energy management on the mixed hybrid powertrain of ACE HDT according to the fuel-saving machine learning (ML) algorithm to realize the optimization of vehicle energy saving and emission reduction. The fuel-saving robot system of ACE HDT of the present invention can transform the global problem of minimization of the fuel consumption of HDTs for long-haul freight into the equivalent Narrow AI problem of Computer Go (e.g. AlphaGo). The AI brain of the cloud-end fuel-saving robot can be trained and a deep neural network (DNN) model of the fuel saving algorithm can be established by using the fuel-saving data set generated by the operation of many ACE HDTs combined with the machine learning algorithm and cloud-end computing power; then, the AI chip of the vehicle-end fuel-saving robot performs reasoning and calculation according to the above DNN model, regulates and controls the path, amplitude and direction of the engine mechanical power flow or battery pack power flow of the ACE HDT in real time to realize the optimization of vehicle energy saving and emission reduction on the premise of ensuring the power performance and active safety of the complete vehicle; in terms of minimization of the actual fuel consumption, the fuel-saving robots win over the human drivers, and the actual fuel saving effect is basically decoupled from the driver's level and the configuration parameters of ACE HDT engine. In other words, the traditional HDT with internal combustion engine of the prior ail adopts predictive cruise control (PCC) because it has no regenerative braking and energy recovery function, and the actual fuel saving ratio is less than 3% with limited effects; however, the double-motor mixed hybrid ACE HDT of the present invention can achieve the beneficial effect of saving 30% fuel than the traditional HDT with internal combustion engine due to its regenerative braking and energy recovery function at peak power of 500 kW, 10 kWh-level power-type battery pack plus the HDT fuel-saving robot having super computing power and autonomous learning and evolution function; the details will be described later.

The ACE HDT fuel-saving robot system proposed by the present invention can accurately and continuously allocate the flow path, amplitude or direction of 100 kW-level electric power among the three electric power sources, i.e., engine-generator set, battery pack and driving motor, within ten-millisecond-level system response time by commanding the electrical Power Split Device (ePSD) through the vehicle control unit (VCU); through pulse modulation (PM), especially pulse width modulation (PWM) or pulse amplitude modulation (PAM) of the instantaneous output power of the engine or battery pack respectively, the engine is allowed to work stably in its high efficiency zone for a long time, and the battery pack is allowed to work stably in one of the working modes of Charge Sustaining (CS). Charge Depleting (CD) and Charge-Increasing (CI) or switch smoothly among the three working modes according to the dynamic prediction of the vehicle road load power in the electronic horizon; and the hundreds of kilowatt level instantaneous change of the longitudinal slope power item within the second-level time is offset through 100-kilowatt level high-rate charging and discharging of the battery pack in real time as well as peak-load shifting of the instantaneous road load power, and the road load power required by a vehicle dynamic equation (1-1) is provided at any time. Compared with traditional heavy duty diesel vehicles, the overall fuel consumption for actual operation of long-haul freight of the ACE HDT can be decreased by 30% on the premise of ensuring the power, freight timeliness and active safety of the vehicle.

The ACE HDT of the invention is of a double-motor and single-clutch mixed hybrid system architecture, as shown in subsequent FIGS. 1 and 2. The ACE HDT can command the clutch to be disengaged or engaged through the vehicle control unit (VCU) to realize the series hybrid mode and parallel hybrid mode separately. Vehicles under urban conditions have low average speed (less than 45 km/h) and frequent active acceleration or deceleration, the working conditions of the engine and the working conditions of the vehicle road load can be decoupled completely by using the series hybrid mode, so that the engine is enabled to stably work at its high-efficiency point, there are also many opportunities for the driving motor to recover energy through regenerative braking, and series hybrid vehicles have a more obvious fuel saving effect (more than 30%) than that of the traditional fuel vehicles; vehicles under high speed conditions have high average speed (more than 50 km/h) and few active acceleration or deceleration, the engine can stably work at its high-efficiency point even if it is directly and mechanically coupled with the driving wheel, and the parallel hybrid mode is preferred at this time. From the perspectives of fuel saving and power performance, the parallel hybrid mode of vehicles directly driven by engines is better than the series hybrid mode under high speed conditions. The power-split hybrid system represented by Toyota Prius has both series hybrid and parallel hybrid functions and gives consideration to optimization of both power and fuel saving of the vehicle. It has been the international benchmark of hybrid power for passenger vehicles for twenty years. However, it is difficult for the mechanical power-split hybrid system based on planetary gear to expand to large commercial vehicles with high cost effectiveness subject to the current metal materials and production processes because the planetary gear, the core component of the power-split hybrid system, must withstand the force exerted simultaneously by the three ends, i.e., the engine, the generator and the driving motor, with a peak power of greater than 150 kW, there is no such large automotive-grade planetary gear commodity in the world, the design and mass production of new products will take several years, and the unit cost will remain high for a long time; even Toyota has not applied its unique power-split hybrid powertrain technology with single planetary gear unit to large commercial vehicles.

The present disclosure provides a double-motor mixed hybrid powertrain architecture capable of time division switching of series or parallel hybrid mode, see subsequent FIG. 1 and FIG. 2; the mixed hybrid powertrain architecture comprises: a generator (MG1) directly driven by the engine, used for converting chemical energy of vehicle fuel into electric energy (in the series hybrid mode) or directly driven vehicles (in the parallel hybrid mode); an electrical power split device (ePSD), configured as a power electronic network with three ports, wherein the first port of the ePSD is in bidirectional AC electric connection with the output end of the generator set; the second port of ePSD is in bidirectional AC electric connection with at least one driving motor (MG2); the third port of ePSD is DC-connected with at least one power-type battery pack bidirectionally and electrically and DC-connected with a brake resistor unidirectionally and electrically; an automatic transmission, with an output shall connected with a driving axle of the vehicle bidirectionally and mechanically; a map unit, storing a 3D map in advance, containing the 3D information of longitude, latitude, longitudinal slope and the like of the road where the vehicle is running; at least one standard primary driving motor (MG2) in the hybrid P2 position, AC-connected with the second port of ePSD bidirectionally and electrically, with the output shaft of the driving motor connected with the input shaft of the automatic transmission bidirectionally and mechanically through a flexible coupling, wherein the primary driving motor (MG2) can be operated for converting the electric energy into the mechanical energy for driving the vehicle (driving mode), or converting the mechanical energy of the vehicle into the electric energy (regenerative braking mode), and charging the battery pack through the inverter in the second port of ePSD to recover energy, wherein the output shaft at the flywheel end of the engine is bidirectionally and mechanically connected with the mechanical shaft of the generator (MG1) in the hybrid P1 position, and the mechanical connection is either a single shaft with the same speed (coaxial connection) or parallel double shaft plus gear reducer coupling (parallel axis connection); the output shaft of the engine is also bidirectionally and mechanically connected with the primary driving motor (MG2) through a heavy duty clutch, and the mechanical connection is either a single shaft in a coaxial mode or parallel double shaft plus gear reducer coupling; the primary driving motor (MG2) is also bidirectionally and mechanically connected with the input shaft of the automatic transmission through a flexible coupling, and the output shaft of the transmission is mechanically connected with the driving axle of the vehicle; the vehicle further comprises: a vehicle control unit (VCU), working together with the AI Unit (AIU), and the vehicle control unit is used for dynamically controlling at least one of the engine, the generator, the clutch, the ePSD, the driving motor, the automatic transmission and the battery pack based on 3D map data in a vehicle-mounted Global Navigation Satellite System (GNSS) and/or the map unit (MO)) independently.

This mixed hybrid system controls the now path, amplitude and direction of two distinct power flow closed loops (mechanical or electric) at a 100 kW level among the engine, generator, battery pack and driving motor in the vehicle powertrain system dynamically through the coordination of the 100 kW-level heavy duty clutch and the electrical power split device (ePSD), and switches between series hybrid mode and parallel hybrid mode of the vehicle by disengaging and engaging the clutch; the mixed hybrid architecture can effectively integrates the respective original advantages of series hybrid and parallel hybrid system architectures, overcome their original disadvantages, and optimize both the power and fuel saving performance of the vehicle, and the comprehensive cost effectiveness of the mixed hybrid system is higher than that of a double-motor extended-range series hybrid system or a single-motor pure parallel hybrid system. The generator (MG1) is configured in the hybrid position P1 (behind the flywheel of the engine and in front of the clutch), the primary driving motor (MG2) is configured in the hybrid position P2 (behind the clutch and in front of the transmission), and the optional auxiliary driving motor (GM3) is configured in either position P3 (behind the transmission, in front of the transmission shaft) or P4 (behind the transmission shaft, at the wheel side).

The ACE HDT of a double-motor mixed hybrid architecture realizes the all-digital software defined powertrain with ePSD as the core. During the hardware design of ePSD three-port power electronic network, a margin shall be reserved for the function and performance, the plasticity of the product in a later stage is increased, and the product is continuously upgraded end evolved through the software remote update iteration (OTA) of each ACE HDT throughout its full operation life cycle Relying on continuous software remote update (OTA), the actual performance of the powertrain of each ACE HDT is corrected continuously in a tailored manner based on big data plus artificial intelligence of cloud-vehicle interaction, that is, ensure that each ACE HDT can not only meet the emission regulation limits (RDE) at all times and places, but also realize the optimization of the fuel saving effect of the HDT and intelligent operation and maintenance (M&R) within the 700,000 km warranty period required by the emission regulations.

The ePSD can be configured as a three-port power electronic network which contains at least three unique power electronic functional modules with 100 kW-level nominal power: the first port is internally connected with a bidirectional AC-DC converting module also known as an inverter), the second port is internally connected with at least one bidirectional AC-DC converting module (also known as an inverter), and the third port is internally connected with at least one bidirectional Boost-Buck DC-DC converting module (also known as a chopper) or an unidirectional DC voltage-controlled switch module. The disclosure focuses on the main peripheral input/output characteristics of the ACE HDT ePSD and the core functions of the three power electronic (PE) functional modules (i.e., inverter, chopper and voltage-controlled switch) contained in the ePSD. The collection of various topological structures of circuits realizing the above three PE functional modules belongs to the scope of the present invention. The physical packaging and arrangement form of ePSD is that the above three PE functional modules are either packaged and arranged in a metal box in a centralized way, or separately packaged and arranged with the generator (MG1), the primary driving motor (MG2), the battery pack and the like in a decentralized way.

The above hybrid powertrain of the ACE HDT realizes two unique system architectures or working modes: series hybrid (clutch disengaged) or parallel hybrid (clutch engaged) respectively by controlling the on-off state of the clutch; many different operation modes can also be further divided under each system architecture. The vehicle control unit (VCU) commands the electromechanical Clutch-by-wire by electric control (rather than mechanically) to switch between series and parallel hybrid modes accurately and smoothly. These are separately described below. To optimize both fuel saving and power of the vehicle, the parallel hybrid mode is preferred under high speed conditions (smooth highway, at the average speed of above 50 km/h, infrequent active acceleration or braking) or any conditions (at any speed, slowdown function is required for safety) with long-distance downslope (the absolute value of longitudinal slope on the way is greater than 2.0 degrees, the slope length is greater than 5 km); and the series hybrid mode is preferred under urban conditions (at the average speed of below 40 km/h, with frequent active acceleration or braking).

Firstly, in the series hybrid mode, there is only an electric power flow circuit rather than mechanical power flow circuit from the engine to the driving wheel, all the DC ports of the three functional modules inside the ePSD are connected to the DC bus junction X bidirectionally and electrically, the product of the DC voltage and current time-varying function at this junction is the time-varying function of the electric power of the corresponding energy conversion device, and these power items satisfy the following three equations in real time:

$$P_v = \eta_{df} P_{MG2} \quad (2\text{-}1)$$

$$P_{MG1} + P_{MG2} - P_{BAT} = 0 \quad (2\text{-}2)$$

$$P_{ICE} = -P_{MG1}/\eta_s \quad (2\text{-}3)$$

All the above power items are 100 kW-level time-varying functions, and it is assumed that the energy conversion factor for a round trip of the generator (MG1), battery pack and driving motor (GM2) may be approximately 1.0, those of ordinary skill in the art can easily derive the corresponding formula when the actual conversion coefficient is less than 1.0.

Where, $P_{MG1} > 0$, the driving power of the generator (MG1) (the load is the non-combustion idle speed or non-combustion brake of the engine, and the electric energy is converted into mechanical energy); $P_{MG1} < 0$, the generated power (power generation directly driven by the engine, mechanical energy is converted into electrical energy);

$P_{MG2} > 0$, the driving power (electric energy is converted into mechanical energy) of the primary driving motor (MG2); $P_{MG2} < 0$, the regenerative braking power (mechanical energy is converted into electric energy), the battery pack is charged and energy is recovered;

$P_{BAT} > 0$, the total discharging power of all battery packs (chemical energy is converted into electric energy); $P_{BAT} < 0$, the total charging power of all battery packs (electric energy is converted into chemical energy);

$P_{ICE}>0$, the effective output power of engine combustion (chemical energy is converted into mechanical energy), $P_{ICE}<0$, the equivalent mechanical load power (conversion between various mechanical energies) of engine non-combustion (no fuel injection) drag or engine braking;

Preferred power parameter configuration principle of the above four energy conversion devices is as follows: $P_{ICE-p}>=P_{MG2-m}>=P_{MG3-m}$; $P_{BAT-m}>P_{MG2-m}$. Where $P_{ICE-p}$ is the peak power (maximum continuous power) of the engine. $P_{MG1-m}$, $P_{MG2-m}$ and $P_{BAT-m}$ are the power ratings (i.e., maximum continuous power) of the generator, driving motor and battery pack, respectively. The difference between the motor and the engine is that the motor can withstand short time overload, and its pulse peak power (10 seconds) may be more than 50% higher than the nominal power; the pulse peak power (10 seconds) of the power-type battery pack can be more than 100% higher than its nominal power. The system peak power (i e, maximum continuous driving power of the vehicle) of the powertrain is completely determined by the $P_{MG2-m}$ of the standard primary driving motor under the series hybrid mode. An optional auxiliary driving motor (MG3) may be considered in order to improve the power, fuel saving and safety of the vehicle; MG3 can be arranged in the hybrid position P3 (between the transmission output shaft and the first driving axle or the input shaft of the second driving axle); of course, the addition of a third motor will not only improve the vehicle power performance, but also increase the system cost.

Under the series hybrid mode, $P_{MG2}$ is a dependent variable, which is directly proportional to the road load power $P_v$ of the vehicle, the road load power is an independent variable, which reflects the driving intention of the driver, and $\eta_{dt}$ is the efficiency (a positive number less than 1.0) of the rotation system. $P_{MG1}$ is another dependent variable, which is directly proportional to the net output power $P_{ICE}$ of the engine, and $\eta_g$ is the generator set efficiency (a positive number less than 1.0). The internal combustion engine (ICE) and the generator (MG1) can be actively set to operate at the high-efficiency condition points of specific speed and torque to ensure the highest combustion thermal efficiency (i.e., minimum specific fuel consumption, g/kWh) of the engine and optimized exhaust emission at this moment; under the unified command of the vehicle control unit (VCU), the three power electronics function modules inside the ePSD and related subsystems such as engine, generator, driving motor, automatic transmission and battery pack dynamically adjust the dependent variable $P_{BAT}$ and perform peak load shilling on the road load instantaneous power function according to the power control strategy of the whole vehicle to meet the vehicle dynamics equation (1-1) in real time and achieve the optimal fuel saving effect on the premise of ensuring the power performance and freight timeliness of the vehicle.

The equations (2-1), (2-2) and (2-3) can be recombined to obtain the following power balance equation (hereinafter referred to as the series hybrid power balance equation) in the series hybrid mode of ACE HDT:

$$Pv(t)=\eta_{dt}(\eta_g P_{ICE}(t)+P_{BAT}(t)) \quad (2\text{-}4)$$

The restrictive boundary conditions of the series hybrid power balance equation (2-4) are as follows:

a) When the charge level of the battery pack is basically sufficient (i.e., high-efficiency range; BLL<SoC<BUL), $$P_{MG1\text{-}m}<\max(|Pv(t)|)<P_{MG2\text{-}m} \quad (2\text{-}4c1)$$

b) When the charge level of the battery pack is basically exhausted (i.e., SoC<LRL), $$\max(|Pv(t)|)<P_{MG2\text{-}m}<P_{MG2\text{-}m} \quad (2\text{-}4c2)$$

Where $\max(|Pv(t)|)$ is the maximum value that can be achieved by the absolute value $|Pv(t)|$ of the road load power time function of ACE HDT in the series hybrid mode.

The preferred range of nominal voltage $V_{busD}$ of ePSD internal DC bus is between 600V and 800V. The third port of the ePSD can be externally DC-connected to at least one power-type battery pack bidirectionally and electrically, the nominal voltage of each battery pack $V_{bat}<V_{busD}$, and the third port can also be externally DC-connected with a 100 kW-level brake resistor $R_{bk}$ equipped with a radiator unidirectionally and electrically as the effective electrical load for the driving motor to continue to maintain the non-friction retarder function of the vehicle through regenerative braking power generation when the ACE HDT runs on a long-downhill path and the battery pack is basically fully charged (SOC reaches URL). The above equation (2-2) assumes that the voltage-controlled switch module inside the ePSD is disconnected and the brake resistor does not work; if the module is on, the brake resistor is used as an electric load connected in parallel with the battery pack, and at this time, a brake resistor power item $P_{BR}$ (a positive number) should also be added to the left side of equation (2-2); the series hybrid power balance equation (2-4) should also be modulated accordingly.

In some embodiments, the port III of ePSD can be connected with at least two battery pack combinations with different nominal voltages or consisting of cells with different electrochemical components bidirectionally and electrically, so they will have complementary advantages, which can not only improve the overall performance of the battery pack and increase the redundancy of the battery pack system, but also reduce the comprehensive cost of the battery pack, bringing multiple benefits to optimize the cost effectiveness of the complete ACE HDT. The battery pack of the ACE HDT is a Peak Power Source with ultra long cycle life, wide ambient temperature range and continuous high-rate partial state of charge (HRPSoC) operation. Its main function is to provide 100 kW-level "peak load shifting" instantaneous electric power, superimposed with the electric power supplied by the generator set to jointly supply power to the driving motor and ensure that the driving motor can provide the required vehicle road load power and satisfy the vehicle dynamics equation (1-1) in real time. The capacity of this power-type battery pack is generally within 100 kWh. This will be described in detail later. A HI diesel engine with a large fuel tank has average explosive power but full endurance, while the power battery pack is more like a high-powered engine with a small fuel tank, with strong explosive power but severely insufficient endurance; when the engine is combined with the battery pack, they learn each other's good points for common progress, and both the total explosive power and endurance of the mixed hybrid powertrain are outstanding; the motor neither produces energy by itself nor stores energy, it is a high-efficiency energy converter without memory and hysteresis effect, and it allows electric energy and mechanical energy to be converted bidirectionally and mutually.

The capacity of the power-type battery pack of the ACE HDT is generally only dozens of kWh. Note that the dimension of the battery pack capacity involved in the present invention is kilowatt hour (kWh), rather than the ampere-hour (Ah) commonly used in the battery industry due to the different nominal voltages of various battery packs. If the ACE HDT under the series hybrid mode encounters the special road condition of climbing a mountain (with the longitudinal slope of greater than 2.0 degrees) continuously for more than ten kilometers, it is likely that the battery pack charge is basically exhausted (SoC reaches LRL) before the vehicle reaches the summit of the mountain, and the climbing Gradeability of the series hybrid vehicle will depend entirely on the maximum continuous power $P_{MG1-m}$ of the generator set at this moment. To maintain the same power performance as the traditional HDT with engine under the extreme road condition of climbing a mountain, the series hybrid HDT must be equipped with the generator (MG1), driving motor (MG2) and corresponding inverter as options with the same power ratings as the peak power of the engine. At present, the peak powers (the maximum continuous power or the engine) of engines (displacement 11 L-16 L) of all mainstream HDTs for long-haul freight in the world exceed 300 kW, and the peak power of a top-level 16 L engine even exceeds 450 kW. However, although the automotive-grade large motor and inverter with the nominal power (refers to the maximum continuous power of the motor) of more than 250 kW have been industrialized, they cannot be used with new energy passenger vehicles with a greater annual output by one order of magnitude due to higher voltage platform and power upper limit requirements and less annual consumption. As a result, the high-power motors and inverter products are expensive, and the cost will be high for a long time and difficult to fall. For example, the cost of an automotive-grade large motor (with inverter) with the nominal power of 300 kW is significantly higher than the total cost of two medium motors (with inverter) with the nominal power of 150 kW; as a result, the comprehensive cost of an extended-range series hybrid system with the high configuration of a high-power motor will be high for a long time and difficult to fall, resulting in poor cost effectiveness of the complete vehicle. When the ACE HDT is going uphill or climbing a large upslope, from the perspective of power performance and safety of the vehicle, the parallel hybrid mode can be preferred, while the series hybrid mode is the second-best choice.

Secondly, under the parallel hybrid mode, the clutch is closed and locked, the engine is directly coupled with the driving wheel, both the mechanical power flow circuit and the electric power flow circuit are closed, and the engine, generator (MG1) and driving motor (MG2) can exert force separately or in a collaborative manner to meet the vehicle dynamics equation (1-1) in real time. All the DC ports of the three functional modules inside the ePSD are connected to the DX bus junction X bidirectionally and electrically, the product of the DC voltage at this junction and the current at all circuit branches is the time-varying function of the electric power of the corresponding energy conversion device, and these power items satisfy the following two power balance equations at all times:

$$Pv = \eta_{dt}(P_{ICE} + P_{MG1} + P_{MG2}) \qquad (3\text{-}1)$$

$$P_{MG1} + P_{MG2} - P_{BAT} = 0 \qquad (3\text{-}2)$$

The above equation (3-2) assumes that the voltage-controlled switch module inside the ePSD is disconnected and the brake resistor does not work; however, if the module is on, the brake resistor is used as an electric load connected in parallel with the battery pack, and at this time, a brake resistor power item $P_{BR}$ (a positive number) should also be added to the left side of equation (3-2) The circuit between the brake resistor and the ePSD junction X is disconnected most of the time unless the brake resistor is turned on when the ACE HDT runs on a long-downhill path and the battery pack is basically Willy charged (SoC reaches URL) to realize the non-friction retarder function.

The equations (3-1) and (3-2) can be recombined to obtain the following parallel hybrid power balance equation.

$$Pv(t) = \eta_{dt}(P_{ICE}(t) + P_{BAT}(t)) \qquad (3\text{-}3)$$

The restrictive boundary conditions of the equation (3-3) are as follows:

1) When the charge level of the battery pack is basically sufficient (i.e., high-efficiency range: BLL<SoC<BUL), $$P_{ICE\text{-}p} < \max(|Pv(t)|) < P_{ICE\text{-}p} + P_{MG2\text{-}m} + P_{MG1\text{-}m} \qquad (3\text{-}3c1)$$

2) When the charge level of the battery pack is basically exhausted (i.e., SoC<LRL).

$$P_{MG2\text{-}m} < \max(|Pv(t)|) < P_{ICE\text{-}p} \qquad (3\text{-}3c2)$$

The series hybrid power balance equation (2-4) and the parallel hybrid power balance equation (3-3) are compared with the corresponding two sets of restrictive boundary conditions. Apparently, the maximum road load power that can be achieved in the parallel hybrid mode is far greater that the maximum road load power that can be achieved in the series hybrid mode, and the power performance in the parallel hybrid mode is obviously superior to that in the series hybrid mode provided that the battery pack is kept working in the high-efficiency range; the parallel hybrid mode of ACE HDT is probably more fuel-efficient than the series hybrid mode under the high-speed condition because the engine can drive the wheels directly in the parallel hybrid mode to avoid multiple energy conversions between mechanical energy and electric energy; of course, it is also possible to make full use of the priori data in the 3D road within the electronic horizon in combination with the configuration parameters and dynamic condition data of ACE HDT to switch between series hybrid mode and parallel hybrid mode (i.e., Intelligent Mode Switch; iMS) dynamically in a predictive and intelligent manner, and make full use of the characteristics and advantages of the two modes to further minimize the fuel consumption of the whole transportation event; similar to playing the Go game, we should not strive for the local gains and losses of each piece of the Go game, but take a panoramic view of the situation and strive for an all-round victory in the end, the ACE HDT has two mutually independent power sources, i.e., engine mechanical power source and battery pack electric power source; the generator (MG1) and the driving motor (MG2) can be regarded as high-efficiency passive energy converters for converting mechanical energy and electric energy bidirectionally with an efficiency of about 90%; according to the vehicle dynamics equation (1-1) and power balance equations (2-4) and (3-3), the core of the energy management optimization strategy of ACE HDT is dynamical control, especially the novel and unique rectangular or non-rectangular pulse width modulation (PWM) or non-rectangular pulse amplitude modulation (PAM) digital control, over the instantaneous mechanical power function of the engine and the instantaneous electric power function of the battery pack in order to achieve the optimization of the actual energy saving and emission reduction effect of the vehicle on the premise of ensuring the power and active driving safety of the vehicle.

There is a direct mechanical connection between the engine and the driving axle under the parallel hybrid mode; the road load power $P_V$ is an independent variable, which reflects the driver's intention to control the vehicle running (such as speed or acceleration), and its value is proportional to the product of the speed of the vehicle driving wheel and the total driving torque; when the vehicle is running normally (that is, when the driving wheel does not slip), the engine speed is directly proportional to the driving wheel speed, the engine speed is a dependent variable and cannot be set independently; the engine torque is an independent variable within the effective peak torque range at this speed, which can be set independently according to the vehicle energy management control strategy, in other words, in the parallel hybrid mode, the instantaneous power function of the engine is still an independent variable that can be controlled independently. From the perspective of fuel saving, the series hybrid mode is preferred under urban conditions (the average speed is less than 40 km/h, with frequent active acceleration and braking); while the parallel hybrid mode is preferred under high speed conditions (the average speed is greater than 50 km/h, with infrequent active acceleration and braking).

More than 90% of the engines of HDTs are diesel engines. The high efficiency zone (i.e., the condition range with the minimum brake specific fuel consumption (BSFC)) of the diesel engine of the HDT is generally in the speed range of 1,000~1,800 revolutions per minute (rpm), and the torque is within the maximum torque range of 50%-95% (i.e., load rate of 50%-95%); the specific fuel consumption (BSFC; g/kWh) of the engine beyond the high-efficiency range will significantly rise. Fuel consumption reduction through engine Down speed or Down size is a trend of the HDT industry in Europe and America in recent ten year, but these two fuel saving measures contradict the improvement of vehicle power performance. Two 100 kW-level generators and driving motors can apply force together with the engine under the parallel hybrid mode of ACE HDT, and at this time, the power performance of the vehicle is significantly better than that of all of the traditional HDTs with engines or the extended-range series hybrid HDTs (with peak power of less than 450 kW). A total peak driving power (i.e., maximum road load power) of more than 500 kW can be realized within a period of time at the minute level, and the ACE HDT has outstanding accelerating, overtaking and climbing capacities.

When the mixed hybrid ACE HDT for long-haul freight encounters an extreme road condition of climbing a long slope or mountain for more than ten kilometers, the clutch may be engaged in advance by the fuel-saving robot to switch to the parallel hybrid mode according to the onboard 3D map and vehicle positioning when the vehicle gets to the bottom of the mountain, then the vehicle is directly driven by the engine, thus eliminating multiple energy conversions from the engine to the driving wheel and improving the driving efficiency. If the battery pack charge is exhausted (SoC<LRL) before the ACE HDT reaches the summit, both the generator and the driving motor can be configured as no-load idling, and at this time, the power performance of the vehicle depends entirely un the peak power (generally greater than 300 kW) of the engine when the vehicle continues to climb the mountain. Under the mixed hybrid architecture of the present invention, the configuration condition for the peak power parameter is: $P_{ICE-p} > P_{MG2-m} > P_{MG1-m}$, with $P_{ICE-p} > 300$ kW, $P_{MG2-m} < 250$ kW, $P_{MG2-m} < 200$ kW as options. The cost of the motor and inverter can be significantly reduced if the motor nominal power is less than 200 kW. In addition to the extreme road condition of climbing a mountain, the ACE HDT enables the batter pack to operate in a Charge-Sustaining (CS) mode for a long time on flat and hilly lands. The state of charge (SOC) of the battery pack is maintained in an optimal working area (e.g., 30%-70%) through the intelligent power switching (iPS) of the instantaneous output power of the engine combined with electronic horizon prior 3D road information. At this time, the engine and dual motors (MG1, MG2) can jointly apply force and drive the vehicle, and the maximum total driving power of the parallel hybrid powertrain for a minute-level duration can be up to mote than 500 kW. The power performance, safety, fuel-saving and other aspects of the mixed hybrid HDT are significantly better than those of both the traditional HDT with engine and the extended-range series hybrid HDT with high configuration.

All the accumulated effective work applied by the ACE HDT to complete the whole freight event directly or indirectly comes from the time integration of instantaneous output power function of the engine, i.e., accumulated effective mechanical energy. One of the keys to the fuel-saving strategy of the ACE HDT is to keep the engine running stably for a long time in the high-efficiency range of its universal characteristic curve to the greatest extent and minimize the engine running outside its high-efficiency range, especially long-time operation in the low-load condition area or idle condition point for a long time. SS—STOPS Start and Cylinder Deactivation (CDA), which are the existing energy saving and emission reduction technologies currently well known to people in the global automotive industry, have been widely applied in the passenger vehicle industry; however, the disadvantages and limitations of usage of the two prior arts are also common senses in the industry.

The HDTs for long-haul freight run under high-speed conditions most of the time and seldom encounter traffic lights, the vehicle stop start frequency is very low, and the frequency of active acceleration or braking is also very low; the problem of Noise, Vibration and Harshness (NVH) caused by the engine of HDT during startup and shutdown switching is more prominent than that of diesel locomotives; when the engine stops running, various mechanical auxiliary subsystems (such as cooling fan, water pump, fuel pump, air pump, power steering pump, A/C compressor and the like) in the HDT cannot obtain mechanical energy directly from the engine to maintain the normal operation, frequent STOPS Start of the engine can shorten the life of the engine, starting motor, clutch, lead-acid battery and other subsystems; little actual fuel-saving effect (less than 2%) of the start-stop technology for the engine of the HDT for long-haul freight has been achieved; therefore, the engine STOPS Start (SS) technology in the prior art of energy saving and emission reduction is not applicable to the HDTs for long-haul freight, and so far the engine SS technology of the HDTs has not been commercialized on a global scale. When the HDT for long-haul freight runs normally, the engine stably works in its high-efficiency range for most of the time and works under its low-speed and low-load conditions for little time. Although the engine still operates at idle speed or low speed under low load when the road is congested or the HDT is waiting for trailer handling, the percentage of time is very small. If the engine of the HDT for long-haul freight uses the cylinder deactivation (CDA) technology, a set of complex variable valve actuation (VVA) devices are to be added By dynamically cutting off the fuel injection of some cylinders of the engine (for example, 6 cylinders are changed to 3 cylinders) and normally closing all inlet/exhaust valves of these non-combustion cylinders during a full cycle of four strokes, the actual load factor of the remaining combustion working cylinders is increased. The primary purpose of CDA is to raise the engine exhaust temperature under low load conditions, so that various catalysts inside the After-treatment System (ATS) operate in their high-efficiency range (250° C. to 500° C.), and vehicle pollutant emissions are reduced; the secondary purpose is actually to save fuel by adjusting the actual operating point of the working cylinder to the high-efficiency range. The engine cylinder deactivation (CDA) technology significantly increases the structural complexity and cost of the engine, and reduces the reliability and life of the engine. For HDTs for long-haul freight, however, the effect of overall energy saving and emission reduction is limited, and the cost effectiveness is not high. At present, the engine STOPS Start (SS) or cylinder deactivation (CDA) technology for HDTs has not been put into commercial use in batches in the market of HDTs for long-haul freight worldwide.

The mechanical driving power circuit and electric driving power circuit of the ACE HDT can work independently or cooperatively to meet the vehicle dynamics equation (1-1), series hybrid equation (2-4), or parallel hybrid equation (3-3) in teal time. The vehicle can also be maintained in a running state at full load and high speed for several minutes even if the engine of ACE HDT is in a non-combustion state and does not do positive work and the battery pack independently supplies power to the driving motor. The running process of the ACE HDT is an inertial time-varying system. Diversified digital control strategies of pulse-width modulation (PM) (for example, pulse-width modulation (PWM) or pulse-amplitude modulation (PAM)) can be used for the instantaneous output power of the engine of the ACE HDT based on an impulse equivalence principle. These strategies guarantee that the engine operates in the high-efficiency range stably for a long time, and peak load shifting is performed on the road load power through the power-type battery pack to meet the vehicle dynamics equation (1-1), series hybrid power balance equation (2-4) or parallel hybrid power balance equation (3-3) in real time; in addition, these strategies can pave the way for optimizing the energy management of ACE HDTs by making full use of all kinds of digital signal processing technology, digital control technology, big data technology and machine learning technology. The change speed of the instantaneous power of the battery pack and the motor is more than one order of magnitude higher than that of the road load instantaneous power or the engine instantaneous power; absolutely, the instantaneous power function of the battery pack can follow the difference between the road load instantaneous power function and the engine instantaneous power function quickly and accurately (ten millisecond-level delay or kilowatt-level granularity) according to the series hybrid power balance equation (2-4) or the parallel hybrid equation (3-3) to satisfy the vehicle dynamics equation (1-1) in real time; moreover, the Noise, Vibration and Harshness (NVH) performance of the complete ACE HDT during operation is significantly better than that of the traditional diesel HDT. As an analogy for the upgrading and update of the telephone or television industry from an analog communication system to a digital communication system, the present disclosure upgrades the control strategy of the engine output power of the ACE HDT from the analog Amplitude Modulation (AM) electronic control in the prior art to the digital electronic control technology based on pulse-width modulation (PWM) or pulse-amplitude modulation (PAM), and provides cost-effective technical basis, devices and methods for optimizing the energy saving and emission reduction of the HDTs for long-haul freight by making full use of various emerging artificial intelligence, big data and cloud computing (ABC) technologies. Two novel engine digital control technologies (intelligent Stop Start (iSS) and intelligent Power Switch (iPS)) that can not only overcome the original disadvantages of the existing engine Stop Start (SS) technology and Cylinder Deactivation (CDA) technology described above, but also retain their original advantages and optimize the energy saving and emission reduction of the ACE HDT will be described below in detail.

The intelligent Stop Start (iSS) for the HDT engine is firstly described. When the ACE HDT is running in the series hybrid mode, the engine and the driving wheel of the vehicle are completely and mechanically decoupled, and the operating points (i.e., speed and torque) of the engine can be arbitrarily set regardless of the operating points of the vehicle. According to the specific configuration parameters of the engine, the maximum power point in the "optimal condition area" defined by the contours of the minimum specific fuel consumption in the universal characteristic curves (Fuel Map) of the engine can be selected as the "optimal operating point"; this operating point is generally near the maximum speed (i.e., base speed) corresponding to the peak torque of the engine, the torque load rate is between 80% and 90% (the ratio of actual torque to peak torque), and the output power value of the engine at the optimal operating point (defined as the "optimal output power") is generally between 60% and 75% of its peak power value; the brake specific fuel consumption (BSFC; g/kWh) of the engine at this operating point is the smallest (i.e., the brake thermal efficiency (BTE) is the highest), and the temperature of exhaust gas at the engine exhaust port is also higher than 250° C., which is good for the efficient operation of the vehicle exhaust gas After-treatment System (ATS), minimizing the pollutant emissions and extending the effective life of the after-treatment system in the real driving environment (RDE). The optimal output power of the engine shall be less than the nominal power of the generator (MG1); the peak power of the engine is obviously greater than the optimal output power, but the specific fuel consumption of the engine is not the minimum at this time. In addition, the engine can also stably operate at a special operating point with zero fuel consumption and zero emission: "Non-Combustion Idle" (NCI). The speed value of this point can be set between 450 rpm and 750 rpm to ensure that all auxiliary subsystems on the ACE HDT that must obtain mechanical energy directly from the engine can work normally; at this time, the engine performs Fuel Cutoff on all its cylinders, the torque becomes negative, the engine needs to be driven by the generator to run in the driving mode, and the engine power at this operating point is defined as "Non-Combustion Idle Power", which is negative; the absolute value of this engine power is less than 10% of the peak power of the engine; at this time, the engine acts as a one-input multiple-output transmission, transmits the 10 kW-level mechanical power that is output by the generator in the driving mode to each auxiliary subsystem of the vehicle that requires continuous mechanical energy supply, and enables these auxiliary subsystems to operate normally. Obviously, the engine has zero fuel consumption with zero emission at the non-combustion idle operating point, but the power will be consumed. The optimal output power of the engine in the iSS mode is also called the high-state equivalent power; the Non-Combustion Idle Power is also called the low-state equivalent power.

For a basic engine without the variable valve actuation (VVA) function, the suction stroke and exhaust stroke will generate Pumping Loss respectively within a full cycle of four strokes at the non-combustion idle point, the compression stroke and power stroke get benefit from one contraction and one extension of the in-cylinder compressed air spring, and there is basically no Pumping Loss; the mechanical losses (including friction loss and pumping loss) of the engine itself are positively related to its speed. The engine at the non-combustion idle point acts as a mechanical load, the non-combustion idle power is basically less than 20 kW, the generator with a 100 kW-level nominal power easily enables the reversing drag of engine operation, and the electricity consumption within a minute-level time is limited (100 watt hour level). For an advanced engine with the variable valve actuation (VVA) function, the inlet/exhaust valves of all the cylinders can be controlled to be normally closed or normally opened within a full cycle of four strokes when all the cylinders stop injecting fuel (i.e., non-combustion), so that the pumping loss is substantially reduced, thus further reducing the power during non-combustion idling and the electricity consumption.

The intelligent Stop Start (iSS) technology means that the vehicle control unit (VCU) commands the engine to stably operate at either the "non-combustion idle point" or the "optimal operating point" and repeatedly and smoothly switch between these two operating points according to the system configuration parameters, dynamic driving data of the vehicle, electronic horizon 3D road information and machine learning (AI) algorithm focusing on optimization of energy saving and emission reduction to realize bipolar asymmetric rectangular pulse-width modulation (PWM) on the time function of engine instantaneous output power; the generator set (engine+generator) and the battery pack jointly supply power to the driving motor to satisfy the vehicle dynamics equation (1-1) and the series hybrid power balance equation (2-4) in real time, and optimize the energy saving and emission reduction of the vehicle on the premise of ensuring the power performance and safety of vehicle driving. The cycle of the PWM pulse sequence is of a sub-minute level, the duty cycle ($k_s$) is defined as the ratio (%) of the operating time at the optimal operating point to the pulse cycle in the pulse cycle, the duty cycle is continuously adjustable between 0 and 1, and the proportion of the operating time at the non-combustion idle point is equal to $1-k_s$; the minute-level time rolling mean power (i.e., the impulse of PWM; referred to as the "mean power") of the engine can be continuously adjustable between the non-combustion idle power and the optimal output power by dynamically adjusting the duty cycle $k_s$. The preferred implementation mode of dynamic switching control of engine conditions is as follows: when the engine is switched from the non-combustion idle point to the optimal operating point, the non-combustion engine is driven by the generator (MG1) at first, the engine speed is increased from the idle point to the optimal operating point, and the engine starts fuel injection and combustion to do work; the engine torque is increased rapidly (for a sub-second level transition duration) on a fixed speed vertical line in the universal characteristic curves (Fuel Map), and the engine operates stably after reaching the optimal operating point; during reverse switching, the engine cuts off the fuel injection at the optimal operating point at first and enters a non-combustion driven state (applying negative work), the torque is rapidly reduced to a negative number at first at a constant speed at the optimal operating point (for a sub-second level transition duration), then the engine is driven to slow down by the generator to the non-combustion idle point and work stably; obviously, in the iSS control mode, the instantaneous power function of the engine is converted from the analog time-varying function of the prior art into an asymmetrical bipolar rectangular PWM pulse time sequence; the mode of instantaneous control over the engine is converted from the traditional analog control of the global surface working condition to the novel and unique digital control of the working condition at two points. The series hybrid ACE HDT is electrically driven, and the 10 kWh-level power-type battery pack can support the running of the driving motor (MG2) under full load (i.e., nominal power) separately in short time (at a minute level); the response speed of the instantaneous charge-discharge power of the battery pack is one order of magnitude higher than that of the instantaneous power of the engine, the instantaneous power value is continuously adjustable between the negative nominal power and positive nominal power of the battery pack, the instantaneous power function is fully competent to follow the difference between the road load instantaneous power function and the engine instantaneous power function quickly and accurately (ten millisecond-level delay and kilowatt-level granularity) according to the series hybrid power balance equation (2-4) to realize peak load shifting; the series hybrid ACE HDT can not only ensure that the instantaneous dynamic performance of the complete vehicle is not affected by the dynamic switching of engine operating points to satisfy the vehicle dynamic equation (1-1) in real time, but also ensure that the Noise, Vibration and Harshness (NVH) performance of the complete vehicle during mixed hybrid powertrain operation is superior to that of the traditional HDT with internal combustion engine; considering the NVH performance optimization of the complete vehicle, the transition time of engine operating point switching cannot be too short, and the transition time at the second level is acceptable. For the ACE HDT, the engine operating in a non-combustion mode (applying negative work) is the mechanical load of the generator in the driving mode, while the generator in the power generation mode is the mechanical load of the engine operating normally (during combustion to do work). When the engine works at the optimal operating point, the output power of the generator (MG1) is called the "optimal generating power" (a positive number), this value is usually higher than 85% of the nominal power of the generator, and the upper limit is the nominal power of the generator; when the engine is working at the non-combustion idle point, the power consumption of the generator (MG1) is called "non-combustion consumed power" (a negative number), and its absolute value is less than 20% of the nominal power of the generator; in other words, in the series hybrid iSS control mode, by dynamically adjusting the PWM duty cycle $k_s$, the minute-level rolling time mean value (referred to as the mean generated power) of the PWM pulse time sequence of the electric power of the generator set (referring to engine+generator) can be achieved, and it is continuously adjustable between the non-combustion consumed power and the optimal generated power.

Essentially, the Intelligent Stop Start (iSS) technology extremely simplifies the actual operation area of the engine of the ACE HDT in the series hybrid mode to a single optimal operating point (fixed speed and torque; minimum specific fuel consumption). The minute-level average output mechanical power of the engine and the average generated power of the corresponding generator set are dynamically and continuously regulated by performing the asymmetric bipolar rectangular pulse-width modulation (PWM) control on the constant output mechanical power generated by engine operation at the optimal operating point. The battery pack is allowed to work stably in one of the three working modes of Charge Sustaining (CS), Charge Depleting (CD) and Charge-Increasing (CI) or switch smoothly among the three working modes according to the three different cases that the difference between the minute-level road load average power and the average generated power is basically zero, significantly greater than zero, and significantly less than zero; by predicting the time-varying function of road load average power within the electronic horizon (at a hour level or 100 km level) of the vehicle dynamically and accurately (with sub-second level delay and kW-level granularity), the battery pack is enabled to work in the high-efficiency range (BLL<SoC<BUL) to the greatest extent to avoid the adverse situation that the power performance of ACE HDT is degraded because the charge level of the battery pack is basically exhausted (SoC<LRL), or the adverse situation that it is impossible to recover the regenerative braking charge level effectively because the battery pack is basically fully charged (SoC>URL); the generator set (engine+generator) and the battery pack jointly supply power to ensure that the driving motor can meet the vehicle road load power requirement in real time. The vehicle energy management is optimized to realize energy saving and emission reduction on the premise of ensuring the driving power performance of the ACE HDT. The most concise and effective PWM control strategy is as follows: the non-combustion idle point and the optimal operating point of the engine are fixed once selected, and a continuous and adjustable minute-level average generated power of the generator set is realized by dynamically adjusting the duty cycle $k_s$ of the instantaneous power bipolar constant amplitude pulse sequence (PWM) of the engine. Of course, the Intelligent Stop Start (iSS) function can also be expanded to other technical solutions for dynamic switching between the adjustable non-combustion idle point of the engine and multiple high-efficiency operating points (i.e., different optimal condition powers), but these adjustable multi-operating point iSS technical solutions are more complex, and their comprehensive cost effectiveness is not as good as that of the above-mentioned iSS technical solution with two fixed operating points. Since the regulating speed and accuracy of the speed and torque of the driving motor are one order of magnitude faster than that of the transmission, if the vehicle needs to shift gears in the series hybrid iSS mode, the driving motor (MG2) can complete the instantaneous torque interruption and fast speed synchronization easily to make the transmission shift gears smoothly even if the flexible coupling is not a clutch, and the gear shifting operation of the entire transmission is independent of the working condition of the engine.

Turbochargers are widely used in modern HDT diesel engines; the intelligent Stop Start (iSS) technology is applicable not only to the basic engine without the variable valve actuation (VVA) function and with a fixed geometry turbocharger (FGT), but also to the advanced engine with the variable valve actuation (VVA) function or a variable geometry turbocharger (VGT). Although there are obvious differences between the basic engine and the advanced engine in the high-efficiency range (size or shape) of the universal characteristic curve, dynamic characteristics (e.g., Turbo Lag and the like), price and other aspects, the brake specific fuel consumption (BSFC) or optimal output power of the two engines are basically the same, the ACE HDT equipped with the basic engine can achieve the same energy saving and emission reduction effect compared with vehicles equipped with advanced engines under various operating conditions and application scenarios with the help of the series hybrid intelligent Stop Start (iSS) technology for the ACE HDT; in other words, the ACE HDT greatly reduces the requirements for the technical sophistication and global performance of the engine compared with the traditional diesel HDT, so that the engine is no longer the bottleneck in the power performance or fuel consumption of the ACE HDT. The new China VI ACE HDT can still optimize both the vehicle power performance and fuel economy in the future on the premise of ensuring that the real driving environment (RDE) emission meets the standard stably within extremely challenging 700,000 km for the HDT even the new China VI ACE HDT is configured with a low-cost domestic basic engine. The optimal output power of most engines is between 55% and 85% of the peak power, and the specific fuel consumption (g/kWh) of the engine at full load (100%) or light load (under 30%) is significantly higher than the minimum value. In the universal characteristic curves of engines, the contours of specific fuel consumption (g/kWh) are a plurality of mutually non-intersecting irregular loop curves. The area contained in the global minimum contour of specific fuel consumption is called the optimal operating condition area, commonly known as the "Sweet Spot" of the engine, in which every point is the optimal operating condition point (specific speed and torque); the area contained in the contour with a specific fuel consumption equal to 105% of the minimum value can be called the high efficiency operating condition range (referred to as the high efficiency zone). Of course, the area of the high-efficiency range is larger than and completely includes the Sweet Spot. The speed corresponding to the Sweet Spot of most HDT engines is in the range of 95% to 125% of its base speed (referring to the speed at the peak torque point), and the corresponding torque is between 65% and 90% of its peak torque. The area of the high-efficiency range of the modern HDT engine (diesel or natural gas) Base Model is small, while the area of the high efficiency zone of the Advanced Model is large. The minimum specific fuel consumption of both engines at the Sweet Spot is up to 186 g/kWh. In order to continuously reduce the fuel consumption (L/100 km), the general trend of HDT engine research and development in Europe and America in recent decade is Down Size or Down speeding. The base speed of the engine (i.e., speed at the peak torque point) decreases from 1,200 rpm to below 1,100 rpm year by year, and even approaches 1,000 rpm. The ACE HDT can effectively decouple the complete vehicle condition from the engine condition in the series hybrid mode regardless of the specific application scenario. On the premise of ensuring the power performance of the complete vehicle, the ACE HDT allows the engine to be within its high-efficiency range for more than 95% of the time to avoid the engine running at full power load or low power load to the greatest extent and achieve the beneficial effect of optimized energy saving and emission reduction.

The intelligent power switching (iPS) control technology is described below. When the ACE HDT is in the parallel hybrid mode, the vehicle is driven by the engine directly, the engine speed is completely determined by the transmission gear position and vehicle speed and varies with time, the engine speed is a dependent variable, but the engine torque is still an independent variable that can be adjusted independently and dynamically; at this time, the intelligent Stop Start (iSS) control technology cannot be applied to the engine, and the intelligent power switching (iPS) control technology must be used. Operation in a parallel hybrid mode is preferred when the ACE HDT is running normally on a highway (the average running speed is higher than 50 km/h). The average road load power of the ACE HDT is basically greater than 35% of the engine peak power in road sections without long slopes, and the load condition is the medium-to-high load condition for most of the time; the instantaneous speed of the vehicle changes slowly with time in a narrow speed band, the speed change rate generally fluctuates within the range of plus or minus 10% of the average vehicle speed, so the change rate of the engine speed of the vehicle is also less than 10%; the absolute value of the acceleration is basically less than 5% of the gravitational acceleration g (i.e., 0.5 m/s$^2$), and the instantaneous output torque of the engine is still adjustable independently in a wide range at this time. The automatic gear shifting control strategy of the ACE HDT transmission enables the engine to always run stably in a narrow range (high-efficiency range) near the base speed (i.e., the speed at the peak torque point) under the high-speed condition, for example, between 1,100 rpm and 1,600 rpm. At this time, both the speed of the generator (GM1) and the speed of the driving motor (GM2) are proportional to the speed of the engine, and the instantaneous torques of the two motors are still separately and independently adjustable in a wide range, bipolar non-rectangular pulse-width modulation (PWM) or non-constant amplitude (i.e. non-rectangular) pulse-amplitude modulation (PAM) can be performed on the instantaneous mechanical power of the engine or the instantaneous electric power of the power-type battery pack (during charging or discharging) respectively to satisfy the vehicle dynamics equation (1-1) and the parallel hybrid power balance equation (3-3) in real time. Moreover, the average power function value (i.e., the rolling average value at the minute level) of the engine can also be regulated dynamically and continuously by adjusting the duty cycle of the PWM pulse sequence, so that the battery pack operates stably in one of the three working modes of Charge-Sustaining (CS), Charge Depleting (CD) and Charge-Increasing (CI) or smoothly switches among the three modes.

In the parallel hybrid mode, the pulse modulation (PM: containing PWM or PAM) is performed on the instantaneous output power of the ACE HDT engine to realize the "intelligent Power Switching" (iPS) control function. The specific technical measures are as follows: bipolar non-rectangular pulse-width modulation (PWM) is performed on the instantaneous output power function of the engine, the cycle of the pulse sequence is of a sub-minute level, the bipolar non-rectangular (i.e., non-constant amplitude) PWM pulse sequence can be divided into a high-state condition and a low-state condition in the same cycle, the low-state condition can be set as a line condition (the power is a negative number that fluctuates in a small range) when the engine is driven without combustion, the torque range of the condition curve is determined by a set of all subsystems on the vehicle that must obtain mechanical energy continuously from the engine in order to work normally, and the speed range is determined by the speed time function of ACE HDT and the transmission position; the high-state condition can be set as a line condition (the power is a positive number with small fluctuation) formed by connecting multiple operating points with relatively great power values in the minimum value range (i.e., in the Sweet Spot of the engine) of the brake specific fuel consumption (BSFC) within the fluctuation range of engine speed in the pulse cycle, the duty cycle $k_s$ is defined as the ratio of the high-state pulse time to the PWM pulse sequence cycle, which is arbitrarily adjustable between 0 and 1, while the proportion of low-state pulse time is equal to $1-k_p$; since the engine speed is subject to the vehicle speed, there is a small range of fluctuations in the PWM pulse cycle (at a sub-minute level), and both the high-state pulse and low-state pulse are non-constant amplitude (i.e., non-rectangular) pulses. In the series hybrid intelligent Stop Start (iSS) control mode, the time function of the instantaneous output power of the engine is a bipolar rectangular PWM pulse sequence, the non-combustion consumed power and the optimal generated power can be set as constants directly regardless of the dynamic conditions of the vehicle; however, in the parallel hybrid intelligent Power Switching (iPS) control mode, the time function of the instantaneous output power of the engine is a bipolar non-rectangular PWM pulse sequence. The specific shapes of the high-state pulse and low-state pulse are highly related to the dynamic conditions of the vehicle, and the top amplitude curve of PWM pulse will fluctuate slowly in a small range over time. In the parallel hybrid iPS mode, a power value with the same integral area (i.e., equal impulse) as the full high-state pulse sequence (i.e., with a duty cycle of 1.0) in one cycle is defined as "high-state equivalent power", which is a positive number greater than 50% of the engine peak power; a power value with the same integral area (i.e., equal impulse) as the full low-state pulse sequence (i.e., with a duty cycle of 0) in one cycle is defined as "low-state equivalent power", which is a negative number whose absolute value is less than 20% of the engine peak power, in the iPS mode, the average output power of the engine in a minute-level period of time is arbitrarily adjustable between the low-state equivalent power and the high-state equivalent power and changes slowly. According to the above-mentioned PWM control solution, the engine is allowed to switch between the high-state condition curve and low-state power consumption curve in the high-efficiency range of the universal characteristic curve of the engine in the vertical direction (i.e., constant speed, variable torque) smoothly back and forth through dynamic control of the fuel injection quantity (fuel cutoff or fuel injection) of the engine, and the battery pack is allowed to work stably in one of the three working modes of Charge Sustaining (CS), Charge Depleting (CD) and Charge-Increasing (CI) or switch smoothly among the three working modes through dynamic adjustment of the average value of the engine output power at a minute level in order to avoid the adverse situation that the power performance of ACE HDT is degraded because the charge level of the battery pack is basically exhausted (SoC reaches URL), or the adverse situation that it is impossible to recover energy from the battery pack because the battery pack is basically fully charged (SoC reaches LRL); then the engine, generator (MG1 and driving motor (MG2) provide collaborative driving to meet the vehicle dynamics equation (1-1) and the parallel hybrid power balance equation (3-3) in real time.

In the parallel hybrid mode of the ACE HDT, the engine, generator (MG1) and driving motor (MG2) are coupled with the driving wheel directly and mechanically. When the transmission position is fixed, the speeds of the engine, generator (MG1) and driving motor (MG2) are completely controlled by the independent variable, i.e., vehicle speed time varying function, and these speeds are the time-varying function of the dependent variable with second-level slow slight changes; the torque of the engine, generator (MG1) and driving motor (MG2) is the time-varying function of the independent variable with 100 millisecond-level rapid substantial changes; the instantaneous torques of the engine, generator (MG1) and driving motor (MG2) can be superimposed directly; the peak value of the total driving torque at the transmission input shaft of the complete vehicle can exceed 4,000 Nm, which is significantly higher than the peak torque of the largest 16 L diesel engine of HDT for long-haul freight (less than 2,800 Nm) in the world; so the parallel hybrid ACE HDT can work at the highest gear position of the transmission stably for a long time under the high-speed condition and rarely shift down due to insufficient peak torque when speeding up to overtake or running uphill. If sudden gear shifting, especially shift-down, is required during operation of the parallel hybrid ACE HDT, because the adjustment of the torque or speed of doable motors (MG1 and MG2) is nearly ten times higher than that of the engine, the engine fuel injection can be cut off at first at the moment of shifting, the engine enters the non-combustion low-state condition curve, both motors (MG1 and MG2) work in the driving mode to drive both the non-combustion engine and the vehicle, shifting to a new gear can be completed after variable speed synchronization within a second-level period of time without disengaging the clutch, and then the engine restarts fuel injection and combustion to do work and enters the high-state condition curve, no obvious driving torque interruption will occur to the ACE HDT during shifting in the parallel hybrid mode, the obvious sense of frustration during transmission shifting (especially during shift-down) of the traditional HDT with internal combustion engine is basically eliminated, and the Noise, Vibration and Harshness (NVH) performance of the complete vehicle is improved. In other words, in the parallel hybrid iPS mode, if shifting is required for the ACE HDT, the whole shifting operation must be completed in the low-state pulse part of the engine PWM pulse sequence (at a second level). Unlike the shifting operation (especially the shift-down operation) of the traditional HDT with internal combustion engine, the double motors (MG1 and MG2) provide collaborative driving at this moment without disengaging the clutch to realize instantaneous driving torque interruption and variable speed synchronization of the transmission input shaft and complete the shifting operation; it can not only reduce clutch wear and prolong the life of the clutch, but also improve the power performance and NVH performance of the complete vehicle during shifting. The parallel hybrid mode is preferred when the ACE HDT is running normally on the highway at the average speed of higher than 50 km/h with seldom active acceleration or braking. The output power of the engine in the parallel hybrid mode is mainly used to directly drive the vehicle. The generator and the driving motor can work in the same mode while being equivalent to a composition motor with higher peak torque and power, or they can obtain electric energy from the battery pack to drive the vehicle, or charge the battery pack and recover energy through regenerative braking. When the traditional HDT with internal combustion engine runs normally on a highway, the actual shifting frequency of the transmission mainly depends on the actual road longitudinal slope function, complete vehicle configuration parameters, vehicle driving conditions, and peak power or torque of vehicle driving. The larger the engine displacement is, the more sufficient the torque or power reserve is, and the lower the gear shilling frequency is; in the parallel hybrid mode of the ACE HDT, the vehicle driving torques or powers of the engine, generator and driving motor can be superimposed, and the total driving torque (greater than 3,500 Nm) or power (greater than 450 kW) of the engine, generator and driving motor is significantly greater than the driving torque or power of the 16 L HDT with diesel engine with top level configuration currently on the market. Therefore, the gear shifting frequency of the ACE HDT during parallel hybrid operation is significantly lower than that of all traditional HDTs with internal combustion engine. It can not only improve the power performance and NVH performance of the vehicle, but also prolong the life of the automatic shifting mechanism of the transmission; under some special road conditions, the generator and driving motor can also work in the opposite modes, one is the power generation mode, and the other is the driving mode. Of course, the intelligent Power Switching (iPS) function can also be realized through other technical measures, such as non-rectangular pulse-amplitude modulation (PAM) control over the instantaneous output power of the engine; ordinary technicians in the industry can draw inferences from one instance without creativity and think of a variety of equivalent technical solutions or measures of pulse modulation (PM) of instantaneous output power of the engine with the help of mature modem digital communication technology or digital signal processing technology; however, the system simplicity, overall cost effectiveness and other aspects or these technical solutions or measures are not as good as those of the above technical solutions of PWM. The fuel-saving robot of ACE HDT can also measure and calculate (with sub-second level delay and kW-level granularity) the road load instantaneous power time-varying function (i.e., road load instantaneous power) or road load average power time-varying function (i.e., road load average power) in minute-level rolling time of the vehicle on the highway during non-congested hours in a hour-level period of time in the future in real time according to the three-dimensional information (including longitude/latitude/longitudinal slope) of the road within the range of hundreds of kilometers of the electronic horizon, vehicle configuration parameters and dynamic operating data, and the predictive adaptive cruise control (PACC) sub-mode selected by the driver, and implement parallel hybrid intelligent Power Switching (iPS) on the engine. The engine average power function value (i.e., average function value in minute-level rolling time) is adjusted continuously through dynamic control of the duty cycle $k_p$ of the PWM sequence, so that the power-type battery pack works stably in one of the three working modes of Charge-Sustaining (CS) (the average power of the engine is basically equal to the average power of the road load), Charge Depleting (CD) (the average power of the engine is significantly less than the average power of the road load) and Charge-Increasing (CI) (the average power of the engine is significantly greater than the average power of the road load) or switches smoothly among the three modes; the battery pack is charged and discharged just in time (JIT) to ensure that the battery pack works in the high-efficiency range (BLL<SoC<BUL) to the greatest extent and try to avoid the battery pack entering the extreme condition of basically empty (SoC<LRL) or fully charged (SoC>URL); the engine, generator (MG1) and driving motor (MG2) provide collaborative driving to meet the vehicle dynamics equation (1-1) and the parallel hybrid power balance equation (3-3) in real time in order to achieve the optimal effect of energy saving and emission reduction.

With the ACE HDT in the parallel hybrid mode, the total driving torques of the motor, generator and driving motor can be superimposed linearly at the transmission input shalt, and the total peak torque can easily break through 4,000 Nm. At present, the peak torques of the 16 L HDT engines with the best configuration of mass-produced HDTs for long-haul freight in the world are less than 2,600 Nm, the maximum input torque of the transmission of the HDT is also less than 2,600 Nm, and the maximum torque at the transmission input shaft is mainly subject to the original design mechanical strength and life of the transmission, transmission shaft, or driving axle. In other words, the parallel hybrid ACE HDT can output more than 450 kW driving power (the sum of mechanical power and electric power) in total in an explosive manner within a minute-level short period of time even if it is only configured with an affordable and attractive basic engine (for example, with a displacement of 11 L to 13

L, a peak power of greater than 280 kW, and a peak torque of less than 2,500 Nm), a mainstream cost effective 100 kW-level generator (MG1) and a driving motor (MG2). The total peak torque exceeds 3,500 Nm, and the power performance of the parallel hybrid ACE HDT is significantly superior to that of the traditional 16 L engine HDTs (which have been mass-produced in the global market) with the best configuration. At present, all the maximum input torques at the input end of the mass-produced transmissions of commercial HDTs for long-haul freight are less than 2,500 Nm; the design of the existing HDT transmissions or other transmission subsystems should be re-enhanced in mechanical strength and life in order to adapt to the ACE HDTs; the peak torque at the input end of the transmission shall be increased to more than 3,000 Nm, and its top gear can also be reduced from 12 to 16 gears to 6 to 8 gears.

Generally, the existing control technology of hybrid vehicles includes the following seven operation sub-modes (also known as control sub-modes); a certain mode is applicable to either series hybrid or parallel hybrid unless otherwise specified; the switching between control sub-modes is infrequent, and the average switching interval is generally between the minute level and the 10-minute level 1) Pure battery-driven mode: At this moment, the engine does not work, and the battery pack works in the Charge Depleting (CD) mode and supplies power to the driving motor to meet the road load power requirements. At this time, the average power of the engine is significantly lower than the average power of the road load.

2) Pure engine-driven mode: At this moment, the vehicle is driven by the engine entirely and directly (parallel hybrid) or driven by the generator indirectly (series hybrid), and the battery pack is basically not involved in the work (i.e., without discharging; with regenerative braking charging), which belongs to a Charge-Sustaining (CS) mode. The engine power is basically equal to the road load power.

3) Mixed driving mode: The engine, generator, driving motor and battery pack drive the vehicle collaboratively. At this moment, the average power of the engine is basically the same as that of the road load; the battery pack performs peak load shifting on the road load instantaneous power through high-rate charging and discharging and works in the Charge-Sustaining (CS) mode.

4) Engine driving plus charging mode: In addition to fully meeting the road load power requirements, the remaining power of the engine charges the battery pack through the generator, and the battery pack works in the Charge-Sustaining (CS) or Charge-Increasing (CI) mode. At this time, the average power of the engine is significantly higher than the average power of the road load.

5) Regenerative braking mode: At this time, the road load power is a negative number t for going downhill or braking), the engine does not work, and the driving motor charges the battery pack through regenerative braking power generation to recover the kinetic energy or potential energy of the vehicle and decelerate the vehicle. At this time, the battery pack works in the Charge-Sustaining (CS) or Charge-Increasing (CI) mode. At this time, the average power of the engine is significantly higher than the average power of the road load.

6) Parking charging mode: At this time, the vehicle stops, and the road load power is zero. The engine power is used to charge the battery pack completely through the generator, and the driving motor does not work. At this time, the battery pack works in the Charge-Increasing (CI) mode. At this time, the average power of the engine is significantly higher than the average power of the road load.

7) Mixed charging mode: At this time, the road load power is a negative number (for going downhill or braking), the engine charges the battery pack through the generator, and the battery pack is also charged by the driving motor through regenerative braking. At this time, the battery pack works in the Charge-increasing (CI) mode. At this time, the average power of the engine is significantly higher than the average power of the road load.

The operation sub-mode of ACE HDT in the present invention is significantly different from that of the prior art set of the above-mentioned hybrid vehicle. Through the series hybrid intelligent Stop Start (iSS) control technology or the parallel hybrid intelligent power switching (iPS) control technology, various analog control measures of the other six control sub-modes except the parking charging electronic mode in the above-mentioned existing hybrid vehicle control technology against the mechanical power flow or electric power flow of hybrid vehicles are organically fused and digitized in a pulse cycle (sub-minute level) of the instantaneous power pulse-width modulation (PWM) sequence of the engine; through the pulse modulation (PM) control, especially the series hybrid iSS bipolar rectangular pulse-width modulation (PWM) control or the parallel hybrid iPS bipolar non-rectangular PWM control, of the instantaneous power of the engine of ACE HDT, the problem of analog control over the mechanical power flow or electric power flow when hybrid vehicles are running is transformed into a problem of digital control through equivalent pulse modulation (PM), the worldwide problem of optimization of energy saving and emission reduction of HDTs is solved with a new technical solution, so that the three key indicators of complete vehicle power performance, real driving environment (RDE) emissions and actual fuel consumption (L/100 km) of ACE HDT are significantly improved over the existing HDTs with internal combustion engines, and the overall fuel saving ratio (i.e., the proportion of drop of fuel consumption) is up to 30%; similar to the implementation of frequency conversion control or vector control for the upgrading of modern AC motors, the AC-DC-AC electric energy conversion plus computer control are implemented by using the electric and electronic power modules based on PWM control technology, so that significant improvement is achieved in motor performance and power saving compared with the fixed frequency control technology of the traditional AC motor. The remarkable technical features of the above-mentioned seven control sub-modes and other technical solutions of the engine Stop Start (SS) technology of fuel vehicles, engine Cylinder Deactivation (CDA) and hybrid vehicles in a set of the prior art include that: whether part or all of the engine cylinders perform combustion working (CDA), whether the engine operates by rotation (SS), and switching between different sub-modes is highly correlated with the instantaneous power of the vehicle road load; the technical solution of engine pulse modulation (PM) control of ACE HDT of the present invention includes the series hybrid intelligent Stop Start (iSS), parallel hybrid intelligent Power Switching (iPS) and intelligent Mode Switch (iMS); the significant technical features include that: the engine always rotates, and all the cylinders of the engine either perform combustion operation to do positive work, or perform non-combustion operation to do negative work, the classification method of different working sub-modes, the specific control method of mechanical power flow or electric power flow in each sub-mode and the power function generated are essentially different from those of the above set of the prior art, and the switching between different modes is only highly correlated with the average power function of the road load (i.e., the minute-level rolling time average) regardless of the instantaneous power function of the vehicle road load. Obviously, the series hybrid iSS or parallel hybrid iPS control technology not only retains the main advantages of the existing engine Stop Start (SS) and Cylinder Deactivation (CDA) (such as fuel saving, exhaust gas temperature control and the like), but also overcomes their main disadvantages (such as the interruption of the functions of air conditioning and refrigeration, increased complexity and cost of the system, reduced reliability and life of the system and the like) effectively, so that the Optimization of energy saving and emission reduction of ACE HDTs is achieved with higher cost effectiveness on the premise of no addition of any hardware. It should be emphasized that the series hybrid iSS control or parallel hybrid iPS control is applicable to the global complete vehicle condition of ACE HDT from the static condition to the maximum legal speed theoretically. However, when the average speed of ACE HDT is less than 25 miles/hour and active acceleration or braking is frequent (i.e., congested road conditions or urban conditions), the series hybrid iSS control has obvious advantages over the parallel hybrid iPS control in terms of the power performance of the complete vehicle and the effect of energy saving and emission reduction, so the series hybrid iSS control shall be the first choice.

Currently, the e-Coast technology is used for further fuel saving in some advanced HDTs with internal combustion engines in Europe and America. If the absolute value of the average road load power of the vehicle in a certain road section is less than the predetermined threshold (for example, the absolute value is less than 25 kW; the HDT is going down a gentle slope), the vehicle control unit (VCU) of the HDT can command the automatic mechanical transmission (AMT) to shift to a Neutral gear for coasting or disengage the Clutch-by-wire for coasting. At this time, the engine is decoupled from the input shaft of the transmission and the driving wheel mechanically, the torque is reduced at first, then the speed is reduced, and the operation is switched to the idle operating point, Relying on its huge inertia, the vehicle can still slide for some distance (at the mile or minute level) without driving at a basic constant speed to achieve the effect of fuel saving; when the absolute value of the average power of the road load exceeds a specific threshold (for example, the absolute value is greater than 25 kW), the VCU commands the engine to increase the speed again to synchronize the speed of the engine with that of the transmission, then the Clutch-by-wire is engaged, the transmission is put into gear again, and the normal driving mode or braking mode of the engine is restored. The engine of the HDT is at a low speed and a low load under the idle condition, with higher brake specific fuel consumption BSFC), and there is still fuel consumption and emission. At this time, however, the total fuel consumption is not high due to the low engine load (the power load rate is less than 15%), but the intensity of pollutant emissions will increase; fuel saving can be achieved when the HDT is sliding down a gentle slope in neutral gear (including coasting with the clutch disengaged), but the vehicle loses the engine braking function at this time, the burden of the mechanical braking system is significantly increased, and the vehicle also loses the capability of rapid acceleration, which is obviously detrimental to the active safety of driving; when a driver is going downhill in a MT HDT, the vast majority of fleets explicitly prohibit coasting in neutral gear to save fuel from the perspective of active safety of driving. Subject to the slow response speed of the engine, transmission and other mechanical systems, the mode switching interval of e-Coast is at the minute level, and it is difficult to switch back and forth with high frequency at second-level intervals; the e-Coast is only applicable to some sections of the roads where the HDTs for long-haul freight actually run, for example, the proportion of distance traveled is less than 35%, the actual fuel saving effect is not significant, and it is necessary to balance the contradiction between fuel saving during coasting in neutral gear and braking safety at any time; the e-Coast will significantly increase the cumulative number of gear shifts of the transmission or the cumulative number of clutch disengagement and engagement times, which has a negative impact on the service life of both the shifting mechanism and clutch of the transmission and may also affect the Noise, Vibration and Harshness (NVH) performance of the complete vehicle.

The engine conditions of zero fuel consumption and zero emission (i.e., series hybrid non-combustion idle condition or parallel hybrid non-combustion low-state electricity consumption condition) are contained in a distributed manner within each PWM pulse cycle of the instantaneous power function of the engine in the series hybrid iSS or parallel hybrid iPS control mode of ACE HDT. The following "intelligent mode switching" (iMS) control technology can also be adopted for further fuel saving. The specific technical measures to be implemented are as follows. The ACE HDT can calculate and predict the instantaneous power function of the road load and the average power function of the road load (sub-minute-level rolling time average) at an hour level in the future or in a 100 km-level road section with a kW-level granularity in real time (with sub-second level delay) according to the vehicle configuration parameters, dynamic condition data, priori 3D road data on the electronic horizon and other information; for road sections where the absolute value of the average power function of the road load is less than the set threshold (e.g., 50 kW), it is preferred to switch to the series hybrid iSS control mode for operation; for road sections where the absolute value of the average road load power is greater than the set threshold (e.g., 50 kW), it is preferred to switch to the parallel hybrid iPS control mode for operation. Obviously, the periodic low-state equivalent energy consumption of PWM in the series hybrid iSS mode is significantly lower than that in the parallel hybrid iPS mode. The former has lower energy consumption (i.e., electricity consumption) per unit distance, which is more beneficial to fuel saving; no matter in the series hybrid iSS mode or in the parallel hybrid iPS mode, the vehicle transmission is always put into gear for operation, coasting in neutral gear is avoided forever, so that consideration can be given to energy saving, emission reduction and braking effectiveness. The peak torque of the driving motor (MG2) is equal to that of the engine, but the adjustment of the motor condition (i.e., torque or speed) is one order of magnitude faster than that of the engine. No matter in the series hybrid iSS mode or in the parallel hybrid iPS mode, the driving motor (MG2) can provide the vehicle with 100 kW-level positive driving power or negative regenerative braking power through the transmission within the response time at a 10-millisecond level to not only optimize the fuel consumption and emission of the engine, but also completely avoid coasting in neutral gear, ensure braking safety, reduce the shifting times of the automatic transmission, and improve the Noise, Vibration and Harshness (NVH) of the complete vehicle; the actual fuel saving effect of intelligent mode switching (iMS) is significantly better than that of the existing e-Coast, and the iMS completely overcomes the negative impact of the latter on the life of the shifting mechanism, the life of the Clutch-by-wire, the NVH performance of the complete vehicle and other aspects due to the increase in the shifting times of the transmission, as well as the disadvantages of reduced braking effectiveness, increased brake pad wear and the like of the complete vehicle.

Similar to the tires and brake pads, the clutches of the traditional HDTs with internal combustion engines are Consumables, the core function of the clutch is on-off control over Torque Transfer between the engine and the input shaft of the transmission, and the clutch completes the speed synchronization between the engine and the transmission through the internal friction plate in the second-level transition state when the clutch is switched from a fully disengaged state to a fully engaged state; the normal service life of the clutch is significantly lower than that of the engine or transmission and is highly correlated with the driving style of HDT driver, and the clutch and brake are one of the focuses of daily operation and maintenance of HDTs; clutch replacement or repair not only costs a lot, but also affects the attendance rate of vehicles, which has always been one of the pain points in daily operation and maintenance of fleets. When the traditional HDT with internal combustion engine shifts gears on the way, especially at the time of Downshift, the clutch must be disengaged first to realize Torque Interrupt. Clutch engagement is started after shifting operation of the transmission is completed and the engine speed is increased at a low load rate. In a second-level transition period, the speed difference between the engine flywheel and the input shall of the transmission is eliminated by using the slip of the friction plate inside the clutch to realize speed synchronization of the engine and transmission. The engine operation at a high load rate can be restored to drive the vehicle only after the clutch is completely engaged; the whole shifting operation of the transmission is generally completed in a second-level period; it is inevitable that the friction plate of the clutch slips in varying degrees each time the clutch is engaged because it is difficult for the engine to regulate and control the speed quickly and accurately in the global working condition. Obviously, factors such as the frequent shifting of the transmission and the excessive speed difference or torque difference between the drive end and driven end of the clutch in the second-level transition period (i.e., before complete engagement) have a negative impact on both the clutch life and NVH of the complete vehicle. The modern AC motors realizes dynamic and precise control of the motor speed and torque through vector control, the velocity of motor speed control is nearly one order of magnitude higher than that of engine speed control, and a 100 kW-level motor can complete the instantaneous torque interruption and speed regulation synchronization (at the second level) necessary for transmission shift operation easily through Vector Control without any assistance from the clutch. The fuel-saving robot of ACT HDT of the present invention can command the dual-motor mixed hybrid powertrain to realize the function of Clutchless Gear Shift (CGS) of the vehicle, that is, the synchronous disengagement and engagement action of the clutch is not required during transmission shifting no matter in the series hybrid mode or the parallel hybrid mode of the ACE HDT, and the clutch is always in the fully engaged state (parallel hybrid) or fully disengaged state (series hybrid) throughout the transmission shifting operation (at the second level). The specific technical measures are as follows. When the ACE HDT operates in the series hybrid iSS mode in a steady state, the clutch is disengaged all the time, the engine and the transmission are completed decoupled, the electrical power split device (ePSD) can realize instantaneous driving torque interruption and variable speed synchronization of the input end of the transmission by commanding the driving motor through the vector control technology, enabling the transmission to complete the shifting operation smoothly. When the ACE HDT operates in the parallel hybrid iPS mode in a steady state, the clutch is always engaged, and the speed of the engine is synchronized with that of the double motors (MG1 and MG2) and that of the transmission. If the transmission needs to shift gears, the working condition of the engine can be switched and maintained in a PWM low-state pulse period (at the second level) by dynamically adjusting the duty cycle of the PWM pulse sequence of the engine instantaneous power function, and the engine is driven to run by the generator in the driving mode. At this time, the engine is equivalent to a small and medium-sized mechanical load with a power consumption of less than 50 kW, the 100 kW-level generator (MG1) and the driving motor (MG2) are at the same speed (coaxial connection) or fixed speed ratio (parallel axis connection), torques can be superimposed, and the total peak torque can be higher than 3,000 Nm. The electrical power split device (ePSD) can not only easily drive the non-combustion engine to run, but also realize the instantaneous driving torque interruption and variable speed synchronization of the input end of the transmission by commanding the coordination of the double motors (MG1 and MG2) through the vector control technology, enabling the transmission to complete the shifting operation smoothly (at the second level), and then the engine can switch to the PWM high-state pulse again.

When switching between the series hybrid iSS mode and the parallel hybrid iPS mode (i.e., intelligent mode switching; iMS), especially switching from series hybrid to parallel hybrid (i.e., the clutch is switched from a disengaged state to an engaged state), the engine is enabled to operate in the low-state pulse period (at the second level) by adjusting the duty cycle of PWM pulse sequence, the non-combustion engine doing negative work is driven by the generator (MG1) to realize the variable speed synchronization between the engine speed and the speed of the mechanical shaft of the driving motor or the speed of the input shall of the transmission, and then the clutch is engaged, Both speed and torque of the generator and the driving motor can be controlled dynamically and accurately, it can be ensured that both the generator (MG1) and the driving motor (MG2) can realize fast variable speed synchronization (Synchronize) under various vehicle conditions, the speed difference can be controlled within 2% strictly, so the wear degree of each engagement or disengagement of the clutch of ACE HDT is significantly lower than that of the clutch of the traditional HDT with internal combustion engine in the iMS control mode; obviously, the clutch of ACE HDT needs two steady states, normally engaged and normally disengaged, and the requirements in other aspects are the same as those of the clutch of the traditional HDT. In other words, a clutch disengagement or engagement operation is required only when the ACE HDT is switched between series hybrid mode and parallel hybrid mode; if the transmission needs to shift gears (in the series hybrid iSS mode or the parallel hybrid iPS mode) during steady-state operation of the vehicle, the Clutchless Gear Shift (CGS) control can be preferred without any operation of the clutch. A HDT with internal combustion engine for long-haul freight needs to complete hundreds of transmission gear shifts if it travels an average of 500 miles per day; the power performance (referring to the total peak power or peak torque of the complete vehicle) of ACE HDT is significantly better than that of all HDTs with internal combustion engines for long-haul freight, and the number of transmission gear shifts for a vehicle travelling 500 miles per day can be reduced by more than 50%; the number of daily average intelligent mode switching (iMS) control operations is only dozens of times; in addition, the Clutchless Gear Shift (CGS) function can basically eliminate the clutch engagement and disengagement operations caused by transmission shift. To sum up, through the Clutchless Gear Shift (CGS) and the intelligent mode switching (iMS), compared with the clutch of the modern diesel HDT (i.e., the prior art), the ACE HDT can reduce the cumulative number of engagement and disengagement operations of the clutch by more than 75%, increase the effective life (i.e., replacement mileage) of the clutch by more than 150%, significantly reduce the vehicle operation and maintenance costs, and improve the attendance rate. A pain point for the drivers and fleet in the daily operation and maintenance of HDTs is solved with high cost effectiveness on the premise of no addition of any hardware.

When the traditional HDT with internal combustion engine is running, the instantaneous power of the engine is proportional to the instantaneous power of road load of the vehicle, and both of the instantaneous powers are analog time-varying functions; when a computer-based simulation analysis is performed on the problem of optimization of energy saving and emission reduction of the vehicle, a single combustion working stroke of the engine cylinder needs to be taken as a basic unit to perform modeling analysis. Engine operation in all operating conditions of the universal characteristic curve is a very complex multi-variable non-linear systemic problem. The total time of a single combustion working stroke of the engine cylinder is less than 100 milliseconds. Up to now, human beings are still unable to realize high-fidelity computer real-time simulation ((at the 100 millisecond level) of the dynamic characteristics, specific fuel consumption and emissions of the engine by establishing a complete dynamic microscopic (molecular level) mathematical model or digital model with each 100 millisecond-level in-cylinder combustion chemical reaction as a basic unit at the level of combustion working stroke under the global surface working condition; human beings are also unable to collect the big data that can completely describe the problem of optimization of energy saving and emission reduction under the global working conditions of the engine at a single four-stroke micro level (suction/compression/combustion/exhaust) of the engine; the electronic control technology of fuel injection of the traditional internal combustion engine essentially takes the single combustion working stroke of the engine as the minimum basic unit to perform analog signal processing and analog electronic control on the analog time-varying function, i.e., engine instantaneous power.

By implementing the series hybrid intelligent Stop Start (iSS) control or parallel hybrid intelligent power switching (iPS) control on the instantaneous output power of the engine, the fuel-saving robot of ACE HDT can convert the complicated and changeable analog time-varying function of the instantaneous power of the engine and the analog time-varying function of the instantaneous power of the battery pack into two relatively simple pulse time sequence, i.e., a bipolar rectangular (series hybrid) or bipolar non-rectangular (parallel hybrid) pulse-width modulation (PWM) pulse time sequence and a non-rectangular pulse-amplitude modulation (PAM) pulse time sequence respectively and synchronously, convert the problem of vehicle driving power performance (instantaneous, time differential) or energy management (steady state, time integral) and other complicated problems of Analogue Signal processing and control into a relatively simple Digital Signal processing and control problem, and then solve the digital signal processing and control problem of optimization of energy saving and emission reduction of ACE HDT automatically and effectively relying on computer programs. Similar to the technological path evolution of upgrading of feature phones in the 1G/2G era to smart phones in the 3G/4G/5G era of the mobile communication industry, the fuel-saving robot of ACE HDT truly realizes a software defined and fully digital hybrid powertrain. It should be emphasized that any mainstream engine of HDT that has been mass-produced in the three major HDT markets in Europe and America, whether basic or advanced, can meet the performance requirements (steady or dynamic state) of ACE HDT for the engine in the present disclosure and generate the PWM pulse time sequence of the instantaneous power of the engine; the digital control technology (i.e., series hybrid iSS or parallel hybrid iPS) of engine power pulse modulation (PM) of the present invention greatly simplifies the engine from the global surface working condition to a two-point condition in a pre-settable Sweet Spot range or a two-line condition in the high-efficiency range, effectively shields the differences in steady-state performance, dynamic performance, fuel consumption, emissions and other aspects of HDT engines of various technical grades in the global condition range of the universal characteristic curve, so that the engine is no longer the bottleneck in the vehicle power performance and the actual energy saving and emission reduction effect of ACE HDT, and the system cost effectiveness of ACE HDT can be improved significantly Relying on 100 kW-level double motors plus 10 kWh-level power-type battery pack, the ACE HDT and the 100 kW-level large engine, which are two sets of mutually independent redundant powertrains, have complementary advantages to realize the optimization of vehicle fuel consumption and emissions on the premise of improving the vehicle power performance and active safety; moreover, the actual effect of energy saving and emission reduction of the ACE HDT is basically decoupled from the dynamic performance limit value (universal characteristic curve) of the engine of the ACE HDT in the global working condition range or the driver's driving level. Therefore, the fuel-saving robot of ACE HDT can also effectively solve the long-term pain point of the highway logistics industry that the actual fuel consumption of vehicles is highly discrete due to different powertrain configurations and different driving levels of drivers of traditional engine HDTs, so that each ACE HDT can achieve the optimization of energy saving and emission reduction of the vehicle with high consistency under the control of the fuel-saving robot and defeat human drivers.

Obviously, the change speed of 100 kW-level instantaneous power of the battery pack or motor is one order of magnitude higher than that of 100 kW-level instantaneous power of the internal combustion engine or that of 100 kW-level instantaneous power of the road load. Under the collaborative control of some combination of live electronic power modules (such as inverters 121, 122$a\&b$, choppers 132$a\&b$) in ePSD 123, the power-type battery packs 130$a\&b$ can track the dynamic change of the difference between the instantaneous power function of the road load and the instantaneous power function of the engine quickly and accurately to satisfy the series hybrid power balance equation (2-4) or the parallel hybrid power balance equation (3-3) in teal time. Corresponding to the bipolar rectangular or non-rectangular PWM pulse sequence of the instantaneous power of the engine 101, the pulse-amplitude modulation (PAM) time sequence of the charge-discharge power of the battery packs 130a&b is generated synchronously, the amplitude of the PAM sequence is continuously adjustable between the charge peak power (negative value) and the discharge peak power (positive value), the cycle is one tenth of the cycle of the engine PWM sequence, and the digital control of the instantaneous power analog time-varying function of the vehicle road load is completed. In other words, the problem of real-time control of the analog time-varying function of the road load instantaneous power of ACE HDT can be converted into the following equivalent problems: pulse-width modulation (PWM) control is performed on the instantaneous mechanical power of the engine at first, and pulse-amplitude modulation (PAM) control is performed on the instantaneous electric power of the battery pack synchronously; then a digital road load instantaneous power pulse sequence function (digital road load power for short) equivalent to the original road load instantaneous power analog time-varying function (original road load power for short) is generated by superimposing both powers according to the series hybrid power balance equation (2-4) or the parallel hybrid equation (3-3) to ensure that the vehicle dynamics equation (1-1) is satisfied in real time. Although there are subtle differences between the original road load power function and the digital road load power, they have the same impulse (i.e., the same time integral of power function); HDT driving is an inertial dynamic system. According to the impulse equivalence principle, both the digital road load power and the original road load power can satisfy the vehicle dynamics equation (1-1) in real time, and the same vehicle driving effect will be generated; obviously, the digital road load power is a composite pulse sequence function including an engine power PWM pulse sequence and a battery pack power PAM pulse sequence. Once the technical problem of energy management (steady state, time integral) or power management (instantaneous, time differential) of the ACE HDT for long-haul freight throughout a transportation event is completely digitalized through the series hybrid iSS technology, parallel hybrid iPS technology, intelligent mode switching (iMS), Clutchless Gear Shift (CGS), intelligent cruise control (iCC), predictive adaptive cruise control (PACC) and other combined technologies of the present invention, the "problem of optimization of energy saving and emission reduction of the complete vehicle" is converted into a Narrow AI problem that is completely equivalent to the problem "Computer Go" (such as Google's AlphaGo), and it is very suitable to solve the problem by the machine learning (ML) algorithm, especially a variety of Deep Learning algorithms; AlphaGo has defeated human players in the Go game, the fuel-saving robot of ACE HDT can also defeat human drivers in the specific vertical application field or optimization of energy saving and emission reduction of HDTs for long-haul freight and become the best assistant or co-driver of truck drivers.

The ACE HDT in the present invention can be configured with a plurality of motors, and at least two large automotive-grade motors with nominal power of more than 150 kW and independently and arbitrarily adjustable speed and torque are configured as standard devices. The main operation mode of one motor (MG1) is the power generation mode, which is referred to as the generator for short; the other motor (MG2) mainly operates in the driving mode, which is referred to as the "primary driving motor" or driving motor for short; of course, the generator can also operate in the driving mode, and the driving motor can also operate in the power generation mode (regenerative braking); an optional auxiliary driving motor (MG3) with a 100 kW-level nominal power can also be provided, the speed of the auxiliary driving motor (MG3) is proportional to that of the primary driving motor, and the torque is arbitrarily adjustable. The system architecture of the ACE HDT is a double-motor hybrid architecture, in which the generator in the hybrid position P1 is connected with the flywheel of the engine bidirectionally and mechanically (coaxial at equal speed, or parallel axes at constant speed ratio) to form a generator set (Gen Set); the driving motor in the hybrid position P2 is connected with the input shaft of the transmission bidirectionally and mechanically (coaxial at equal speed, or parallel axes at constant speed ratio), as well as the flywheel of the engine and the mechanical shaft of the generator through a clutch-by-wire of the HDT bidirectionally and mechanically. Obviously, the extended-range series hybrid HDT can be regarded as a special case of the above mixed hybrid ACE HDT when the clutch is normally disengaged or the clutch is cancelled, while the parallel hybrid vehicle can be regarded as another special case of the above mixed hybrid ACE HDT when the clutch is normally engaged, but at this time, the generator and driving motor at a fixed speed ratio can be equivalent to a larger motor, and the nominal power of the larger motor is the sum of that of the generator and that of the driving motor. It can be proved theoretically that the cost effectiveness or the Mixed Hybrid ACE HDT of the present disclosure is obviously higher than that of an extended-range series hybrid HDT or single-motor parallel hybrid HDT with the same configuration when the energy saving and emission reduction effect of the ACE HDT is optimized on the premise of ensuring the power performance and active safety of the complete vehicle in all operating conditions.

The ACE HDT further comprises a Global Navigation Satellite System (GNSS) which is a dual-antenna cattier phase real-time kinematic (RTK) differential receiver, capable of calculating the longitude, latitude, altitude, longitudinal slope, linear velocity and other parameters of a longitudinal road in the running process of the vehicle in real time; or a high precision single-antenna Global Navigation Satellite System, capable of calculating the longitude, latitude and linear velocity of the road at the meter-level positioning precision in the running process of the vehicle in real time; and combined with an inertial measurement unit (IMU) containing a dynamic roll-angle sensor, capable of measuring the longitudinal slope of a road in real time with the measurement accuracy of 0.1%. The vehicle control unit (VCU) or AIU of the ACE HDT is configured for predictive control over the generator set (engine+generator), clutch, driving motor, automatic transmission, ePSD and battery pack (collectively referred to as the "mixed hybrid powertrain") of the ACE HDT based on the longitude, latitude, longitudinal slope, vehicle speed and vehicle acceleration measured and calculated by the Global Navigation Satellite System (GNSS) in real time in the running process of the vehicle in combination with the priori 3D road information (longitude, latitude, longitudinal slope and the like) within the electronic horizon of the vehicle.

The power-type battery pack is one of the most expensive subsystems in the ACE HDT, and it is often one of the weaknesses in performance and life in various important subsystems of the complete vehicle. The three major problems of cost, performance and life of the power-type battery pack must be simultaneously solved in order to realize the large-scale commercial use of the ACE HDTs. The technical requirements for battery cell and battery pack of ACE HDTs are obviously different from the requirements of hybrid passenger vehicles. Firstly, the requirements for weight or volume of battery packs and the like are less strict, and there is basically no limitation; however, the requirements for resistance to high and low temperatures and vibration of the battery pack, especially for the cycle life under the high-rate charging and discharging (HRPSoC) condition and the like, are higher. The ACE HDT needs to be provided with the power-type battery pack with super long cycle life, low temperature resistance, safety, reliability and high cost effectiveness; its battery cell must withstand 5C-10C rate of continuous charge-discharge and 10C-25C rate of peak charge-discharge (10 s or 15 s pulse) under the condition of high-rate partial charge-discharge in the high-efficiency range (e.g., SoC 30%-70%), the battery cell should work under the most challenging high rate partial charge-discharge (HRPSoC) condition for a long time, its charge rate is often higher than the discharge rate, and a further challenge is posed on the weakness that the charging rate of lithium-ion battery cells is significantly less than the discharging rate currently; the working environment temperature outside the vehicle is −30° C.-+55° C., and the battery pack should work normally in a wide temperature range; the equivalent deep charge-discharge (DoD 100%) cycle life is more than 12,000 times. The battery pack shall be able to work normally after the vehicle is turned off for 24 hours outdoors at −30° C. in cold winter and the engine 101 is cold started, within three minutes of warm-up at idle speed in place, and after the vehicle is started to run; at the moment, the charge and discharge performance of the battery pack is allowed to be temporarily reduced. When the internal temperature of the battery cell rises to 10° C., the full charge and discharge ability is restored. However, it is not allowed to damage the battery cell permanently due to low temperature and high rate charging, reduce the cycle life, or even lead to the major hidden danger of thermal runaway of the battery cell.

Mainstream lithium-ion power cells, such as lithium iron phosphate (LFP) and ternary lithium (NCM of NCA and the like), are generally protected against cold. When the cell temperature is lower than 0° C., the high rate discharge (above 2C) ability of the cell decreases obviously and temporarily; when the cell temperature rises to more than 10° C., the discharge performance of the cell returns to normal, and the low-temperature discharge does not damage the cell permanently; however, high rate charging at low temperature (especially when it is less than 0° C.) inside the battery cell easily causes Lithium Plating on the carbon negative electrode of the cell and serious and permanent reduction of the cell life; the damage mechanism of the battery cell is mainly that the metallic lithium dendrites generated by the negative electrode lithium plating may puncture the diaphragm, which results in a short circuit in the cell and leads to the hidden safety danger of thermal runaway. The battery management system (BMS) will monitor the temperature of the battery cell in real time. It is forbidden to charge the battery cell at high rate at low temperature. It is difficult for the LFP, NCM or NCA mainstream automobile power cell to undertake the important mission of the ACE HDT battery pack alone. Different from the above-mentioned mainstream automotive-grade power battery cells, the phenomenon of lithium plating will never occur to the lithium titanate oxide (LTO; positive ternary lithium negative lithium titanate), which is the only mass-produced automotive power cell that can fully meet all the technical requirements of ACE HDT. Compared with the several mainstream lithium-ion cells mentioned above, the LTO cell has not only the obvious advantages of ultra long life, high safety, low temperature resistance, high-rate charging and discharging (HRPSoC), best performance and the like, but also the two obvious disadvantages of low specific energy (less than 65 wh/KG) and high cost (in $/kWh, about four times as much as that of LFP/NMC cell). There is no need to worry about the disadvantage of low specific energy of LTO and large volume because the ACE HDT basically has no rigid arrangement limitation on the volume, weight and the like of the battery pack with a total capacity of only dozens of kWh; however, the disadvantage of high cost will seriously affect the mass commercial use of ACE HDTs, so the total cost of the power-type battery pack system must be reduced in every possible way; according to the present invention, both the overall performance and cost of the battery pack of ACE HDT are optimized by connecting at least two 10 kWh-level power-type battery packs consisting of different electrochemical cells in parallel; this will be described in detail in subsequent embodiments sections.

The battery pack of the ACE HDT can work in three different modes: 1) In the Charge-Sustaining (CS) mode, both the instantaneous SoC and minute-level time average SoC of the battery pack are always maintained to fluctuate up and down and change continuously between the best upper limit (BUL) and the best lower limit (BLL) of the high-efficiency range of the battery pack; 2) In the Charge Depleting (CD) mode, the instantaneous SoC of the battery pack is always maintained to fluctuate and change continuously between the upper red line (URL) and the lower red line (LRL), and the average SoC (minute-level rolling time average) of the battery pack continues to decline between the upper red line (URL) and the lower red line (LRL) over time; 3) In the Charge-Increasing (CI) mode, the instantaneous SoC of the battery pack is always maintained to fluctuate and change continuously between the upper red line (URL) and the lower red line (LRL), and the average SoC of the battery pack continues to increase between the upper red line (URL) and the lower red line (LRL) over time. The best working range (also known as high-efficiency range) of the battery pack refers to the state of charge (SoC) between the best lower limit (BLL) and the best upper limit (BUL); in the best working range, the battery pack has the best performance during high-rate charging and discharging (HRPSoC) and has the longest actual equivalent cycle life (i.e., the ratio of the total throughput to the effective capacity of the battery pack) in the whole life cycle; when the SoC of the battery pack is high-rate partial state of charge (HRPSoC) operation between the lower red line (LRL) and the best lower limit (BLL) or between the best upper limit (BUL) and the upper red line (URL), although the battery pack does not has the best charge-discharge performance, no permanent damage will be caused to the battery cell. As a result, the cycle life is reduced. In the PACC technical solution of ACE HDT of the present invention, the charge-discharge power control strategy of the battery pack is closely linked with the mechanical power control strategy of the engine of ACE HDT and the control strategy of the total driving power (i.e., the sum of the effective mechanical power and the effective electric power of the closed loop) of the complete vehicle; the core of the power control strategy for the ACE HDT in the present invention is to decompose and convert the complex analog control problem of "complete vehicle power management" into two relatively simple pulse modulation digital control problems: one is the digital control problem of sub-second level "instantaneous power management", and the other is the digital control problem of minute-level "average power management"; in terms of instantaneous power (sub-second level) control, through series hybrid iSS control or parallel hybrid iPS control, the instantaneous electric power analog function of the battery pack and the instantaneous mechanical power analog function of the engine are converted into two Synchronized PAM pulse sequences and a bipolar PWM pulse sequence to satisfy the vehicle dynamics equation (1-1), series hybrid power balance equation (24), or parallel hybrid power balance equation (3-3) in real time; at this time, the instantaneous state of charge (SoC) time-varying function of the battery pack fluctuates continuously up and down between the lower ted line (LRL) and the upper red line (URL); in terms of steady-state average power (minute-level rolling average) control, by adjusting the amplitude of the above battery pack PAM pulse sequence or the duty cycle of the engine PWM pulse sequence dynamically and respectively, and implementing minute-level rolling time average operation on the above PAM pulse sequence or PWM pulse sequence respectively, the average power function value of the battery pack or the average power function value of the engine are dynamically and continuously adjusted respectively; the instantaneous power function of the road load and the average power function (minute-level time average) within the electronic horizon (hour level or hundred kilometer level) can also be calculated and predicted in real time (sub-second level time delay) with the kW-level granularity according to the vehicle dynamics equation (1-1), then the battery pack is enabled to operate stably in one of the three working modes of Charge Sustaining (CS) (the difference is basically equal to zero), Charge Depleting (CD) (the difference is obviously greater than zero) and Charge-increasing (CI) (the difference is obviously less than zero) or switch smoothly among the three working modes by dynamically adjusting the difference between the average power function of the road load and the average power function of the engine, and the power-type battery pack is enabled to work in the high-efficiency range stably lot a long time to the maximum extent in order to seek the maximization of the regenerative charge turnover rate of the battery pack and the minimization of the charge turnover rate of the engine and achieve simultaneous optimization of multiple beneficial effects of power performance, safety, energy saving and emission reduction and the like of ACE HDT.

There are two kinds of charges stored in the battery pack of ACE HDT: one is the high-cost charge from the direct generation of electricity of the engine, i.e., "Engine Charge", and the other is the quasi-zero-cost charge recovered from the regenerative braking of the driving motor, i.e., "Regen Charge"; obviously, the Regen Charge is also originated from the engine indirectly. The power control strategy (equivalent to the energy management strategy) for the fuel-saving robot of the ACE HDT in the whole Freight Event has two key points: the first is to maximize the total charge throughput (kWh) of the battery pack for driving the vehicle; the second is to maximize the proportion of Regen Charge in the total charge while reducing the proportion of Engine Charge in the total charge as far as possible. Obviously, the total charge is equal to the sum of Regen Charge and Engine Charge, and the dimensions of the three charges are kWh. The ratio of the total charge throughput to the effective capacity of the battery pack is the total charge turnover rate, the expression "optimization of energy management" or "optimization of energy saving and emission reduction" of ACE HDT in the present invention can refer to either the technical problem to be solved, or the technical effect achieved by solving the above technical problem (i.e., minimization of fuel consumption); the predictive adaptive cruise control of ACL HDT (i.e., PACC function of Level I fuel-saving robot) is a technical solution for achieving the beneficial effect of minimization of fuel consumption, and it is a collection of various specific technical measures in the present invention. PACC is essentially the complete-vehicle dynamic power control strategy of ACE HDT. One of its cores is to seek the maximum value of regenerative charge turnover rate and the minimum value of engine charge turnover rate on the premise of improving the total charge turnover rate of the battery pack in each freight event as far as possible.

The VCU can be configured for calibrating built-in clocks, including the built-in clocks of the VCU, of subsystem microprocessors based on the precise time service of the GNSS receiver in real time, and annotating the dynamic operation data of the complete ACE HDT and all subsystems associated with the traverse or longitudinal control of vehicle driving by using the system time sequence with unidirectionality and uniqueness to perform measurement, calculation and storage with a sampling frequency of higher than 5 Hz; aligning and assembling into a data set the configuration parameters and/or dynamic condition data including at least two subsystems of the GNSS receiver, the map unit, the engine, the generator, the ePSD, the clutch, the driving motor, the automatic transmission and the battery pack on the first dimension; calibrating, aligning or arranging a plurality of data sets on the second dimension according to the system time sequence to form structured big data (i.e., fuel saving data set) about the operation of ACE HDT, which is used to describe the dynamic operating condition of ACE HDT, specially focusing on energy saving and emission reduction of vehicles and automatic driving safety; optionally, in order to protect the privacy and trade secrets of drivers and fleets, the dedicated structured big data is desensitized and encrypted, and uploaded in a safe way to the cloud computing platform for storage through the mobile internet in real time (sub-second level delay) or in time (hour-level time delay) afterwards for subsequent big data analysis and processing.

The VCU can also be configured for real-time control over at least one of the engine, the generator, the battery pack, the ePSD, the automatic transmission and the driving motor correspondingly based on at least one of a priori road longitudinal slope distribution function of 3D map within the electronic horizon, vehicle GNSS positioning, a digital model of the universal characteristic curve of the engine, a digital model of charge-discharge characteristics of the battery pack, a digital model of transmission characteristics, and a digital model of universal characteristics of the driving motor.

The VCU can also be further configured for commanding a collection of many on-board sensors and microprocessors for real-time collection and local storage of the structured big data (i.e., fuel saving data set) of the operation of ACE HDT in the running process of the vehicle; and sending and storing the stored fuel data set stored onboard to the remote cloud computing platform via a wireless mobile Internet in real time (sub-second time delay) or in time (hour-level time delay) for subsequent cloud analysis and processing. On the cloud platform, the deep learning algorithm, the cloud platform computing power and the fuel saving data set of many ACE HDT clusters are integrated to train the cloud AI brain (i.e., AI training chip) of the fuel-saving robot of ACE HDT, establish a deep neural network (DNN) model of the fuel saving algorithm, and download or push through over-the-air (OTA) the default fuel saving algorithm for specific freight events to the designated ACE HDT, then the local real-time reasoning operation is performed by the vehicle AI brain (i.e., AI reasoning chip) to optimize the fuel consumption and emission of the vehicle According to a specific ACE HDT and a specific freight path combined with the big data of the operation of all ACE HDTs on the same path in history, the cloud AI brain quickly calculates the default optimal fuel saving power control plan for the vehicle running on the path and downloads and pushes the plan to the vehicle, and then the vehicle AI brain performs local reasoning and calculation and corrects the power control strategy in real time according to specific vehicle and road conditions to achieve the optimization (i.e., minimization) of fuel consumption (L/100 km) and emission of the vehicle.

The after-treatment system (ATS) of the China VI diesel engine of the HDT and the modern diesel engine of the HDT in Europe and America use basically the same technical route, and consist of three subsystems: diesel oxidation catalyst (DOC), diesel particulate filter (DPF) and selective catalytic reducer (SCR) for eliminating nitrogen oxides (NOx), which are connected in series successively in proper order from front to back. The high efficiency temperature range for catalyst emission reduction conversion is generally between 250° C. (Celsius degree) and 550° C. Under the medium and high-load conditions, the exhaust temperature of the diesel engine is generally 250° C.-500° C., and the ATS is in the high-efficiency range to facilitate emission reduction; during cold start (which means that the surface temperature of the catalysts inside the after-treatment system is below 100° C.) or low-load operation of the engine, the exhaust temperature of the engine is significantly lower than 250° C., the surface temperature of various catalysts in the after-treatment system cannot reach 250° C. (a threshold in the high-efficiency range, i.e., the so-called Light-off Temperature) rapidly, and at this time, the conversion efficiency of the catalysts is not high (e.g., less than 50%), and the emission pollution of pollutants (particles, NOx and the like) is high. A large portion of the accumulated emission pollution from the vehicle comes from the cold start of its engine, low-load idle, and other instantaneous states of sudden changes in speed and torque; how to satisfy the regulatory limitations on pollutant emissions under the real driving environment (RDE) of vehicles stably for a long term within t lie warranty scope of 700,000 km of the ATS is another technical problem to be solved effectively for the new China VI HDT.

The modern diesel HDT controlled by the On-Board Diagnostics-II (ODD-II) module for monitoring the vehicle exhaust emission in real time must stop to complete Active Regeneration of the DPF system and remove carbon particles deposited in the DPF every once in a while (at the 100-mile or 1000-mile level); the frequency of Active Regeneration (times/100 km) mainly depends on the configuration parameters of the vehicle and its mainstream Duty Cycle; the Active Regeneration of DPF is both time consuming (idling stop of diesel engine for about 30 minutes) and fuel consuming with useless work, which has always been one of the pain points for European and American HDT drivers and transportation companies, and will also become one of the pain points for Chinese drivers and fleets using new China VI HDTs.

The mixed hybrid ACE HDT of the present invention can set the engine at its combustion high-efficiency range or optimal operating point stably for a long time throughout its operational life cycle by implementing the series hybrid intelligent Stop Start (iPS) and the parallel hybrid intelligent power switching (iPS), and can reduce the active regeneration frequency by more than 80% compared with the single-motor parallel hybrid HDT or the traditional diesel HDT; it can also ensure that the surface temperature of catalysis inside the emission after-treatment system falls within the efficient conversion temperature range (higher than 250° C.) stably for a long time while optimizing the vehicle fuel consumption, so that the number of cold start times of the engine of ACE HDT is reduced by more than 75% compared with the single-motor parallel hybrid HDT or traditional diesel HDT; it can not only reduce the fuel consumption, but also reduce the pollutant emission in the actual operation of HDTs to meet the Real Drive Emission (RDE) requirements under actual driving in the China VI emission regulations stably for a long time.

As described above, the overall fuel consumption (L/100 km) of the double-motor single-clutch mixed hybrid HDT of the disclosure in the application scenarios of long-haul freight can be reduced by 30% compared with that of the traditional HDT with engine, and the former has better power, active safety and RDE emission compliance. Also, the mixed hybrid HDT has more advantages in fuel saving, power, active safety, cost competitiveness, etc., compared with the extended-range series hybrid HDT.

The fuel-saving robot (VCU and Ali) of ACE HDT of the present invention can predict the space-time function of road load power in the electronic horizon with a refresh frequency of higher than 1.0 Hz and a kW-level granularity according to the priori road 3D data (longitude, latitude, longitudinal slope), vehicle configuration parameters, dynamic operation data (total mass, rolling friction coefficient, wind resistance coefficient, vehicle speed, vehicle acceleration, real-time positioning and the like) and other information within the electronic horizon, as well as the vehicle dynamics equation (1-1), then generate and execute the vehicle power control strategy automatically in real time (sub-second level) at the vehicle end according to the machine learning (ML) algorithm focusing on energy saving and emission reduction, and command the mixed hybrid ACE HDT to implement a series of combined control technologies such as series hybrid iSS or parallel hybrid iPS, intelligent mode switching (iMS), Clutchless Gear Shift (CGS) or intelligent cruise control (iCC) dynamically, so that both the engine and battery pack can work in they high-efficiency ranges stably for a long time on the premise of ensuring the power and active safety of the vehicle, so as to achieve the optimization of actual energy saving and emission reduction effect of ACE HDTs, especially the minimization of overall fuel consumption; a collection of the various technical measures mentioned above is defined as a technical solution or function of "Predicative Adaptive Cruise Control" (PACC) of the ACE HDT. Compared with the traditional HDT with internal combustion engine, the fuel-saving robot of ACE HDT can reduce the actual fuel consumption by more than 25% through the technical solution of PACC under the same path, the same load and the same freight time, the fuel saving effect is highly consistent and basically decoupled from the level of ACE HDT human drivers and the ultimate performance of the engine. Obviously, the technical solution of PACC can realize the longitudinal L1 automatic driving function of ACE HDT; In the present disclosure, PACC can represent not only the specific technical solution, but also the L1 automatic driving function that can be realized by the technical solution; PACC is the cornerstone function of Level I-V fuel-saving robots of ACE HDTs. Within the ODD for highways, the PACC function (i.e., vehicle longitudinal control) plays a decisive role in terms of the energy saving and emission reduction of vehicles, the weight coefficient is as high as 98%, and the weight coefficient of vehicle lateral control is only 2%, which is basically negligible; however, the PACC function still plays an important role in terms of active safety of vehicle driving, with a weight coefficient of 65%, while the weight coefficient of vehicle lateral control increases to 35%, and both are almost of equal importance; the longitudinal control and lateral control (with a weight coefficient of 50% for each) are equally important within the ODD for urban open roads in terms of active safety of vehicle driving.

Currently, all countries in the world use basically the same Metrics to measure the vehicular traffic safety. Among the Metrics, Fatality Rate (FaR; person-time/100 million miles) and Injury Rate (InR; person-time/100 billion miles) are two most important and commonly used Lagging Indicators. The USA has the most comprehensive and open government traffic accident database in the world, which provides detailed data and analysis reports for the public. Only by comparing the Lagging Indicators such as Fatality Rate (FaR) and Injury Rate (InR) of HAV and manned vehicles in the real driving emission (RDE), the HAV product provider, the government, the public, insurance companies, courts and other road traffic safety stake-holders can exercise their judgment based on real and sufficient statistical data, decide whether to amend relevant laws and regulations, and allow the HAV to be put into commercial use within its Operational Design Domain (ODD).

The first key point of HAV Value Proposition is that AI drivers can significantly reduce more than 90% of road traffic accidents caused by human drivers' errors. However, it is only a vision or assumption that AI drivers (i.e., L3 or L4 system) are safer than human drivers who drive vehicles within the ODD, which has not been supported by sufficient statistical data, let alone fact or truth. The active safety and reliability of HAV driving are based on the Metrics of two mutually orthogonal dimensions; the first dimension is the safety and reliability of the physical information system of the vehicle, for example, the steering system, braking system, powertrain, tire, electronic control unit and the like. Based on modern physics, all elements are lifeless and unconscious, which belongs to a pure engineering technology problem with certainty and predictability; at present, there is a full set of mature technical standards and validation methods in the global automotive industry; the second dimension is the safety and reliability of the AI driver's performance of the dynamic driving task (DDT), which is a complicated ecological and social system problem rather than a pure engineering technology problem based on the dynamic interaction and collaboration among the AI drivers and other road users (especially other human drivers) and road infrastructure, as well as the evolution of human brain over tens of thousands of years. In this problem, many elements are both live and conscious. This problem is a mixture of technical and social problems full of uncertainty (i.e., randomness) and unpredictability, rather than having certainty and predictability. At present, a set of mature technical standards and validation methods for the safety and reliability of HAV AI drivers when performing dynamic driving tasks (DDTs) is not available in the global automotive industry yet. How to statistically prove with high confidence that AI drivers are safer and more reliable than human drivers in performing DIYs without increasing additional traffic risks to existing Road Users, especially vulnerable road users, before the HAV is approved for commercial use in batches is a worldwide problem that "Did the chicken come before the egg". At present, there is no effective solution that is technically and commercially feasible in the world.

A research report of the RAND Corporation (RAND) in 2016 described how many miles of driving (i.e., the number of samples) of the 3R Test (Real Vehicle/Real Road/Real Load) would it take to demonstrate the safety and reliability of HAV through statistical reasoning. Nidhi Kalra, Driving to Safety: How Many Miles of Driving Would It rake to Demonstrate Autonomous Vehicle Reliability?, RAND Corporation, 2016. According to the report, statistical reasoning is made with the statistical confidence of 95% by using the Fatality Rate (FaR) of manned vehicles of 1.09 person-times/100 million miles and the Injury Rate (InR) of 77 person-times/100 million miles in America in 2013 as the benchmarks. If the HAV can really be perfect (i.e., zero casualty, no traffic accident), then the HAV needs to travel 275 million miles to demonstrate that the level of Fatality Rate (FaR) is the same and 3.9 million miles to demonstrate that the level of Injury Rate (InR) is the same; but in fact, the HAV cannot be perfect. It will involve traffic casualties or accidents. At this time, the HAVs need to travel 8.9 billion miles to demonstrate that the levels of Fatality Rate (FaR) are the same and to travel 125 million miles to demonstrate that the levels of Injury Rate (InR) are the same. Most of the above-mentioned traffic accident data is based on passenger vehicles; the FaR and InR data of HDTs for long-haul freight is at the same order of magnitude as the above-mentioned traffic accident data, and the difference ratio is less than 50%. In other words, to demonstrate that the safety of HAV HDTs is basically the same as that of ordinary HDTs driven by humans (i.e., basically the same FaR and InR), 3R Test data for more than 10 billion miles needs to be accumulated for HAV when FaR is taken as the measurement baseline; 3R Test data for more than 100 million miles needs to be accumulated for HAV when InR is taken as the measurement baseline. Although both computer simulation and closed cat-test location testing are necessary means of Verification & Validation in the R&D process of HAVs, neither of them can shake the irreplaceable core status of 3R Test in the link of HAV Validation. The cumulative mileage and cost required for the Validation of Safety/Reliability of automatic driving of HA Vs are nearly a thousand times (i.e. three orders of magnitude) higher than those required for the Validation of Safety/Reliability of L2 vehicles (physical information systems with certainly and predictability), so it is called Big Validation: the Big Validation of Safety and Reliability of AI drivers of HAV HDTs is essentially validation of the difference between AI drivers and human brains that have evolved over tens of thousands of years in completing dynamic driving tasks (DDTs), as well as the AI drivers' comprehensive capacities of dynamic interaction and collaboration with a large number of human road users, so the Big Validation is a mixture of technical problems and social problems without a complete mathematical model, which has uncertainty and unpredictability; obviously, the resources (staff, funds and properties) for completing the Big Validation of the above-mentioned autonomous driving system of HAV HDT are nearly a thousand times higher than that consumed for validation of the safety and reliability of L2 ADAS system. In other words, the real difficulty in the commercialization of HAV HDTs is not the engineering development of L4 system, but the Big Validation that it must pass before commercialization.

The 3R Test for validation of HAV Robo-taxi can be performed on an urban or suburban road with a circumference of 100 miles, but the 3R Test for Big Validation of HAV HDT for long-haul freight is statistically significant only if it is performed on highways nationwide. In addition to the time and money consuming challenge, a bigger challenge for the Big Validation of HAV HDTs is that the 3R Test of HAV HDTs may bring this pair of irreconcilable contradictions—additional huge risks and requirement of the government and the public for ensuring road traffic safety—to the vehicles driven by the vast majority of human drivers on highways. For HAV HDTs running on highways, almost all other vehicles are Vulnerable Road Users because the volume and weight of HDTs are one order of magnitude higher than that of passenger vehicles; for the vast majority of existing road users, both the perceived and actual traffic risks are likely to rise temporarily during tests of HAV HDTs on highways due to the huge size and weight of HDTs relative to passenger vehicles; the Public will not agree to become lab rats or vulnerable road users in the process of 3R Test of HAV HDTs passively before sufficient statistical data is available to demonstrate the safety and reliability of HAV HDTs; Governments around the world are very cautious about highway tests of HAV HDTs. By the first quarter of 2020, there is no central government in any country in the world that allows HAV HDTs to carry out the 3R Test of L3/L4 system on highways nationwide, regardless of whether there is a Safety Driver in the vehicle. In California, the pacemaker of HAV R&D in the world, the 3R Test of HAV HDTs on public roads in California is still prohibited by explicit order currently according to California law although more than 50 enterprises are carrying out the 3R fest of HAV passenger vehicles on Public Road; at present, the Chinese government does not permit the mixed running of HAV HDTs with social vehicles on highways to carry out the 3R validation test of L3/L4 system either. In other words, for the commercialization of L4 passenger vehicles such as regional Robo-Taxi, the main technical and commercial difficulty is the low cost (thousands of dollars level/vehicle) for product R&D and mass production of L4 system, there is no regulatory barrier for Big Validation, and the problem of cost and time consuming can be solved; however, with the commercialization of L4 heavy duty trunks for long-haul freight, the high cost for product R&D and mass production of L4 system is no longer a difficulty, while the current regulatory barrier and huge cost and time consumed for Big Validation have become an insurmountable gulf. The problem of "right of way" for the test or commercialization of HAV HDTs on public roads is a difficult problem that must be solved before the HAV HDTs are put into commercial use in batches. For governments in the world, the public and other road traffic safety stake-holders, the right of way of HAV HDTs should be obtained by "Earn" rather than "Request"; the developers of HAV HDTs, whether they are OEMs, Tier One suppliers, or scientific and technological enterprises, shall not "assume" that the L4 system is safer and more reliable than human drivers, request the right of way from the governments in the name of innovation encouragement at first, and turn the existing highway users into "mice" in the 3R Test of HAV HDTs; instead, they should demonstrate statistically that the HAV HDTs are not unsafe and unreliable by completing the 3R Test of L2 ADAS system in a shadow mode at the hundred million-mile level as permitted by the current traffic regulations, and earn from the government the right of way for the 3R Test of L3 system in a detached mode.

Under the regulatory framework of current traffic laws and regulations in all countries around the world, the only way is to reduce the dimension of the L4 autonomous driving system configured in HAV HDT into an L2 ADAS system. The 3R Test of L2 system in the shadow mode or business operation can be performed on highways nationwide provided that each HAV HDT is equipped with at least one Safety Driver with a Commercial Driver's License (CDL) to accumulate real road traffic safety data; the 3R Test of L3 system within ODD for highways can be carried out after the public understanding and the government approved right of way are obtained gradually by communicating with the government and the public continuously and effectively and demonstrating that the 3R Test of L3 system of HAV HDTs on highways is "not unsafe" with the 3R Test data at the hundred million-mile level and the Disparity Report. In addition to the legal barriers for the ACE4 HDTs in carrying out the 3R rest of L3 or L4 system within ODD for highways in North America, another huge challenge is that the Variable Cost per unit of 3R Test of L4 HDT exceeds USD 1.0/mile (mainly refers to driver's pay and fuel fee), about three times as much as the variable cost of the 3R Test of L4 passenger vehicles; the 3R Big Validation of the safety and reliability of the L4 autonomous driving system at the billion mile level should be completed for ACE4 HDT %, and the validation cost alone can be as high as one billion dollars, which is nearly 100 times higher than that for developing a new traditional HDT; the total variable cost of the annual 100,000 mile-level 3R validation of a single vehicle is more than 100,000 dollars, which is also much higher than the total cost of L4 system hardware and software of the same vehicle (within 30,000 dollars).

According to the current laws and regulations in America and Canada (i.e., North America), ACE2 HDTs can directly enter the mass production and commercialization (Deployment) stage in North America after the million mile-level 3R Test for complete vehicle validation including L2 ADAS system is completed for ACE2 HDTs in the product Development stage; obviously, human drivers are always fully responsible for traffic safety when ACE4 HDTs are running; however, the preliminary product validation (million mile-level 3R Test) completed in the product Development stage of ACE4 HDT can only demonstrate the safety and reliability of the physical information system of the vehicle, and it is impossible to demonstrate the safety and reliability of IA AI drivers' performance of the dynamic driving task (DDT) within the ODD for highways at all; in addition, the 10 billion mile-level Big Validation of the safety and reliability of performance of DDT by L4 AI drivers of HAV HDTs needs to be completed through the intermediate link of the initial mass production and Demonstration stage before the government and the public are persuaded by sufficient statistical data to agree to amendments to relevant laws and regulations and the L4 AI drivers and human HDT drivers are granted the same right of way to enter the Deployment stage of commercialization of the Level IV fuel-saving robot of ACE4 HDT; obviously, the ACE4 HDT can not only optimize the power, safety and energy saving and emission reduction effect of vehicles simultaneously, but also greatly improve the labor productivity and freight timeliness of human drivers. In the product development stage, there is no material difference between the L4 system of passenger vehicle and the L4 system of HDT, especially in the hardware, software and perception-decision-control AI algorithm level; however, in the demonstration stage (i.e., big validation stage), for road traffic safety stake-holders such as the government and the public, since the volume and weight of HDTs are one order of magnitude higher than those of passenger vehicles, for existing road users and the public, the subjective safety and objective safety of L4 HDTs are greatly different compared with those of L4 passenger vehicles during big validation of L3 or L4 AI drivers within the ODD for highways, and we must treat them differently and act cautiously. There are two types of indicators for measuring the safety and reliability of operation of HAV HDTs: 1) the first type is a Leading Indicator, which refers to inclusion of the Disparity Number (time/thousand mile) or disparity mileage (mile/time) in the shadow mode, and the disengagement number (time/thousand mile) or disengagement mileage (mile/time) in the detached mode and other Proxy Measures, with the characteristics of moderately Valid, moderately Reliable, highly Feasible, moderately Non-manipulatable, and the like; 2) the second type is a Lagging Indicator, which refers to inclusion of the actual road traffic Injury Rate (InR; person-time/100 million miles) and Fatality Rate (FaR; person-time/100 million miles) and other Outcome Measures, with the characteristics of highly Valid, highly Reliable, moderately Feasible, highly Non-manipulatable, and the like.

According to the classification and definition of the autonomous driving system in the SAE J3016 standard, within the Operational Design Domain (ODD), the L2 ADAS system is responsible for Driving Control (i.e., continuous longitudinal and lateral driving control of the vehicle), and the human driver is responsible for perception and decision-making (i.e., Object and Event Detection and Response; OEDR). As a DDT Fallback, the human driver is allowed to perform "feet off" or "hands off", but not allowed to perform "eyes off" or "mind off", and should be always ready to take over the dynamic driving task (DDT=Control+OEDR) within 1 second; the L3 system can complete a full set of dynamic driving tasks (DDTs), the human driver as the DDT Fallback is allowed to perform "feet of", "hands off" and "eyes off", but not allowed to perform "mind off", and should be always ready to take over the dynamic driving task (DDT) within 15 seconds; the L4 system can complete a full set of dynamic driving tasks (DDTs), the L4 system has its own DDT Fallback, and the human driver is allowed to perform "feet off", "hands off", "eyes oft" and "mind off", leave the driver's seat, and take a rest behind the cockpit. Unless otherwise specified, the default Operational Design Domain (ODD) of the fuel-saving robot of ACE HDT is a closed highway.

In the ISA, the maximum Hours of Service of HDT drivers, like civilian pilots, are restricted by mandatory regulations. The specific requirements of federal regulations on Hours of Service (HOS) for HDT drivers in the USA are as follows: the driver can only work for 14 hours at most every day (24 hours) from ignition of the HDT engine, wherein the driving time is 11 hours at most, then the driver must leave the driver's seat and take a test for 10 hours before restarting the next 24-hour cycle. From 2018, all HDTs in North America (the USA and Canada) must use government certified electronic logging devices (ELDs) to record the operation of HDTs in real time and avoid the disadvantage that paper HOS records can be modified artificially. Heavy duty truck drivers are professionals who must have commercial driver's licenses (CDLs), and they account for less than 3% of all the people having passenger vehicle driver's licenses. Different from the high proportion of Team Drivers operation in HDTs for long-haul freight in China, the proportion of Team Drivers in HDTs for long-haul freight in the USA is far less than 10%, and most of the HDTs for long-haul freight in the USA are configured with a single driver. The driver's pay and fuel fee are cost factors with the highest proportion (about 40%) and the second-highest proportion (about 25%) in the total operation cost of HDT's for long-haul freight in the USA, and the total proportion of both cost factors in the fleet operating cost is as high as 2/3. Based on the existing legal and regulatory systems for the commercial operation and supervision of HDTs for long-haul freight in the USA, the actual driving time of human drivers may be increased by one to three hours per day (equivalent to improvement of drivers' labor productivity by 9%-27%) by obtaining Special Waiver from the government's HOS regulations in the commercialization stage of L3 HAV HDTs; once L4 HAV HDTs are approved by the government for commercial use, if a human driver and an AI driver drive the vehicle alternately within the ODD for highways, one driver can be used as two persons, the vehicle travels day and night with all possible speeds and runs continuously for 24 hours, an L4 HDT driver can travel more than 1,000 miles a (lay, the driver's labor productivity is greatly improved by more than 75%, the freight time for ultra-long-haul freight (more than 1,000 miles for a single trip) is shortened by more than 35%, the freight cost (USD/ton-mile) for long-haul freight is obviously reduced, and the freight timeliness is improved. Greater, faster, better and more economical results are really achieved. It has a great economic effect and social significance, and will bring revolutionary changes to the trillion dollar-level global highway freight industry. It is generally believed in the industry that L2 HDTs for long-haul freight have been commercially available in batches; L3 HDT for long-haul freight is only a transitional product, which has second-best cost effectiveness if 20% of its beneficial effects are achieved at 80% of the cost of L4 system; only realization of the large-scale commercialization of L4 HDTs for long-haul freight as soon as possible is the striving goal of the global trillion dollar-level highway freight industry in the next decade. Unless otherwise specified, the Operational Design Domain (ODD) refers to the expressway when L1-L4 autonomous driving systems are discussed in the present disclosure; the driver generally refers to the Human Driver; the AI driver specifically refers to the Machine Driver, i.e., L3 or L4 autonomous driving system.

When the vehicle is running in the same lane on an expressway, the continuous longitudinal control (acceleration, braking or cruise) and continuous lateral control (such as lane change and the like) of the vehicle are decoupled basically in a Uni-directional manner in terms of vehicle energy management or active driving safety, so it is called one-dimensional (1D) Longitudinal Control, which satisfies the vehicle dynamics equation (1-1) within the one-dimensional coordinate system with the longitudinal displacement of the vehicle as the independent variable, without considering the influence of lateral control; however, the continuous lateral control of the vehicle is highly related to its longitudinal control (i.e., bi-directional deep coupling), and the active safety during vehicle driving can only be ensured by the dynamic collaborative control of the continuous lateral control and longitudinal control, so it is called two-dimensional (2D) Lateral Control. Within the ODD for highways, considering from the perspective of optimization of fuel saving and emission reduction of ACE HDT, the weighting factor of longitudinal control (i.e., PACC function) is 98%, the weighting factor of lateral control is only 2%, and the influence on fuel consumption is negligible; considering from the perspective of safety and reliability of DDT, the weighting factor of longitudinal control (i.e., PACC function) is 65%, while the weighting factor of lateral control is only 35%, and the longitudinal control and lateral control need to be coordinated after overall plans are made. If changed to within the ODD for non-closed suburban roads, considering from the perspective of optimization of energy saving and emission reduction of ACE HDT, the weighting factor of longitudinal control (i.e., PACC) is 95%, the weighting factor of lateral control is only 5%, and the impact on fuel consumption is still small; considering from the perspective of safety and reliability of DDT, the weighting factor of longitudinal control (i.e., PACC function) and the weighting factor of lateral control are 50% respectively, both of which are equally important. It should be emphasized that in terms of energy saving and emission reduction of vehicles (based on L1 1D longitudinal PACC control), the ACE4 HDT (i.e., Level IV fuel-saving robot) is completely the same in function and performance as the ACE1 HDT (i.e., Level I fuel-saving robot); however, in terms of safety and reliability of DDT and drivers' labor productivity, the ACE4 HDT is vastly different from the ACE1 HDT in terms of function and performance, and can be downward compatible with all functions. The Level I fuel-saving robot is the "economic foundation", and the Level IV fuel-saving robot is the "superstructure". It should be emphasized that the optimization of energy saving and emission reduction of vehicles is essentially a steady-state macroscopic property in the process of vehicle driving, which reflects the time integration of the instantaneous power function of the engine or battery pack, and the energy saving and emission reduction effect can be superimposed; it is similar to playing the Go game, we should not strive for the kcal gains and losses, but focus on overall victory; the PACC control function of the Level I fuel-saving robot can be commercially available in batches when its reliability reaches 99%. However, when the level IV fuel-saving robot is performing the L4 DDT, the safety and reliability is essentially a instantaneous microscopic characteristic in the process of vehicle driving. Similar to the safety of civil aviation aircraft, no accident is normal, and no points will be deducted; once an accident occurs, the aircraft may be destroyed, and people in the aircraft may die. The government and the public will not allow the Level IV fuel-saving robot to be commercially available in batches even if its reliability of performing the L4 DDT reaches 99.9999%. And the government and the public may allow the Level IV fuel-saving robot to enter the stage of being commercially available in batches only when the mortality rate must be significantly less than the human driver's level of 1.09 person-times/100 million miles (i.e., reliability of mote than eight nines. In other words, there's a big difference between Level I fuel-saving robot and Level IV fuel-saving robot in terms of system safety and reliability threshold. The Level I fuel-saving robot is the "economic foundation", and the Level IV fuel-saving robot is the "superstructure".

The ACE HDT in the present disclosure uses the powertrain by-wire, brake by-wire and steering by-wire (x-by-wire), and the lateral or longitudinal control function of the vehicle must be dynamic control function with high reliability (ASIL-D) and low time delay (ten millisecond level). Whether a traffic accident occurs and the severity of the accident depends largely on the real-time, accuracy and robustness of the Object and Event Detection and Response (OEDR) around the vehicle and the continuous control of vehicle running (i.e., dynamic driving task (DDT)) by the manipulator (human driver, ADAS system, or AI driver) within ten second-level time before and after the Collision Time. By optimizing the vehicle energy management through the 1D longitudinal control PACC function, the Level I fuel-saving robot can defeat human drivers in terms of energy saving and emission reduction effect. Compared with the traditional HDT with internal combustion engine, the overall fuel consumption (L/100 km) is reduced by nearly 30%, the actual fuel saving effects are highly consistent, and the Level I fuel-saving robot is basically decoupled from the driver's level and the technical level of the engine; the ACE1 HDT is creating additional value of energy saving and emission reduction every time it rims for one minute or one mile, and the ACE1 HDT is the solid Foundation for the other three advanced fuel-saving robots; Level II-IV fuel-saving robots are advanced versions of fuel-saving robot. In terms of vehicle driving control, the vehicle 2D Lateral Control function is added, and the accuracy and robustness, system redundancy, on-board AI computing power and the like of the Object and Event Detection and Response (OEDR) of the vehicle are enhanced stepwise. Within the ODD for highways, the 1D longitudinal control (i.e., PACC Function) of ACE HDT in the same lane is in a steady state (at the sub-hour level), and the proportion of operating time is more than 95%; the 2D lateral control of actions, including vehicle lane changing, roadside emergency vehicle parking, entry into the expressway service area or leaving from the highway and the like, is instantaneous (sub minute level), and the proportion of operating time is less than 5%; the actual fuel consumption (L/100 km) of the vehicle depends entirely on the energy management optimization AI algorithm of the fuel-saving robot of HDT in the 1D longitudinal control PACC mode, and is basically independent of the 2D lateral control.

A Comparator module (either a real electronic module or a virtual logic module) of the highest Automotive Safety integrity Level D (ASIL-D) added within or outside the vehicle control unit (VCU) configured for the ACE HDT can Compare & Switch in real time three sets of dynamic control signal (transverse or longitudinal) of vehicle driving, which are completely independent of each other at a refresh rate of not less than 20 Hz and generate the final dynamic wire Control Signals of vehicle driving, and these vehicle wire Control Signals satisfy the following equation:

$$C_{si} = k_{i1}W_{i1} + k_{i2}W_{i2} + k_{i3}W_{i3} \tag{5-1}$$

Where i=1 represents longitudinal vehicle control, and i=2 represents lateral vehicle control, $W_{i1}$ represents the human driver's wire control signal, $W_{i2}$ represents the ADAS wire control signal, $W_{i3}$ represents the AI driver's wire control signal, and the three are mutually independent variables (time-varying functions); $C_{s1}$ and $C_{s2}$ represent the longitudinal or transverse wire control signals that finally control the vehicle, and both are mutually independent variables (time-varying functions); $k_{ij}$ represents six weighting factors that can be set by software dynamically, which is constant that can be either preset by the driver or fleet, or adjusted over-the-air (OTA).

The function of the Comparator is equivalent to a small SPC exchange with at least six input channels ($W_{ij}$) and at least two output channels ($C_{si}$), different comparison, fusion and switching strategies (referred to as comparison strategies) of vehicle wire control signals can be implemented through software definition and over-the-art (OTA). i.e., "intelligent comparison switching" (iCS) function, and this will be described in detail in the subsequent embodiments section; basic comparison strategies refer to various On-Off Comparison strategies, only one of the three factors, $k_{i1}$, $k_{i2}$, and $k_{i3}$ is 1, and the other two are 0 at each moment; advanced comparison strategies refer to Weighted Comparison strategies, the three factors $k_{i1}$, $k_{i2}$ and $k_{i3}$ are non-negative numbers between 0 and 1, and the boundary condition is that the sum of the three weighting factors is equal to 1 forever; the priority or weight value or the driver's weighting factor $k_{i1}$ is usually the highest of the three.

Sufficient space and power are available on the ACE HDT to install and support at least one set of L4 autonomous driving system (also known as L4 system to be validated) that has been frozen and finalized in engineering design and can be mass-produced and put into commercial use after passing the Big Validation, and the ACE HDT will be upgraded to an ACE4 HDT. At present (in April 2020), governments around the world explicitly prohibit L3/L4 3R Test to be carried out in the true sense for HAV HDTs on highways nationwide; the so-called L3 3R Test means that the AI driver completes the dynamic driving task (DDT) and the onboard Safety Driver serves as the DDT Fallback (L3 system) to be ready to take over the DDT within 15 seconds at any time; in the L4 3R Test, the L4 system provides Fallback for itself, and the driver can leave the driver's seat and take a rest in the rear compartment of the vehicle; under the existing traffic regulation framework of all countries around the world, the only way to make the 3R Test on highways legal and compliant is to degrade the ACE4 HDT by two levels temporarily at first, so that the ACE4 HDT operates in the L2 ADAS mode (i.e., shadow mode), the AI driver and human driver are responsible for Object and Event Detection and Response (OEDR) jointly, and the human driver serves as the DDT Fallback and takes full responsibility for vehicle driving safety. At this time, the ACE4 HDT operates in the "shadow mode" to carry out the L2 3R Test in practical terms; the Comparator sets $k_{i1}$ to zero in the shadow mode and compares the driver wire control signal $W_{i1}$ and the AI driver wire control signal $W_{i3}$ in real time (at a refresh rate of above 20 Hz), and a digital "Disparity Report" will be generated automatically when the absolute value of the difference between $W_{i1}$ and $W_{i3}$ is greater than the preset threshold. In other words, in the shadow mode, although the AI driver can complete the Object and Event Detection and Response (OEDR) and send the vehicle driving wire control signal $W_{i3}$ in real time when simulating the human driver's driving in real time in a 3R highway environment, at this time, the Comparator of the ACE HDT completely shields the wire control signal of the AI driver and only takes orders from the human driver to ensure that the shadow mode operation of the ACE4 HDT has no negative impact on road traffic safety.

Refer to the current regulatory approach of California for public road test of HAV light vehicles, that is, each developer testing the HAV on California highways is compulsorily required to submit a "Disengagement Report" on a regular basis; when the ACE2 HDT operates in the shadow mode, if the Comparator finds that the absolute value of the difference between the human driver's wire control signal $W_d$ and the AI driver's wire control signal $W_0$ is greater than the preset threshold, it will create an electronic record of "Disparity Event" using the VCU system clock as the unique annotation. The VCU generates a digital Disparity Report for the Disparity Event automatically combined with all the original data of the L4 system sensor set and the vehicle operation data within a ten-second-level time range before and after the Disparity Event. The confidential information involving the driver's privacy or the vehicle is desensitized (anonymized) and encrypted, and uploaded to the cloud timely for subsequent analysis and processing. In the shadow mode, the human driver is a teacher, the mass-produced and commercially available ADAS system (i.e., L2 system) is a teaching assistant, and the L4 system to be validated is a student. Through imitation learning or Supervised Learning, the performance and safety are measured and improved by using two Leading Indicators of Disparity Mileage (mile/time) or Disparity Number (time/thousand miles) when the L4 system to be validated performs the L2 DDT; the shadow mode has no negative impact on road traffic safety because $k_{i3}=0$.

The average annual accumulated mileage of the ACE HDTs for long-haul freight is 120,000 miles; if the accumulated mileage of 1000 ACE4 HDTs operating for one year (at all seasons) in the L2 shadow mode nationwide can be 120 million miles, a Disparity Report is generated based on the 3R Test data when the L4 system to be validated preforms the L2 DDT to prove statistically and preliminarily that it is Not Unsafe to perform the L3 3R. Test on the ACE4 HDTs; the Key Stake-holders of road traffic safety led by the government may, according to the billion mile-level L2 Disparity Report of the ACE4 HDTs, approve the L3 3R Test to be carried out by the ACE4 HDTs on highways nationwide, i.e., test run in an L3 "Disengagement Mode", at this time, the L4 system to be validated is dimensionally reduced to an L3 system to perform all the dynamic driving tasks (DDTs; including OEDR and vehicle control), but the onboard Safety Driver is required to serve as the DDT Fallback, the driver is allowed to perform "feet off", "hands off" and "eyes off", but not allowed to perform "mind off", let alone have a sleep. The driver must be always ready to take over the vehicle within 15 seconds and perform all tasks. Similar to the above-mentioned Disparity Report, if the Comparator finds that the absolute value of the difference between the driver's wire control signal $W_{i1}$ and the AI driver's wire control signal $W_{i3}$ is greater than the preset threshold, the Comparator will create an electronic record of Disengagement Event automatically using the VCU system clock as the unique annotation. The VCU generates a digital Disengagement Report for the event automatically combined with all the original data of the L4 system sensor set and the vehicle dynamic operation data within a ten-second-level time range before and after the Disengagement Event, the private or confidential information of the driver or vehicle in the Disengagement Report is desensitized and encrypted, and the Report is uploaded to the cloud timely (hour-level time delay) for subsequent analysis and processing. The so-called Disengagement Event means that the AI driver is disengaged for any reason, and the human driver takes over the vehicle actively or passively and performs all or part of the DDTs. Two Leading Indicators, i.e., Disengagement Mileage (mile/time) or Disengagement Number (time/thousand miles), together with two Lagging Indicators, i.e., Fatality Rate (FaR; person-time/100 million miles) and Injury Rate (InR; person-time/100 million miles), may be used to measure and improve the safety and reliability comprehensively when the L4 system to be validated performs L3 DDTs. The L3 3R Test data and Disengagement Report for 1.2 billion miles can be accumulated for 10,000 ACE4 HDTs continuously operating for one year (at all seasons) in the disengaged mode nationwide. The Key Stake-holders of road traffic safety led by the government may, according to the billion mile-level 3R Test L3 Disengagement Report and the actual data of the Lagging Safety Indicator (FaR or InR), make statistical reasoning with high confidence. On the premise of ensuring the Road Safety, large-scale commercial operation of the L3 autonomous driving system of ACE 4 HDTs at a level of 10,000 vehicles on highways nationwide will be opened gradually, and the stage III ten-billion-mile-level 3R Test (when the L4 system to be validated performs the L3 DDTs) will be continued. In the long process of Big Validation that is upgraded gradually in three stages from L2 validation in the shadow mode at a level of hundred million miles (the first stage), L3 validation in the disengaged mode at a level of billion miles (the second stage), to L3 commercialization in batches at a level of ten billion miles and L4 3R Test, the Level IV fuel-saving robot to be validated in the ACE4 HDT fleet experienced an autonomous evolution process from being a trainee to finishing its apprenticeship in terms of safety and reliability in performing the L4 DDT. Similar to the growth and upgrading process of young people from graduation from a high school and admission to an university to obtaining a doctor's degree, the ACE4 HDT is significantly better than the traditional HDT with internal combustion engine in many aspects such as vehicle power, driving safety, freight timeliness, driver labor productivity, vehicle fuel consumption and emission, so that the commercialization of the L4 system of ACE4 HDT in batches can be realized soon.

Compared with the ACE HDT of the present invention, the traditional HDT with internal combustion engine (referred to as L4 traditional HDT) configured with L4 system can also adopt the shadow mode (i.e., L2 3R Test) or disengaged mode (i.e., L3 3R Test) to conduct Big Validation of the L4 system, but the following additional challenges will be faced: first of all, the power performance and fuel consumption of the traditional HDT with internal combustion engine are highly related to the performance of the engine and the driver's level, and the actual data are highly discrete (the difference ratio of fuel consumption is up to 20%); secondly, the L2 ADAS system of the traditional HDT focuses on safety and convenience, and the traditional HDT is obviously inferior to the ACE HDT with a fuel consumption decrease of more than 25% due to lack of the function of energy recovery through regenerative braking and the actual fuel consumption decrease of less than 5% even if predictive cruise control (PCC) is used; thirdly, the time delay (second-level) for the traditional HDT to switch from the 100 kW-level driving power to the 100 kW-level auxiliary braking or pneumatic mechanical braking system is one order of magnitude higher than that of the ACE HDT, and the traditional HDT is also inferior in terms of braking performance; finally, the redundancy of the traditional HDT in power, braking, steering, power supply and other aspects is significantly lower than that of the ACE HDT. To make up for the redundancy defect, the L4 traditional HDT needs to be completely refitted, and this process will be costly and time-consuming. Theoretically, the traditional internal combustion engine vehicles (referred to as traditional vehicles) can be configured with L4 system; however, since all-electric vehicles and hybrid vehicles have an overwhelming advantage over the traditional vehicles in all aspects, especially x-by-wire, redundancy, digitization and the like, concerned by HAV R&D, all the L4 light vehicles developed by countries around the world for the purpose of mass production and commercial use are refitted on the mass-produced all-electric vehicle and hybrid vehicle platforms, and there are few exceptions. However, since there is no mass-produced all-electric or hybrid HDT in the world at present, many enterprises in the world have to add L4 system based on the traditional diesel engine HDT platform to carry out the research and development of L4 HDT products in the current stage. As stated above, the greatest challenge for the commercialization of L4 HDTs for long-haul freight in the world in the future is not the development of the L4 system product of the HDT, but the huge challenge of how to complete the 3R Test in batches at a level of one billion miles to ten billion miles with high cost effectiveness without endangering the traffic safety of existing highway users; it is necessary to accumulate the leading disengagement report and lagging actual casualty rate data (FaR and InR) on L3 operation in a disengaged mode at a level of ten billion miles to prove statistically with high confidence that the safety and reliability of L4 AI drivers performing DDTs are superior to those of human drivers, urge the government to revise existing traffic laws and regulations, and allow the L4 HDT to enter the stage of commercialization in batches as soon as possible.

Based on the current laws and regulations of the USA on the commercial supervision of HDTs, the second-hand traditional diesel HDTs in the USA can be refitted into ACE4 HDTs in batches by using the present invention. The commercial operation of L2 long-haul freight can be directly carried out, and the Big Validation of L4 system can be carried out at the same time without additional government certification or approval; we should start with the easier tasks before moving on to the more difficult ones, which is a gradual upgrading process, i.e., from the 3R Test in the L2 shadow mode at a level of hundred million miles in the first stage, to the 3R Test in the L3 disengaged mode at a level of one billion miles in the second stage, and finally to the commercial operation in the L3 disengaged mode at a level of ten billion miles in the third stage (i.e., L4 3R Test in the disengaged mode); the 3R Big Validation in the L4 disengaged mode at a level of ten billion miles will be completed in three years with high cost effectiveness on highways all over the USA by using a cluster of refitted ACE4 HDTs at a level of tens of thousands of vehicles to generate the Disengagement Report which accumulates the actual traffic casualty rate (FaR and InR) data, proves statistically with high confidence the safety and reliability when the Level IV fuel-saving robot (i.e., L4 system) performs the L3 DDT, and paves the way for ACE4 HDTs to obtain the government approval as soon as possible and enter the commercialization of L4 system it batches. In the USA and other countries, the product R&D cycle of new genuine ACE4 HDTs is more than three years. In China or Europe, the new ACE4 HDTs need to be further certified and approved by the government before mass production and sales, and the Big Validation and final commercialization of genuine ACE HDTs may lag behind refitted ACE HDTs by three years. Obviously, in terms of validation of the safety and reliability when the AI drivers perform the L3 or L4 DDTs, the L3 commercial operation is equivalent to the L4 3R Test, all the drivers serve as the DDT Fallback, and must be always ready to take over the vehicles in 15 seconds; the L3 commercial operation and the L4 3R Test are technically equivalent in terms of safety, and the difference is only in the commercial aspect; while the commercial operation of ACE3 HDTs is performed, technical solution of incidentally completing the 3R Test big validation of the L4 system to be validated in the disengaged mode at a level of ten billion miles is commercially more feasible than the technical solution of leapfrogging over the transitional stage of commercialization of L3 system in batches and starting from scratch to complete the 3R Test big validation of the L4 system to be validated in the disengaged mode at a level of ten billion miles.

To reduce the dimension of ACE4 HDT to L2 operation in the shadow mode or L3 operation in the disengaged mode, 1D longitudinal L1 automatic driving and optimization of energy saving and emission reduction of the vehicle are realized at first through the predictive adaptive cruise control (PACC) of the present invention, and the decrease in actual fuel consumption (L/100 km) can exceed 20% compared with that for the operation (in the shadow mode or disengaged mode) of diesel HDTs equipped with L4 system; the ACE4 HDTs create additional economic value for the drivers and transportation companies for every minute or mile they travel; in other words, in the stage of big validation of the L4 system, when the ACE4 HDT is running, the main business is to save fuel and make money in freight transport, and 3R Test is a subsidiary business. This is equivalent to the fact that both hauling of goods and hanging of billboards are performed, and we can kill two birds with one stone or prepare one lobster in three ways; when the traditional L4 HDT operates, the 31R Test is the main business, and freight transport is the subsidiary business. Through the predictive adaptive cruise control (PACC) function and the intelligent comparison switching (iCS) function of the present invention, the ACE4 HDT changes the high "Variable Cost" for 3R Test of the traditional L4 HDT into a lower "Marginal Cost" during business operation of the L2 ACE4 HDT based on dimension reduction, and the actual cost of the 3R Test (USD/mile) can be reduced by up to 90%. To sum up, the device and method for big validation of ACE4 HDTs of the present invention can complete the 3R Test of the L4 system to be validated at the level of 10 billion miles on highways nationwide within three years (firstly in the L2 shadow mode, then in the L3 disengaged mode) with high cost effectiveness without increasing the traffic risk of existing highway users, and the safety and reliability when the AI drivers perform the L3 or L4 DDTs are proved statistically with high confidence. The Big Validation is divided into two parts: preliminary validation in the development stage (the first stage), and final validation in the demonstration stage (the second and third stages); it is possible to convince the government and the public with data so that they have no objection to the 3R Test to be carried out by ACE4 HDTs on highways nationwide in the L2 disengaged mode to step into the demonstration stage from the development stage provided that the ACE4 HDTs complete the 3R Testing at a level of hundred million miles in the shadow mode at first (i.e., preliminary validation in the first stage); the safety and reliability when the Level IV fuel-saving robot performs the L3 DDT based on dimension reduction can be proved preliminarily in a statistical sense to cam the right of way for L3 business operation and the tight of way for L4 big validation only after the ACE4 HDT accumulates the 3R Testing data in the disengaged mode at a level of billion miles and completes the L3 final validation (i.e., the second stage) successfully, the 14 final big validation (i.e., the third stage) is considered to be completed only after tens of thousands of ACE4 HDTs (refitted or genuine) complete the L3 business operation mileage at a level of ten billion miles within two years and accumulate the Disengagement Report of L3 commercialization or L4 validation and the actual casualty rate (FaR and InR) data, so as to prove statistically with high confidence that the Level IV fuel-saving robot is safer and more reliable than human drivers when performing the L3 DDT, and persuade the government and the public to amend relevant laws and regulations and allow ACE4 HDTs to carry out the commercialization of L4 autonomous driving system in batches in the true sense step by step on highways nationwide. Similar to the five-year cumulative fuel cost of new HDTs, which is significantly higher than the purchase cost of the complete vehicle, the big validation fee shared by each ACE4 HDT is significantly higher than the L4 software and hardware system cost of the vehicle even if the high variable cost for big validation of Level IV fuel-saving robot at a level of ten billion miles can be converted into low marginal cost to realize the cost reduction by 75%; the Level IV fuel-saving robot can be considered as a teacher and become the co-driver of the human driver once the ACE4 HDT earns the right of way for L4 commercialization from the government and the public and enters the stage of commercialization in batches. The additional economic value created by the Level IV fuel-saving robot for the fleets or human drivers after operation for one year is enough to cover all the hardware and software costs of the L4 system, and it has brought a significant and far-reaching impact on the global trillion-dollar level long-haul freight industry.

Under the framework of current laws and regulations for regulating the sales and operation of HDTs in the USA, the different levels of rights of way for HAV HDTs, which correspond to L3 or L4 big validation or business operation within the ODD for highways, must be specially approved by the government; the classification of rights of way for all levels of fuel-saving robots is described as follows: similar to high school education for all the people, no special approval is required for the right of way for business operation of Level II fuel-saving robot (i.e., L2 ADAS system); the right of way for L3 3R fest is similar to undergraduate education; similar to graduation from a high school and being admitted to a university, the L2 3R Test in the shadow mode at a level of 100 million miles is completed at first, and the L3 test right of way is earned from the government to enter the L3 3R Test stage in the disengaged mode; similar to graduation from a university with a bachelor's degree, the L3 3R Test in the disengaged mode at a level of billion miles is completed to earn the right of way for L3 business operation and IA test, then specific exemption can be obtained from the American government, the driver's driving time limit within every 24 hours is gradually increased from 11 hours to 14 hours, and the labor productivity of drivers is increased by nearly 25%, similar to study for a doctorate, the L4 3R Test in the disengaged mode (i.e., the L4 system is dimensionally reduced to L3 system before use) is started at the same time; similar to receiving a doctor's degree, the L4 3R Test at a level of ten billion miles in the disengaged mode is completed to prove with high confidence that the L4 AI drivers are safer and more reliable than human drivers, and the right of way for IA business operation is earned from the government; at this time, the ACE4 HDT can be driven by the human driver and Level IV fuel-saving robot in turn, the human driver gets enough rest, the 24-hour continuous driving day and night is realized, the driver's labor productivity is increased by more than 75%, the timeliness of thousand-mile level extra-long freight is greatly improved, the overall freight cost is obviously reduced, and it will have a revolutionary impact on the global long-haul freight industry. In China or Europe, the problem can also be handled by referring to the regulatory approach and the classification method of right of way in the USA, so that the government and other road traffic safety stake-holders can effectively balance the contradiction between promoting the commercialization of HAV HDTs in batches as soon as possible and practically ensuring the traffic safety of existing road users. In the three major automobile markets of the USA, China and Europe, there are small differences in the big validation of L4 system within the ODD for highways, and the global versatility of 3R Test data is strong; however, there are great differences in the big validation of L4 system within the ODD for urban open roads, and the 3R Test data is highly regional and is basically not universal.

With the modern diesel HDTs driven by human drivers as the comparison benchmark, the commercialization of IA operation of ACE4 HDTs within the ODD for highways is realized, and the Level IV fuel-saving robot can make the ACE4 HDTs safer, more fuel efficient and cleaner, while greatly improving the labor productivity of drivers and freight timeliness. From the perspective of technical route for R&D of ACE4 HDTs, a leap forward approach may be taken toward the R&D and commercialization of L4 system; however, front the perspective of legal supervision of 3R Test or commercialization in batches of ACE4 HDTs, a human life is of greater value than everything, "safety first", we must be cautious and conservative, and proceed in an orderly way and step by step; governments in the world and the public will not agree to promote HAV HDTs to complete big validation as soon as possible and enter large-scale commercialization at the cost of temporarily reducing the traffic safety of current highway road users; they will explicitly reject to adopt the open regulatory strategies of "opening the gate to release water", "mixing the good and the bad", and "easy to get in, but hard to stay in", large-scale 3R Tests are allowed to be carried out on public roads, including highways, for various modified HAV HDTs, just like modified HAV passenger vehicles, the existing road users are changed into "small white mice" for the big validation of the safety of AI drivers of HAV HDTs, and the hero will be judged by the final result of the big validation at a level of billion miles or ten billion miles; to ensure that the traffic safety of existing road users will not be temporarily reduced due to 3R Test of the HAV HDTs, the strict regulatory strategies of "hard to get in, and hard to stay in", "national examination" and "escalation" must be taken, different levels of right of way for HAV HDTs will be opened step by step according to the 3R rest data accumulated by HAV HDTs, which is similar to the learning and growth journey of young people from graduation from a high school to admission to an university to receiving a doctor's degree. The big validation tat a level of ten billion miles) of the safety and reliability when the Level IV fuel-saving robot performs the L4 dynamic driving task (DDT) can be broken down into the following three different stages: L2 shadow mode stage at a level of 100 million miles (i.e., the first stage), L3 disengaged mode stage at a level of 1 billion miles (i.e., the second stage of L3 big validation), and L4 disengaged mode stage at a level of 10 billion miles (i.e., the third stage of L3 commercialization and L4 big validation); the three different stages mentioned above correspond to the following live different levels of right of way: 1) right of way for commercial operation of L2 system, which is similar to universal education and graduation from high school; 2) right of way for 3R Test of L3 system, which is similar to undergraduate education; 3) right of way for commercialized operation of L3 system, which is similar to graduation from a university and receiving a bachelor's degree; 4) right of way for 3R Test in the disengaged mode of L4 system, which is similar to taking part in the postgraduate entrance exams and studying for a doctorate; and 5) right of way for commercialized operation of L4 system, which is similar to receiving a doctor's degree. By implementing various combinations of multiple technical solutions including iSS, iPS, iMS, CGS, iCC, PACC and iSC, the ACE4 HDT and Level IV fuel-saving robot device of the present invention can optimize the power, safety and energy saving and emission reduction effect of the ACE4 HDT simultaneously; according to the three-stage implementation method of big validation and the method for obtaining live levels of right of way mentioned above, the big validation of Level IV fuel-saving robot at a level of ten billion miles is completed rapidly with high cost effectiveness to prove with high confidence that the Level IV fuel-saving robot is safer and more reliable than human drivers when performing the L4 DDT, and the government and the public are persuaded to amend relevant laws and regulations to promote the ACE4 HDTs to enter the stage of large-scale commercialization at a level of 10,000 vehicles as soon as possible within the ODD for highways nationwide. It should be emphasized that from the perspective of driving safety of HDTs, the difference between L4 systems of various developers is significantly greater than that between human drivers of HDTs with a Commercial Driver's License (CDL). The L4 system from a single manufacturer is preferred for a fleet of 10,000 ACE4 HDTs to complete the 3R Test at a level of one billion miles per year; otherwise, the universality or confidence level of statistical data of big validation will be greatly reduced. Of course, the fleet of ACE4 HDT % can also install at least two sets of L4 systems from different manufacturers on each vehicle simultaneously to perform synchronous big validation, so as to further share the marginal cost of big validation and improve the validation efficiency. The evolution of the L4 HDT industry for long-haul freight in the future is likely to be similar to that of the civil aviation large aircraft industry, traffic safety is the most important thing, and the government will strictly control commercial access. The weak are knocked out, and the winner takes all. Finally, it is likely that only a few Big Players of L4 system of HDTs in all countries will remain in the market for long-term competition.

All the core subsystems or parts and components of the ACE HDT of the present disclosure are based on industrialized products and technologies. Compared with the HDT with diesel engine in the prior art, the ACE HDT (of the disclosure can achieve the beneficial effect of overall fuel saving ratio of 30% in the application scenario of long-haul freight on highways on the premise of ensuring the power, active safety, long-term compliance of RDE emission and attendance of vehicles. ACE HDTs enable fleets or individual vehicle owners to recover the cost difference (refers to the price difference of Total Owning Cost (TOC) between ACE HDT and traditional diesel HDT) within two years or 500,000 km by saving the fuel and M&R costs of the vehicles and improving the labor productivity of HDT drivers without government subsidies. The mass production of new ACE HDTs (i.e., genuine ACE HDTs) can meet the 2025 carbon emission target value of Euro VII regulations issued by EU in 2019 and the 2027 carbon emission target value of the American GHG-II in advance. In America, the average service life of a HDT (especially the chassis or frame) is up to 20 years or L5 million miles, a set of frame of each HDT may be configured with two to three sets of powertrains (engine+transmission; replaced after travelling about 600,000 miles) throughout the life cycle, and the second or third set of powertrain is mostly a Remanufactured powertrain overhauled by an enterprise approved by the original factory. The average annual sales of new HDTs in North America is about 200,000, while the number of modified HDTs (i.e., second-hand HDTs with replaced powertrains) exceeds 200,000 every year. Thanks to the current system of regulatory laws and regulations for HDTs (adopting the strategy of "easy to get in, but hard to stay in") in the USA, modified HDTs (including modifying the traditional HDT with internal combustion engine into the ACE HDT) are allowed to be put into commercialized operation (L1/L2 system) directly in the American market without re-certification or re-approval by the government; the fuel-saving robot for ACE HDTs of the present invention can also be used to modify and upgrade in batches the nearly 2 million second-hand traditional HDTs with internal combustion engines in stock on the current American market to realize large-scale commercialization of modified ACE2 HDTs at a level of 10,000 vehicles in three years, so that a large number of modified ACE HDTs can, like new genuine ACE HDTs, achieve the 2027 carbon emission target value of the American GHG-II in advance, the fuel consumption (L/100 km) and emission of a large number of second-hand traditional DTs in stock can be significantly reduced, winch is of great and far-teaching economic and social significance to the long-haul freight industry in the USA; and a solid foundation is laid for promoting the mass production and commercialization of genuine new ACE HDTs worldwide. It should be emphasized that China and Europe adopt the compulsory government certification system for the production and sales of all road vehicles, and the modification of second-hand hybrid HDTs is not feasible under the current legal framework in China or Europe; however, the early commercialization of the modified ACE HDT of the present invention in the USA will greatly promote the commercialization process of the genuine ACE HDTs in the USA, China or Europe.

Although the content of the present invention focuses on HDTs for long-haul freight, the technical problems to be solved, specific technical solutions and measures and beneficial technical effects of the present invention also apply to the operation of large highway mixed hybrid commercial vehicles (trucks or buses) with a total weight of more than ten tons; individual technologies or combined technologies, such as series hybrid intelligent Stop Start (iSS), parallel hybrid intelligent power switching (iPS), intelligent mode switching (iMS), Clutchless Gear Shift (CGS), predictive adaptive cruise control (PACC), intelligent pulse heating (iPH), intelligent comparison switching (iCS) and the like, also apply to double-motor mixed hybrid light vehicles (with a total weight of less than four tons).

BRIEF DESCRIPTION OR THE DRAWINGS

In these figures, the same or similar reference symbols are used for representing the same or simile elements.

DETAILED DESCRIPTION OF THE EMBODIMENTS

The following is the description of the embodiments by reference to some examples. It should be known that the description of these embodiments is only for those skilled in the art to properly understand the present invention and accordingly achieve the present invention, and are not hints of limitations to the present invention.

For example, the term "including" and the variants thereof should be interpreted as the open term of "including but not limited to". The term "based on" should be interpreted as "at least partially based on". The terms "an embodiment" and "a kind of embodiment" should be interpreted as "at least one embodiment". The term "another embodiment" should be interpreted as "at least one other embodiment". The terms "first", "second" and the like can refer to different or the same objects. The followings may include other definite and implicit definitions. In this paper, "unidirectional" or "bidirectional" connection refers to whether the direction of the electric or mechanical power flow or energy flow flowing from the power source to the load is reversible or not, and whether the roles of the power source and the load can be exchanged with each other or not. During unidirectional connection, the roles of the power source and the load are fixed, and the power flow from the source to the load is unidirectional and irreversible; during bidirectional connection, the roles of the power source and the load can be switched, and the direction of power flow is reversible or bidirectional. Unless otherwise specified, all electromechanical parts, modules or devices in the present invention are of automotive grade. A vehicle engine includes an automotive-grade internal combustion engine or turbine motor, more than 95% of the HDTs in the world adopt a diesel engine, and a small portion of the HDTs adopt a natural gas engine. Both "Zhuan Ju" and "Niu Ju" in Chinese mean torque in English.

Figure 1:
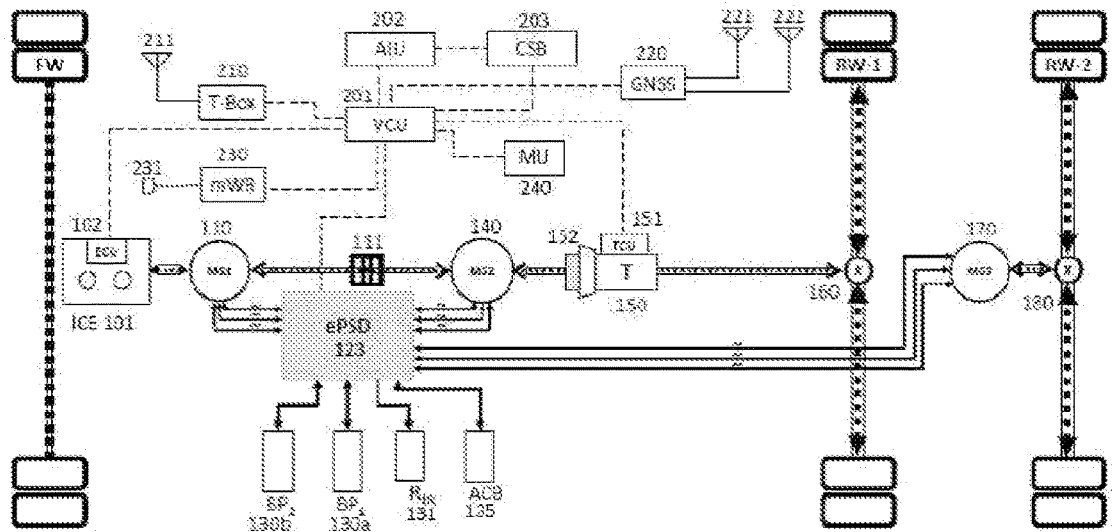
FIG. 1 is a system block diagram of the ACE HDT of one embodiment of the present disclosure.

The following is the description or the basic principles and some embodiment of the invention by reference to the figures. FIG. 1 illustrates the mixed hybrid powertrain, vehicle control unit, core sensors and other devices of the ACE HDT 010 disclosed by one embodiment of the present invention. The system can be configured either as a 6×2 powertrain system with double motors (a generator (MG1) 110 in a hybrid P1 position and a primary driving motor (MG2) 140 in a hybrid P2 position), an active driving axle 160 and a passive (driven) driving axle 180, or as a 6×4 powertrain system with three motors (a generator (MG1) 110 in the hybrid P1 position, a primary driving motor (MG2) 140 in the hybrid P2 position, and an auxiliary driving motor (MG3) 170 in the P3 position), and two active driving axles 160 (primary driving axle) and 180 (auxiliary driving axle). In some embodiments, the HDT can be the hybrid HDT with the gross vehicle weight of larger than 15 tons for long-haul freight.

As shown in FIG. 1, generally, the mixed hybrid powertrain of the ACE HDT includes an engine 101, an engine control unit (ECU) 102, a generator (MG1) 110, an electrical power split device (ePSD) 123, a clutch 111, at least one primary battery pack 130*a*, a brake resistor 131, an automatic transmission (T) 150, a transmission control unit (TCU) 151, a flexible connector 152, at least one primary driving motor (MG2) 140, a vehicle control unit (VCU) 201, a primary driving axle 160 and an auxiliary driving axle 180. Wherein the primary battery pack 130*a* and the primary driving motor 140 are required (standard), while the auxiliary battery pack 130*b* and the auxiliary driving motor 170 are optional.

Specifically, the flywheel end of the engine 101 is connected with the mechanical shaft of the generator (MG1) 110 configured in the hybrid position P1 bidirectionally and mechanically, and controlled by the engine control unit (ECU) 102, and is mainly used for converting the chemical energy of onboard fuel such as diesel or natural gas into electric energy by the combustion working of the engine; the combination of the engine 101 with the generator 110 is called as a generator set. The flywheel end of the engine 101 and the mechanical shaft of the generator 1110 are also connected with one end (also known as the driven end) of the clutch-by-wire 111 bidirectionally and mechanically, and the bidirectional and mechanical connection among the three (101, 110 and 111) is either single-axis coaxial rigid connection (coaxial connection for short) or multi-axis parallel plus gear rigid connection (parallel-axis connection for short). The coaxial connection is preferred, and such mechanical connection is the simplest and the most effective; however, the 100 kW-level generator 110 requires large automotive-grade electrical motor with a large torque (with a peak torque of greater than 1,200 Nm), a low speed (with a maximum speed of less than 3,000 rpm) and a high cost; the parallel-axis connection can also be preferred, at this time, the flywheel output end of the engine 101 is connected with one end of the clutch 111 directly, bidirectionally and mechanically, the more cost-effective 100 kW-level generator 110 with a middle torque (with a maximum torque of less than 500 Nm) and a middle-to-high speed (with a maximum speed of less than 12,000 rpm) can be optional, and the mechanical shaft of the generator 110 is connected with the flywheel output end of the above engine 101 and the driven end of the clutch 111 bidirectionally and mechanically through a heavy-duty reducer with a fixed gear ratio (4-8), but the reducer will increase the complexity, cost and reliability risk of the parallel-axis connection system.

Figure 2:
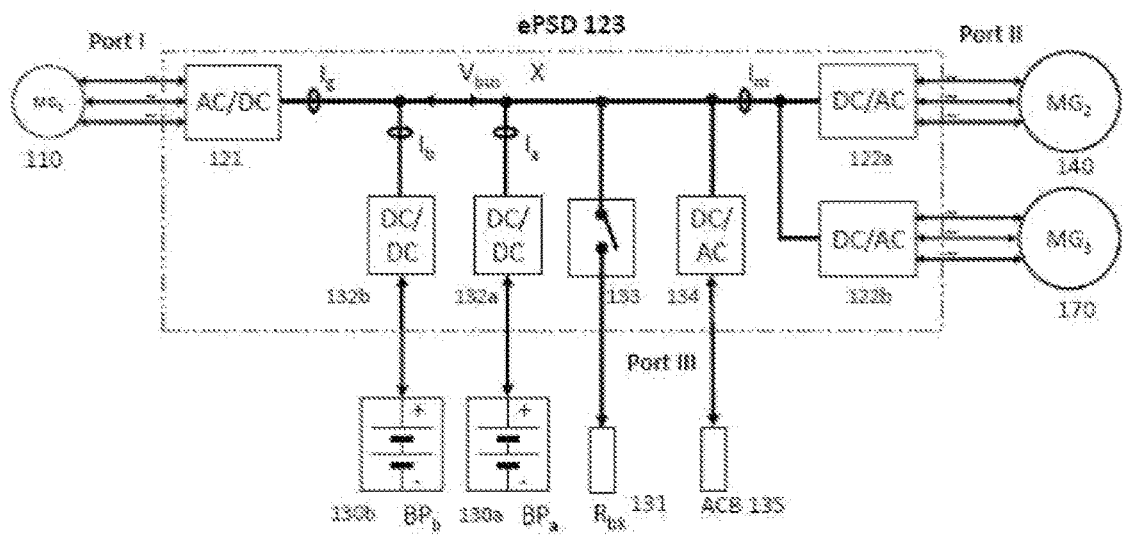
FIG. 2 illustrates a system block diagram of the electrical power split device (ePSD) of the ACE HDT of one embodiment of the present disclosure.

As shown in FIG. 2, the electrical power split device (ePSD) 123 shown in FIG. 2 is a power electronics network (PEN) with three ports of 100 kW-level nominal power, wherein the three-phase AC terminal of the 100 kW-level inverter 121 in the port I (also known as the "first port") of the ePSD is connected with the three-phase AC terminal of the external generator 110 bidirectionally and electrically; the external battery pack 130a or 130b is bidirectionally DC-connected with the low voltage terminal of the 100 kW-level chopper (also known as DC-XC converter) 132a or 132b in the port III (also known as the "third port") of the ePSD 123, respectively; the external 100 kW-level brake resistor 131 is unidirectionally DC-connected with one end (external connection end) of the 100 kW-level voltage-controlled switch (VCS) 133 in the port III. The externally optional 10 kW-level AC distribution panel 135 is connected with the AC terminal of the 10 kW-level inverter in the port III bidirectionally and electrically. The three-phase AC terminals of the external 100 kW-level driving motors 140 and 170 are connected with the AC terminals of the 100 kW-level inverters 122a and 122b in the port II (also known as the "second port") of the ePSD bidirectionally and electrically; the DC terminals of the inverters 121, 122a and 122b are bidirectionally DC-connected with the DC bus junction X in the ePSD; the other terminal of the 100 kW-level voltage-controlled switch (VCS) 133 is unidirectionally DC-connected with the DC bus junction X; the high-voltage terminal of the chopper 132a or 132b is bidirectionally DC-connected with the junction X, respectively. The DC terminal of the inverter 134 is bidirectionally DC-connected with the junction X.

As shown in FIG. 1, the output shaft of the automatic transmission 150 is connected with the input shaft of the primary driving axle 160 of the vehicle bidirectionally and mechanically, and controlled by the transmission control unit (ICU) 151. The mechanical shaft of the standard primary driving motor (MG2) 140 configured in the hybrid position P2 is connected with the other end of the clutch 111 bidirectionally and mechanically, and connected with the input shaft of the transmission 150 through the flexible coupling or clutch-by-wire 152 bidirectionally and mechanically. The drive end of the clutch 111 and the mechanical shaft of the driving motor 140 are also connected with the input shaft of the transmission 150 bidirectionally and mechanically, and the bidirectional and mechanical connection among the three (clutch 111, primary driving motor 140 and transmission 150) is either single-axis coaxial connection or parallel-axis connection. When the parallel-axis connection is adopted, the mechanical shaft of the driving motor 140 can be connected with the input shaft of the transmission 150 and the drive end of the clutch 111 bidirectionally and mechanically through the heavy-duty reducer with a fixed gear ratio. The optional auxiliary driving motor (MG3) 170 configured in the hybrid position P3 is connected with the input end of the second driving axle 180 bidirectionally and mechanically through the heavy-duty reducer. The standard primary driving motor (MG2) 140 or the optional auxiliary driving motor (MG3) 170 can be operated for converting the electric energy into the mechanical energy for driving the ACE HDT (electrical driving), or converting the mechanical energy of the ACE HDT into the electric energy (regenerative braking) to charge the battery pack 130a or 130b through the inverter 122a or 122b and the chopper 132a or 132b in the ePSD 123, so that the energy can be effectively recovered. The auxiliary driving motor (MG3) 170 may not be selected with focus on reducing the system cost and the complexity.

As one of the key components of the present disclosure, the vehicle control unit (VCU) 201 and AI unit (AIU) 202 of the ACE HDT work cooperatively, equivalent to the brain and cerebellum of the fuel-saving robot, so that the time-space function of vehicle road load power in the electronic horizon can be predicted at a refreshing frequency of higher than 1 Hz and a kW-level granularity by using the vehicle dynamics equation (1-1) according to the vehicle-mounted data bus (as indicated by the dotted line in FIG. 1 and without marker; such as CAN bus or virtual data cable for wireless communication) based on the vehicle locating and 3D position data (longitude, latitude and longitudinal slope) measured by the onboard Global Navigation Satellite System (GNSS) 220, the electronic horizon prioti road 3D data, vehicle configuration parameters and dynamic work condition data (such as vehicle speed and vehicle acceleration) stored in the map unit (MU) 240, vehicle longitudinal drive-by-wire signals (reflecting the driving intention of a human driver or AI driver) and other information; and one or more of the above engine 101, generator 110, ePSD 123, clutch 111, driving motors 140 & 170, automatic transmission 150 and battery packs 130a & 130b can be dynamically controlled separately or simultaneously in an "independent" manner according to the machine learning (ML) for optimizing the vehicle fuel consumption and emission.

In some embodiments, the VCU 201 can be an automotive-grade high-performance embedded single-core or multi-core microprocessor. Similar to the graphic processing unit added to the early personal computer to enhance the image processing performance of the overall unit, the VCU 201 can also use the plug-in vehicle-end AI inference chip (AIU) 202 (also known as an AI processor) to improve the artificial intelligence (AI) inference computing capability when executing the energy-saving and emission-reduction machine learning algorithms on the ACE HDT 010; and at the same time, the AIU 202 can also be upgraded to a hardware computing platform that supports the L4-level autonomous driving software stack. It should be known that, non-restrictively, the VCU 201 or AIU 202 can be also an isomeric microelectronic hardware logic unit, including a general-purpose microprocessor (CPU), a field-programmable gate array (FPGA), a graphic processing unit (GPU), an application-specific integrated circuit (ASIC), a digital signal processor (DSP), a system on chip (SCC), a complex programmable logic device (CPLD), etc.

Preferably, the engine 101 is a six-cylinder HDT diesel engine or natural gas engine with a displacement of 9 L to 13 L and a peak power between 260 kW and 350 kW; the engine with a larger displacement (13 L-16 L) can be selected, the peak power of the engine can be higher than 400 kW, and there will be more power reserve, so that the gradeability performance of the vehicle is better when the vehicle encounters an uphill road condition on a highway (climbing a hill for more than ten kilometers in a row, with a longitudinal slope of greater than 2.0 degrees), but the fuel saving effect has no advantage over that of the preferred engine, the volume, weight and cost are obviously increased, and the cost effectiveness is suboptimal; the engine with a smaller displacement (lower than 9 L) can also be selected, generally with a peak power of less than 300 kW though the fuel saving effect is better and the volume, weight and cost are lower, the power reserve of the engine is insufficient; if the power in the battery pack is exhausted and it is impossible to continue to supply power for the driving motor when the vehicle encounters a large upslope condition on a highway, the gradeability performance of the ACE HDT 010 will be obviously insufficient, and the vehicle cannot continue to go up a slope at speed until it is shifted into a lower gear and slowed down; in addition, the engine displacement and power are not coordinated with the vehicle weight, which is unfavorable to the long B0 life (1,000,000 km) of the engine, and the cost effectiveness is suboptimal. It should be known that, optionally, the engine 101 can also be a vehicle gas turbine meeting the above power requirements. The gasoline engine is obviously inferior to the diesel engine in terms of thermal efficiency of combustion, low speed, big torque and service lire (kilometers for B10 life), so it is not suitable for HDTs for long-haul freight.

It is noted that, as shown in FIG. 1, in the embodiments of the present disclosure, the ACE HDT powertrain system is in a series hybrid mode when the clutch 111 is disengaged; no mechanical connection between the engine 101 and the driving axle 160 or ISO of the vehicle is provided at this time, and accordingly the operating conditions of the engine 101 and the vehicle running conditions are decoupled completely, so that the engine 101 is enabled to stably work at several operating points (specified speed/torque) specified in the high efficiency zone (including the optimal fuel efficiency range and/or the optimal emission range) of the universal characteristic curve for a long time. When the clutch 111 is engaged and locked, the ACE 111 powertrain is switched to the parallel hybrid mode; at this time, the engine 101 is directly connected with the active driving axle 160 or auxiliary axle 180 of the vehicle through the transmission 150 bidirectionally and mechanically, the speed of the engine 101 is jointly determined by the vehicle speed and the gear of the transmission 150, and the output torque of the engine 101 can still be dynamically adjusted independently and is not subject to the driving conditions of the vehicle; therefore, the output power of the engine is still independently adjustable, but at this time the engine is in an operating line condition rather than an operating point condition in the high efficiency zone of the universal characteristic curve. Under high-speed conditions, the engine can always work in the high efficiency zone stably by the gear shifting strategy of the transmission. The sum of the nominal power of the generator 110 (MG1) and the driving motor 140 (MG2) is greater than the peak power of the engine 101, and in the parallel hybrid mode, the peak load shifting of the vehicle road instantaneous driving power can be absolutely realized by dynamically adjusting the total drying power of the dual motors (110 & 140) according to the parallel hybrid power equilibrium equation set (3-1)& (3-2) to satisfy the vehicle dynamic equation (1-1) in real time. For a basic on-off control strategy of the drive-by-wire clutch 111, the parallel hybrid mode (clutch engaged) is preferred under high speed conditions (an average speed of higher 50 km/h; infrequent active acceleration or braking); the series hybrid mode (clutch disengaged) is preferred under urban conditions or during driving on a congested highway (with an average speed of less than 45 km/h, frequent active acceleration or braking). The above-mentioned intelligent mode switching (iMS) strategy can also be preferred as the advanced intelligent dynamic control strategy of the drive-by-wire clutch 111, and the actual energy-saving and emission-reduction effect of the iMS strategy is superior to that of the on-off control strategy, which will be introduced in details later.

The difficulty in the electronic control of the traditional engine of HDTs is the simultaneous optimization of multiple contradictory targets such as engine power, fuel saving, emission behavior and cost under global area operating conditions (all speed and torque ranges) to meet the increasingly stringent emission regulations (pollutant and carbon emissions) of all countries in the world; over the past two decades, the global modern mass-produced HDT engines have an accumulated improvement rate of less than 15% in terms of minimum brake specific fuel consumption (BSFC; g/kWh) or brake thermal efficiency (BTE; %), or actual comprehensive fuel consumption (L/100 km), and the bottleneck of technology and production process has been encountered. If the operating range of the engine can be changed from the global area operating conditions to the point operating conditions or line operating conditions with a limit range, it will open up a new field (new technological route) to break through the current upper limit (46%) of brake thermal efficiency (BTE) of the HDT engines that can be mass-produced and optimize the fuel consumption and emissions to the maximum extent at high cost-effectiveness through technological innovation; at the same time, it is also possible to effectively cope with the severe challenges of surging complexity and product costs of design, calibration and manufacturing of the engine body, ECU and exhaust after-treatment system (ATS) of HDTs in order to meet the stricter new mandatory regulations on emissions (pollutant and carbon emissions) for internal combustion engine vehicles continuously issued by all countries in the world in the next 20 years.

Compared with a spark-ignition (SI) gasoline engine, a compression ignition (CI) diesel engine, with the advantages of fuel saving, large torque at low speed, practicality, durability, ultra-long life (B10 life is longer than 1,000,000 km) and high cost effectiveness, becomes the preferred engine for most HDTs (exceeding 95%) in the world. However, in the aspect of pollutant emissions, especially pollutant emissions of nitrogen oxides (NOx) and particulate matter (PM) harmful to atmospheric environment and human health, the diesel engine is inferior to the gasoline engine. The world's mainstream after-treatment technologies that meet the EPA-2010, Euro VI and China VI mandatory regulations on engine emission fir reducing exhaust pollutant NOx and PM emissions from the diesel engines of HDTs include selective catalytic reducer (SCR) and diesel particulate filter (DPF), and the catalyst in the after-treatment system can work normally and efficiently provided that the working temperature (i.e., the exhaust temperature) inside the SCR and the DPF reaches the specified high temperature (Light-off) above 250C; when the exhaust temperature is lower than 200° C., the catalytic conversion efficiency of the catalyst is greatly reduced, and the tail-pipe emissions of engine pollutants will be greatly increased; low-temperature catalysts with a working temperature of 150° C. are still in the early stage of laboratory research in Europe and the USA, and the time to mass production should be calculated in decades. Both the pollutant emissions and specific fuel consumption (g/KWh) of the diesel engine are greatly increased in a short term during cold start, low-load operation, or instantaneous substantial changes of output power; while the engine can work stably in the high efficiency zone of its universal characteristic curve under the working condition of highways, and both the pollutant emissions and the specific fuel consumption of the diesel engine are small at the moment. For the traditional HDT, it is difficult to optimize both the fuel consumption and the pollutant emission within the whole range of speed/torque or the universal characteristic curve of the engine. Through the Intelligent Stop Start (iSS) control of the engine in the series hybrid mode or the Intelligent Power Switching (iPS) control in the parallel hybrid mode, the ACE HDT of the present invention enables the engine 101 to stably work at least one optimal operating point or at least two high and low-state power condition lines within the high efficiency zone of the universal characteristic curve of the engine 101, so that engine cold start, low-speed or low-load idling and other instantaneous conditions outside the high efficiency zone are basically eliminated; while the specific fuel consumption and carbon emissions are reduced, the engine exhaust temperature can also be effectively elevated and maintained, so that the after-treatment system of the engine 101 can stably work in the high-temperature and high-efficiency range (above 250° C.) to reduce the emissions of pollutants (NOx, PM) and realize the beneficial effect of simultaneously minimizing fuel consumption and emissions. Meanwhile, due to the high temperature and low NOx content in the engine-out exhaust of the ACE HDT, its SCR system can also reduce the urea consumption (g/100 km), and the operating cost of the ACE HDT can be further reduced accordingly, moreover, the both the diesel engine and the diesel particulate filter (DPF) of the ACE HDT can also work stably in their own high efficiency zone for a long time, and the DPF system active regeneration performed by periodic mandatory parking for 30-45 min and the idling of the diesel engine by injecting excessive diesel is basically avoided to eliminate the long-term shortcoming of consuming more time and more fuel caused by the deposition of a large number of particles inside the DPF for industrial users, thereby further reducing the fleet operating cost and improving the freight efficiency.

Different from the traditional HDT with diesel engine, the engine of the ACE HDT can have the functionality of clean cold start (CCS). When the ACE HDT is cold started after long-term parking outdoors (for more than 10 hours) in a severe cold region (with an ambient temperature below −10° C.), the preheating time for the cold start is preset by the driver, the vehicle VCU instructs the drive-by-wire clutch 111 to disengage, and then the vehicle enters the series hybrid mode, by using the 10 kWh level effective DC power of the battery pack, the 100 kW-level ePSD 123 completes the inversion and outputs alternating current; after the SCR module of the exhaust after-treatment system is rapidly heated to 250° C. at a minute level through the onboard electrically heated catalyst (EHC) with the power of tens of kilowatts, the generator 110 (MG1) in the electric driving mode drags the engine 101 to rotate under the non-combustion condition to a specified idle speed of 500 rpm-000 rpm, followed by the first fuel injection, compression ignition and work, and series hybrid intelligent stop start (iSS) control is performed on the engine; the duration (i.e., "Light-off Time") from the cold start and ignition of the engine to the time that the exhaust after-treatment system reaches its high efficiency operating temperature is greatly reduced by more than 75%, and the pollutant emission can be reduced by more than 75% compared with that of the traditional diesel engine HDT during cold start; in order to achieve ultra-low emission diesel engines, and reduce pollutant emission limits by more than 80% based on the current EPA-2010 or China-VI emission regulations, the above CCS function must be adopted. During cold start of the traditional diesel engine HDT, the gear is engaged and the vehicle starts to run only after the vehicle is parked to warm up the engine at idle speed for several minutes (i.e., warm-up time); the warm-up time of the SCR module of the exhaust after-treatment system for parking and warm up during clean cold start (CCS) of the ACE HDT is less than the warm-up time of the traditional HDT, so that the work of the driver will not be delayed, and the warm-up start time can also be preset by the software; it should be emphasized that within the warm-up time during parting of the ACE HDT to heat the engine after-treatment system, the engine 101 and the generator 110 do not work, neither the driving motor 140 nor the driving motor 170 works, and the vehicle has no vibration or noise; power can be temporarily supplied by the battery pack, the AC terminal of the inverter 122a or 122b with 100 kW-level nominal power contained in the ePSD 123 can be utilized to supply power to the onboard electrically heated catalyst (EHC) at the level of tens of kilowatts, so that the temperature of the SCR module can be rapidly elevated from minus tens of degrees Celsius to 250° C. in minutes, and the VCU 201 can automatically adjust the operating power consumption and time of the electrically heated catalyst (EHC) according to the data of the ATS temperature sensor. The vehicle after-treatment system is protected by a thermal insulation layer, and the holding time is of a sub-hour level due to the higher heat capacity of the system; once the engine enters stable operation, the sub-minute low-state (non-combustion) operation of its PWM pulse sequence will not work, and as a result, the operating temperature of the catalyst inside the after-treatment system (ATS) is reduced to below 250° C.; when the engine is hot started or the low-state condition of the PWM pulse sequence is switched to the high stale condition, the EHC does not need to turn on the electric heating function, and at that time, the after-treatment system (ATS) can maintain high temperature and operate efficiently and stably.

For most domestic engine and key powertrain component suppliers with insufficient technological accumulation, the Limits and Measurement Methods for Emissions from Light-duty Vehicles (China VI) coming into force in China in 2021 for heavy-duty diesel trucks are huge technical and business challenges. On the premise of ensuring that the complete vehicle reaches and continuously meets the requirements of China VI, especially the warranty period of the 700,000 km for the RDE discharge system when leaving the factory, the technical performance requirements of the diesel engine of the ACE HDT of the present invention are much lower or relaxed than the general technical requirements of traditional heavy-duty diesel trucks after dimensional reduction from overall area operating condition to point operating condition or line operating condition within the high efficiency zone of the engine, providing new opportunity for the commercial implementation of multiple new and concise technological lines with high cost effectiveness technologies, and providing another new field for survival and development of Chinese suppliers of HDT powertrain and key component in the later period of China VI.

The power of the motor is directly proportional to the product of its speed and torque, and the volume, weight and cost of the motor have highly positive association with its maximum torque. Hybrid or electric passenger vehicles (with a gross weight of less than 3.5 tons) mostly adopt middle-sized automotive-grade motors with a high speed (with peak value of greater than 12,000 rpm) and a low torque (with peak value of less than 350 Nm); hybrid HDTs usually use large-sized automotive-grade motors with a low speed (with peak value of less than 3,000 rpm) and a high torque (with peak value of greater than 1,500 Nm). For example, both the large-sized motor I with a speed of 1,200 rpm and a peak torque of 2,000 Nm and the small-sized motor I with a speed of 12,000 rpm and a peak torque of 200 Nm have a nominal power of 251 kW; however, the volume, weight and cost of the motor I are obviously higher than those of the motor II. Compared with the applications of passenger vehicles, the ACE HDT has less restrictions on the volumes and weights of motor, battery pack and other subsystems, but both the passenger vehicles and the ACE HDT are highly sensitive to their costs. The annual production and sales of new energy vehicles of passenger vehicles are nearly 30 times higher than those of HDTs. Currently, most nominal power of high-speed and low-torque motors used in new energy passenger vehicles is less than 175 kW, and the unit cost (USD/kW) is obviously decreased year by year with the increase of production; however, for the low-speed and large-torque motors with the nominal power of greater than 200 kW used in large-sized new energy commercial vehicles (with a gross weight of greater than IS tons), the unit cost (USD/kW) will still be high, and it is hard to reduce significantly year by year. New energy passenger vehicles or HDTs have basically the same requirements for IGBT or SiC and other electrical and electronic core devices, and the devices of the same voltage platform can be in common use. If the hybrid HDT keeps close, or partial overlapping, to the requirements of new energy passenger vehicles in terms of model selection (especially in voltage platform, peak torque and peak power) of three major electrical systems (motor, battery and electric control), it will be in favor of cost reduction as well as quality and supply guarantee for the three major electronic systems of the ACE HDT year by year by making full advantage of the economy of scale effect of the mature supply chain of the new energy passenger vehicles Preferably, for the embodiment in FIG. 1, the standard generator (MG1) 110 is a permanent magnetic synchronous motor (PMSM) with nominal power of 150-225 kW, and the AC induction motor or reluctance motor meeting the above requirements for nominal power can also be selected; the primary driving motor (MG2) 140 is preferably a permanent magnet synchronous motor with the nominal power of 175-250 kW, and the AC asynchronous motor or reluctance motor of the same power specification can also be selected; the optional auxiliary driving motor (MG3) 170 is preferably a permanent magnet synchronous motor with the nominal power of 125-200 kW and the AC asynchronous motor or reluctance motor of the same power specification can also be selected. The ACE HDT can still work normally when the nominal power of the three motors (110, 140 and 170) exceeds the above preferred parameter range respectively in various embodiments in FIG. 1; the motor cost, volume and weight are reduced when the nominal power is lower than the preferred lower limit, but the power and fuel saving ratio of the vehicle will also be significantly decreased; the power and fuel saving ratio of the vehicle will be improved when the nominal power is higher than the upper limit, but the motor cost, volume and weight are significantly increased; all are the second-best choices. The peak power (10 s pulse) of the motor or battery pack is obviously higher than its continuous nominal power, with an overload rate within 10 s reaching over 150%.

The electrical power split device (ePSD) 123 shown in FIG. 2 is an power electronics network (PE) with three ports and 100 kW-level nominal power, wherein the power electronics network includes at least two insulated gate bipolar transistors (IGBT) or silicon carbide (SiC) power modules, but can exclude any power source or electric energy storage device. Various power electronics circuit topology designs are available to achieve the input/output characteristic of the three-port network and the functions of various internal subsystems. It should be noted that the present disclosure is not intended to limit the implementation of specific circuit topology of a three-port PE network including the IGBT or SiC power module, but all power electronic circuit topology designs capable of realizing the key input/output functions and characteristics of the ePSD 123 described in the present disclosure should fall into the range of the present disclosure. In view of the integrated design flexibility of the power electronics modules, the inverters 121 and 122*a*&*b*, the choppers 132*a*&*b* and the voltage-controlled switch (VCS) 133 inside the ePSD 123 can be either integrated in one metal box, or distributed in multiple metal boxes, and packaged and arranged in a decentralized way in order to improve the system performance and/or reduce the cost. At present. IGBT is the most cost-effective global mainstream automotive-grade power electronic power module; the SiC power module is a rising star with better performance hut higher cost in the near future, and its commercial proportion will increase year by year with the increased production of SiC. The IGBT modules mentioned in the present disclosure can generally refer to various industrialized power electronic power modules, including IGBT or SiC.

In the embodiment shown in FIG. 2, the AC port of the inverter 121 in the port I of the ePSD is connected with the three-phase AC output end of the external generator (MG1) 110 bidirectionally and electrically; the AC port of the inverter 122*a* in the port II is connected with the three-phase AC output terminal of the external primary driving motor (MG2) 140 bidirectionally and electrically, and the AC port of the inverter 122*b* is connected with the three-phase AC output end of the external auxiliary driving motor (MG3) 170 bidirectionally and electrically; the low-voltage end of the chopper 132*a* connected in the port III is DC-connected with the external battery pack 130*a* bidirectionally and electrically; and the low-voltage end of the chopper 132*b* is DC-connected with the external battery pack 130*b* bidirectionally and electrically. The DC ends of all the inverters (121, 122*a* and 122*b*) are DC-connected to the DC bus junction X of the ePSD bidirectionally, and the high-voltage ends of all the choppers (132*a* and 132*b*) are also DC-connected to the DC bus junction X in the ePSD bidirectionally and electrically. One end of the voltage-controlled switch (VCS) 133 with 100 kW-level nominal power is DC-connected with the junction X unidirectionally and electrically, and the other end is DC-connected with the external 100 kW-level brake resistor 131 with a radiator electrically. The DC end of the 10 kW-level inverter 134 is connected with the DC bus junction X bidirectionally and electrically, and the AC end of the 10 kW-level inverter 134 is connected with the external AC switchboard 135 bidirectionally and electrically.

Preferably, the IGBT power module is adopted to realize the voltage-controlled switch 133, and a DC voltage triggering method is adopted to control the on or off of the voltage-controlled switch; the control method is defined by software and dynamically adjustable, so it is called a voltage-controlled switch. The implementation method of the "intelligent voltage-controlled switch" (iVS) control strategy is as follows: $V_{on}=(1+k_{on})V_{bus0}$; $V_{off}=(1+k_{off})V_{bus0}$; where $V_{on}$ is an ON voltage threshold, and $V_{off}$ is an OFF voltage threshold; $V_{bus0}$ is nominal voltage of the DC bus, with a preferred range of 600 V-750 V; $k_{on}$ is a bias coefficient for ON, with a preferred range of 2%-10%; $k_{off}$ is a bias coefficient for OFF, with a preferred range of −5% to +2%; $k_{on}$ and $k_{off}$ are defined by software and can be adjusted dynamically; when the DC voltage of the junction point X is equal to the ON voltage $V_{on}$, the voltage-controlled switch 133 can switch from the off state to the on state with a millisecond response time and maintain the on state, so that the brake resistor 131 can become the effective electrical load of the ePSD 123; when the DC voltage of the junction point X is equal to the OFF voltage $V_{off}$, the voltage control switch 133 can switch from the on state to the off state with a millisecond response time and keep the off state. When the instantaneous state of charge (SoC) function value of the battery pack 130a or 130b exceeds the upper red line (URL), the chopper 132a or 132b will quickly cut off the charging path to the battery pack (at a 10-millisecond level) in order to protect the battery pack; but at this time, if the ACE HDT still needs the regenerative braking function of the driving motor 140 or 170, and if the alternating current generated by the regenerative braking suddenly loses the effective electrical load, the DC voltage at the junction point X will rise sharply instantaneously and exceed the breakdown voltage (i.e., 1,200 V) of the IGBT module, the instantaneous "extreme pulse voltage condition" occurs, which may cause permanent damage to each IGBT module or other electronic components in the ePSD 123. It should be emphasized that the intelligent Voltage-controlled Switch (iVS) control strategy can not only turn on the brake resistor 131 when the battery packs 130a&b are basically full (the SoC reaches the URL) to provide the steady-state vehicle non-friction retarding function, but also provide another important instantaneous over-voltage protection function to avoid the serious failure modes such as tripping interrupting work or permanent damage (especially the overvoltage breakdown damage to the IGBT) of the main electronic components with the IGBT modules inside the ePSD 123, such as inverters 121, 122a and 122b and choppers 132a and 132b, under some extreme conditions of the ePSD 123. The nominal power of the voltage-controlled switch 133 is preferably in a range of 200 kW to 350 kW; the nominal power of the corresponding brake resistor 131 should be less than the nominal power of the voltage-controlled switch; in terms of increasing the system redundancy and reducing the costs, two sets of voltage-controlled switches with the nominal power of about 150 kW and the matched brake resistors are preferably connected in parallel to realize the voltage-controlled switch (VCS) function with a total nominal power of 300 kW.

When the nominal voltage $V_{bp}$ of the battery pack 130a or 130b is equal to the nominal voltage $V_{bus0}$ of the DC bus of the ePSD, in order to simplify the system and reduce its cost, it can be considered to omit the chopper 132a or 132b and directly connect the battery pack to the junction point X bidirectionally and electrically; however, the nominal voltage of the battery pack must be equal to the nominal voltage of the DC bus, and the battery pack will also lose the flexibility and the capability to adjust the 100 kW-level instantaneous charge-discharge power; moreover, the ePSD 123 also loses the capability of flexibly matching various battery packs with high cost effectiveness and different nominal voltages through software definition (on-site or OTA remote iteration); and it is a suboptimal option. The battery pack 130a or 130b is one of the most expensive subsystems of the ACE HDT, as well as a potential weak spot of the performance, reliability and durability of the complete vehicle, and its high-rate partial state of charge (HRPSoC) characteristic curve and cycle life are highly correlated with data of dynamic operating conditions, such as state of charge (SoC) and cell temperature; another benefit of adopting the chopper 132a or 132b is that the instantaneous charging and discharging rates of the battery pack (132a or 132b) can be quickly adjusted (delayed at a 10-millisecond level) according to the cell HRPSoC digital characteristic curve list provided by the battery pack supplier, the working condition data of the cell (SoC and temperature), and the dynamic working condition data of the ACE HDT, so that the battery pack can work stably for a long time within the high efficiency zone to achieve the beneficial effect of optimizing the performance and cycle life of the battery pack.

The DC bus junction X in the ePSD 123 of the present disclosure is the nerve center for the power network of the hybrid powertrain of the AC, HDT; the unique DC voltage time-varying function at this junction and a set of the DC current time-varying functions of all inlet/outlet branch circuits mathematically describe the dynamic working state of the electric power circuit of the ACE HDT completely; and thus the DC bus junction X is the key point of energy saving, emission reduction and safety control for the operation of the ACE HDT. The junction X is a point in circuit topology, but it can be realized by multiple physical methods, for example, it may be a metal busbar or a section of multi-joint high-power cable.

The ePSD 123 can dynamically adjust the path, amplitude and direction of electric power flow in a 10 millisecond-level response time and at a 100 kW-level nominal power amplitude among its three ports through the digital control over several major power and electronic functional modules (i.e., inverters 121, 122a&b, 134; choppers 132a&b; VCS 133), integrate the mechanical power flow with the electric power flow according to the series hybrid power equation (2-4) or the parallel hybrid power equation (3-3), dynamically match the time-varying function of road load power $P_v$, and satisfy the vehicle dynamics equation (1-1) in real time. Thus, the drive-by-wire clutch 111 and the ePSD 123 are jointly controlled by the VCU 201 and the AIU 202 according to the energy-saving and emission-reduction machine learning algorithms, enabling smooth switching (i.e., intelligent mode switching (iMS)) between the two different working modes: series hybrid iSS and parallel hybrid iPS; and the fuel consumption and emissions of the engine are optimized (i.e. minimized) on the premise of meeting the vehicle driving power performance, safety and freight timeliness. The frequency of switching between the series hybrid mode and parallel hybrid mode of the vehicle is low under the application scenarios of long-haul freight for the ACE HDT, and it is switched for less than 20 times per 100 miles.

Optionally or additionally, the ePSD 123 can be further provided with a plurality of sensors and memories so as to measure and record a time sequence of dynamic voltage $V_{bus}(t)$ and currents $I_g(t)$, $I_m(t)$ and $I_b(t)$ at the DC bus junction X at the measuring frequency of not lower than 5 Hz, and the time sequence, serving as a part of the fuel saving data set, is uploaded to the cloud computing platform 001 for storage through the vehicle-mounted wireless communication gateway 210 in time for subsequent analysis and processing. The following is the detailed description of the implementation mode of the fuel saving data set.

It is known that the electric power equilibrium equation at the IDC bus junction X in the ePSD 123 is as follows:

$$P_g + P_{bat} + P_m + P_{bf} = \quad (4\text{-}1),$$

where $P_g \in [-P_{igx}, P_{igx}]$, $P_{bat} \in [-P_{bx}, P_{bx}]$, $P_m \in [-P_{imx}, P_{imx}]$. $P_{igx}$ is the peak power of the inverter 121, $P_{bx}$ is the aggregated peak charge-discharge power of the primary battery pack 130a and the auxiliary battery pack 130b, $P_{imx}$ is the aggregated peak power of inverters 122a and 122b, $P_{bx} > P_{imx} > P_{igx}$. $P_g$ is an instantaneous electric power time-varying function of the generator (MG1) 110 and is controlled by the inverter 121, and $P_{gx}$ is its peak power ($P_{igx} > P_{gx}$), the positive value is the driving power (electric energy into mechanical energy), and the negative value is the generated power (mechanical energy into electric energy); $P_{bat}$ is an aggregated instantaneous electric power time-varying function of the battery packs (130a&b) and controlled by the choppers (132a & b), the positive value is the charging power (electric energy into chemical energy), and the negative value is the discharging power (chemical energy into electric energy); $P_m$ is an aggregated instantaneous electric power time-varying function of the active driving motor (MG2) 140 and the auxiliary driving motor (MG3) 170 and controlled by the inverters 122a&b, $P_{mx}$ is its peak power ($P_{imx} > P_{mx}$), the positive value is the driving power (electric energy into mechanical energy), and the negative value is the regenerative braking power (mechanical energy into electric energy, recovered energy); $P_{bx}$ is the instantaneous electric power time-varying function of the brake resistor 131, it is a nonnegative number under control of the voltage-controlled switch 133, and the peak power is not lower than the peak power of the active driving motor (MG2) 140. In the present disclosure, the peak power is the maximum continuous mechanical power for the engine unless specially noted; the peak power refers to the maximum pulse electric power in 10 or 15 s for the motor, inverters, choppers or battery packs, and it is obviously higher than the nominal power (i.e., the maximum continuous electric power).

The embodiment of the present disclosure is described by focusing on the scenario in which there are only the standard primary driving motor (MG2) 140 and primary battery pack 130a. If the ACE HDT system further includes the optional auxiliary driving motor (MG3) 170 and/or the auxiliary battery pack 130b, it is easy for ordinary technicians in the industry to extend the description. It is preferred to engage the clutch 111 to realize the parallel hybrid mode for the ACE HDT under high speed conditions (the average speed is above 50 km/h, with few active acceleration or braking); it is preferred to disengage the clutch 111 to realize the series hybrid mode under urban/suburban conditions and on congested highways (the average speed is below 45 km/h, with frequent active acceleration or braking). For vehicle driving safety and power considerations, the parallel hybrid mode should be preferred regardless of average speed when the ACE HDT is climbing an upslope or mountain (the absolute value of longitudinal slope is greater than 2.0 degrees, the continuous uphill or downhill journey is more than 5 km). In the application scenario of long-haul freight, nearly 90% of mileages are high speed conditions, and the clutch 111 of the ACE HDT does not need to be switched frequently. Thanks to dynamic coordination of the dual motors (MG1 and MG2), both of them can control the speed or torque rapidly and accurately, neither obvious interruption of driving torque nor a sense of vehicle driving frustration will occur to the ACE HDT powertrain in the second level transition period of switching between engaged and disengaged states of the clutch 111, and the vehicle power and NVH performance are obviously better than the HDT with internal combustion engine in the existing technology.

The battery packs 132a&b are the most expensive subsystems in the ACE HDT, and also the potential weaknesses in power performance, reliability and durability (i.e., long life) of the complete ACE HDT, so the cost-effective design of battery packs is very important. The technical requirements for power-type battery packs of ACE HDTs are obviously different from those of hybrid light-duty vehicles. The ACE HDT has no hard limit on the volume and mass of battery packs with a total capacity of tens of kilowatt-hours, but has higher requirements on high and low temperature resistance (ambient temperature range: −30° C. to +50° C.) and shock resistance of battery packs, especially has very high requirements on the equivalent deep Dot) cycle life (i.e., the equivalent number of full charge and full discharge; 100% DoD) of battery packs under high-rate partial state of charge (HRPSoC) conditions. For example, the battery pack of the ACE HDT has an accumulated charge throughput of more than 300,000 kWh in the full life cycle; if the effective capacity of the power-type battery pack is 30 kWh, the continuous charge-discharge rate of the battery pack is higher than 5C, the peak (10 seconds) charge-discharge rate is higher than 12C, and the equivalent deep cycle life is higher than 12,000 times considering the end of life (EOL) decay rate of 20%.

By mixing and matching lithium titanium oxide (LTO) primary battery pack 130a (with a capacity of 10-20 kWh) with high performance (low-temperature high-rate charge/discharge), ultra-long life and high cost and the low-cost LFP or NCM auxiliary battery pack 130b (with a capacity of 20-50 kWh), the cost effectiveness of ACE HDT system can be optimized according to the specific application scenarios of the ACE HDT 010. The LTO primary battery pack 130a is cold-resistant and can be involved in high-rate charge/discharge work immediately alter cold start of the vehicle parked outdoors for more than 10 hours in winter (below minus 10° C.). At this time, the auxiliary battery pack 130b with LFP or ternary lithium cell is controlled by the chopper 132b and can be not involved in work or works at low C-rate temporarily. After the internal cell of the auxiliary battery pack 130b is heated to above 10° C. after the vehicle runs for more than ten minutes, the auxiliary battery pack 130b is involved in high C-rate work. The battery packs 130a&b are the most expensive subsystems in the ACE HDT, Mixing and matching two or more battery packs with different electrochemical cells is good for improving the overall performance of battery packs, reducing the total cost of battery packs and crucial to optimize the comprehensive cost effectiveness of the ACE HDT. Through a pulse-width modulation (PWM) technology and software definition and over-the-air (OTA), the chopper 132a or 132b can adjust the charge-discharge current value of the battery pack 130a or 130b dynamically and continuously according to the charge-discharge characteristic curve and various protective limitations of the battery cell at different temperatures, and optimize the performance, charge throughput and equivalent cycle life of the battery pack under the premise of satisfying the power performance of the complete ACE HDT.

The single cell voltage of the LTO is only 2.2 V, which is lower than the single cell voltage 3.3 V of the LFP and the single cell voltage 3.7 V of the NCM. For battery packs with the same capacity (kWh), when the high-voltage battery pack solution (more cells connected in series and less cells connected in parallel; the nominal voltage is about 650 V) is compared with the low-voltage battery pack solution (more cells connected in parallel and less cells connected in series; the nominal voltage is about 400 V), the former is complex in design and control of the battery management system (BMS), high in material and manufacturing cost of the complete battery pack, and poor in system redundancy and robustness; while the latter is more likely to take advantage of the mainstream new energy passenger vehicle voltage platform (such as the range of 300 V-450 V) to obtain more cost-elective battery packs, and guarantees quality and supply by multiple channels. Mixing and matching preferred battery packs of at least two different electrochemical cells connected in parallel is good for improving the cost effectiveness of the ACE HDT system. At present, the nominal voltages of the Li-ion power battery packs used in global mainstream new energy passenger vehicles range from 300 V to 500 V (referred to as the 400 V platform battery packs). There is a mature supply chain. The total annual production and sales of automotive-grade Li-ion power batteries of more than ten leading manufacturers in China, Japan and South Korea accounts for more than 85% of the global market share, the global production of the 400 V platform battery packs is increasing rapidly year by year, and the cost (USD/kWh) is decreased significantly year by year; while the annual global production of battery packs (referred to as 900 V platform battery packs) with a voltage rating higher than 600 V is more than an order of magnitude smaller, the cost is higher, the qualified suppliers are few, and the annual price reduction is low. The peak electric power of the ePSD 123 of the present invention can be up to 500 kW, and the preferred range of nominal voltage of the DC bus is 600 V-800 V (i.e., 800 V platform). The preferred nominal voltage value of the battery packs (130a&b) used in the disclosure is between 350 V and 450 V, as tar as possible to coincide with the nominal voltage range of the battery packs used in mainstream new energy passenger vehicles with the huge annual total production and sales to facilitate making full use of the mature 400 V platform power battery supply chain of the new energy passenger vehicles nowadays, reducing the cost and guaranteeing the supply. These battery packs 130a or 130b can match the voltage rating of the ePSD 123 DC bus through the 100 kW-level bidirectional Boost-Buck DC-DC converter (Boost-Buck, also called the chopper) 132a or 132b in the port III of the ePSD 123, as shown in FIG. 2 in addition to DC voltage transformation, the chopper (132a&b) has another beneficial function of regulating the charge-discharge current amplitude and direction of the battery packs 130a&b automatically and accurately through the PWM within 0%-100% of the charge-discharge current peak value according to the charge-discharge characteristic curves of various battery cells at different temperatures or in different life cycle stages (SOH) as well as the manufacturer's various limitations on the operating conditions for cycle life and safety guarantee of the battery cell through the software definition and OTA of the microprocessor contained in the chopper (132a&b) to ensure that both the performance and cycle life of the battery pack are optimized in the full life cycle. The cost-effective technical measures such as performing intelligent pulse preheating (iPH) on the battery packs 132a&b by means of the chopper 130a&b in cold winter can also be taken to solve the industry problem that the Li-ion batteries are afraid of cold but difficult to heat efficiently and evenly, which will be detailed below.

Preferably, the primary battery pack 130a can adopt lithium titanate oxide (LTO) cell combination with the total capacity of 12 kWh-26 kWh, and can be charged and discharged for 5C-10C continuously; the pulse peak charge-discharge current is 15C-30C in 10 or 15 seconds, and the equivalent deep charge-discharge (100% DoD cycle life (i.e., the accumulated total charge throughput in the full life cycle) exceeds 12,000 times; and the working environment temperature is −30-+55° C. Among worldwide modern commercialized automotive power cells of various electrochemical formulations, only a set of LTO cells can satisfy all the above strict requirements of the ACE HDT battery packs, especially the requirements of ultra-long cycle life and low-temperature HRPSoC. The disadvantage of low specific energy (Wh/KG) of LTO cells has little effect on the application of ACE HDTs, but another disadvantage of LTO battery packs is high cost and few qualified suppliers available worldwide. The cost (yuan/Wh) of the cells per kilowatt-hour (kWh or degree) is above three times the cost of other mainstream automotive Li-ion cells (such as LFP, NCM and NCA), which leads to high cost of LTO battery packs. If the LTO cells are used completely, it will seriously limit the wide application of ACE HDT in the world due to too high total cost of the battery pack. For the primary battery pack 130a, the following power cells, such as NiMH battery, LFP battery, NCM/NCA battery or PbC battery, suitable for HRPSoC applications in severe working environment can be further selected. At least two sets of such four kinds of cells may be required for satisfying the requirements of the 100% DoD ultra-long cycle life exceeding 12,000 times. The costs (yuan/Wh) for the four kinds of cells are all obviously lower than those of the LTO cells, but two sets of systems are required for satisfying the ultra-long cycle life requirements. The parallel hybrid collocation of battery packs of the above several kinds of cells with different electrochemical components can be taken into consideration, as shown in FIG. 2, and the gross capacity of the battery packs (130a and 130b) is increased to 40 kWh-90 kWh so as to achieve the optimal cost effectiveness of the battery pack within the full life cycle of ACE HDTs.

Preferably, the auxiliary battery pack 130b can adopt mainstream Li-ion power-type cells (continuous charge-discharge rate 3C+) with the capacity of 20 kWh-50 kWh, such as lithium iron phosphate (LFP) or ternary lithium (NCM or NCA). Of course, an auxiliary battery pack 130b with a capacity of more than 50 kWh can be further selected, which is in favor of improving the power performance of the complete vehicle under various operating conditions and reducing the upper limit value and the charge-discharge peak rate of the equivalent cycle life of the battery pack, but the weight, volume and cost of the large-capacity battery pack, are all obviously increased, the overall cost effectiveness is not optimal, and comprehensive consideration is required. In the present invention, the function of the battery pack is like a high-power engine with a small fuel tank, which has the characteristics of high explosive power but insufficient endurance. The battery packs 130a&b can be used for not only providing the 120 kW nominal electric power of the driving motor (140 or 170) for a long time (more than 10 minutes) continuously, but also providing the peak electric power of the driving motor above 300 kW within a short time (at the minute level). Provided that the total available capacity of the battery pack is 30 kWh, and the nominal power of the driving motor is 300 kW; with zero power output from the generator set in the series hybrid mode, the battery pack is continuously discharged at 10C from the upper ted line (URL) of its state of charge (SoC) to the lower red line (LRL), the driving motor can be continuously supplied with power at the intensity of 300 kW for 6 minutes to allow the pure electric driving of the fully loaded (with a gross weight of 40 tons) ACE HDT on a flat and non-congested highway at the speed of 90 km/h for nearly 10 km.

The ACE HDT is provided with the power-type battery pack that needs to support the charge-discharge demand of the driving motor for total continuous power of nearly 200 kW or 10-second pulse peak power of nearly 400 kW When the preferred effective capacity of the battery packs (130a&b) ranges from 25 kWh to 65 kWh, the average continuous charge-discharge rate of the battery pack ranges from 3C to 8C, the 10-second peak charge-discharge rate ranges front 6C to 16C, and the charge rate (continuous or peak) of the battery pack is often higher than the discharge rate, working in an asymmetric mode. To achieve the accumulated fuel saving by 30% during the operation for a distance of 500,000 miles compared with the traditional diesel HDT, the equivalent accumulated charge throughput of the battery pack of the ACE HDT in the full life cycle (i.e., 500,000 miles) should be up to 300,000 kWh. If the battery pack with an effective capacity of 30 kWh in the beginning of life (BOL) is used, the 100% DoD cycle life of the battery pack should be up to 12,000 times considering that the capacity of the battery pack is decreased by 20% at the EOL. The requirements of the battery pack of the ACE HDT for the performance and life of the battery cell are significantly higher than those of the new energy passenger vehicle for the battery cell. Subject to the current technical route and industrial development level of automotive-grade Li-ion battery cells in the world, the actual performance and cycle life of battery pack are closely related to the instantaneous operating conditions (such as current, voltage, temperature, SoC and SOH) of cells. The ACE Hu requires the chopper (132a or 132b) to communicate with the BMS in real time. According to the instantaneous state of charge (SoC), cell temperature, state of health (SOH) and other data of the battery pack (130a or 130b), dynamical control on the actual charge/discharge rate of the battery pack can achieve the performance and cycle life optimization of the battery pack more effectively and reliably.

In order to guarantee a standard performance and achieve an ultra-long cycle life of the power-type battery pack, the current amplitude and direction of high rate state of charge must be dynamically adjusted under the HRPSoC condition according to the condition data (such as SoC, Sol, temperature and voltage) of the battery packs 130a&b, and the time-varying function of the SoC of all the cells of the battery pack must be controlled strictly. The URL, of the SoC of the power-type cell is generally between 80% and 90%, the LRL, is generally between 10% and 20%, the best upper limit (BUL) is between 65% and 75%, and the best lower limit (BLL) is between 30% and 40%. The battery pack SoC provides optimal performance, safety and cycle life for all cells when working in the high efficiency zone between BLL and BUL. The core of the predictive charge control strategy for battery pack is to maximize the stable operation of battery pack in the high efficiency zone on the premise of optimizing the power performance and energy saving and emission reduction effect of the ACE HDT. If the HRPSoC is forced beyond the red line range of the SoC of the battery pack, it will have a serious long-term negative impact on the instantaneous performance, safety and cycle life of the battery pack, which should be avoided.

For the ACE HDT (110 in the series hybrid mode (with the clutch 111 disengaged) or parallel hybrid mode (with the clutch 111 engaged), the VCU 201 and the AIU 202 jointly perform Intelligent Stop Start (iSS) in the series hybrid mode or Intelligent Power Switching (iPS) in the parallel hybrid mode on the instantaneous output power of the engine 101 according to the energy saving and emission reduction machine learning algorithm, vehicle configuration parameters, operating conditions of the complete vehicle and each related subsystem, instantaneous road load power and 3D information (especially the longitudinal slope function) of the road within the range of electronic horizon, so as to instantaneously satisfy the power balance equation (2-4) or (3-3) and continuously adjust the time average value (e.g., rolling time average power in live minutes) of the engine output power. The continuous operation of the battery packs (130a&b) of the ACE HDT in any one of the following three charge modes (CS, CD, CI) and the smooth switching between the modes can be realized by controlling the 100 kW-level dynamic distribution of electric power among the three ports of the ePSD 123: 1) In the Charge-Sustaining (CS) mode, both the instantaneous SoC time-varying function (referred to as instantaneous SoC) and minute-level time average SoC function (referred to as average SoC) (if the battery pack need to be always maintained to continuously fluctuate between the BUL and the BLL. At this time, the minute-level time average output power function of the engine 101 (referred to as engine average power) is basically equal to the minute-level time average value of the vehicle road load power (referred to as road load average power), the vehicle driving (series or parallel hybrid) is dominated by the engine 101, the battery pack 130a or 130b supplies power to the driving motor 140 or 170 to realize peak load shifting on the instantaneous road load power and satisfy the vehicle dynamics equation (1-1) in real time; 2) In the Charge Depleting (CD) mode, the instantaneous SoC of the battery pack continuously fluctuates while the average SoC continuously declines between the LRL and the URL At this time, the average power of the engine is obviously less than the average power of the road load, the vehicle driving (series or parallel hybrid) is supplemented by the engine 101, the driving motor 140 or 170 is mainly supplied with power by the battery pack 130a or 130b to realize peak load shifting on the instantaneous road load power and satisfy the vehicle dynamics equation (1-1) in real time; 3) In the Charge-Increasing (CI) mode, the instantaneous SoC of the battery pack continuously fluctuates while the average SoC continuously rises between the LRL and the URL. At this time, the average power of the engine is obviously greater than the average power of the road load, the vehicle driving (series or parallel hybrid) is dominated by the engine 101 and supplemented by peak load shifting of the driving motor on instantaneous road load power to satisfy the vehicle dynamics equation (1-1) in real time. Most of the mechanical power of the engine is directly used for driving the vehicle in the parallel hybrid mode or indirectly used for driving the vehicle in the series hybrid mode, and the surplus mechanical power is used for continuously charging the battery pack 130a or 130b through the generator 110, thereby ensuring that the SoC average value of the battery pack continuously rises over time.

There are two types of electric energy stored in battery packs 130a and 130b. One is the "engine charge" generated by the generator 110 driven by the engine 101, which is "high cost electric energy" referred to as "engine electric energy"; the other is the "regen charge" generated by mechanical energy of the vehicle recovered by regenerative braking of the motor 110, 140 or 170, which can be regarded as "quasi-zero electric energy", referred to as "regen electric energy" To minimize the overall fuel consumption (FC; L/100 km) of the ACE HDT in the whole transportation event, the electric energy (i.e., charge) in the battery pack (130a or 130b) needs to be discharged and charged whenever we like to improve the accumulated total throughput capacity (kWh; the sum of engine electric energy and regen electric energy) or turnover rate of charge (defined as the ratio of the accumulated total throughput capacity to the equivalent battery pack capacity) of the battery pack in each transportation event Secondly, it is necessary to maximize the proportion of regen electric energy in the total electric energy, while minimizing the proportion of engine electric energy; and minimize the occurrence probability of the undesirable scenario that because the SoC of the battery package reaches the URI, and fails to accept the newly added regen electric energy, the voltage-controlled switch 133 is turned on, and the brake resistor 131 completely wastes the regen charge. According to the priori 3D road data in the vehicle-mounted map unit 240, vehicle configuration parameters and dynamic condition data, the ACE HDT can accurately calculate the instantaneous power space-time function and average power space-time function of the road load (minute-level rolling average) in the electronic horizon (at an hour level or in a 100 km-level) with a kW-level granularity in real time (with sub-second level delay), unless in the special case that the accumulated recovered regen charge (i.e., quasi-zero charge) exceeds the total effective capacity of the battery pack when the vehicle encounters a long downhill (e.g., more than 10 km). The fuel-saving robot of ACE HDT always have forethought. By dynamically adjusting the difference between the average power of the road load and the average power of the engine, in the way of just-in-time (JIT) production, the battery pack is discharged and charged to maximize the stable operation of the battery packs 130a&b in the high efficiency zone, thereby avoiding two undesirable scenarios that the battery pack is too full (SoC reaches the URL) to recover regen electric energy or too empty (SoC reaches the LRL) to provide driving explosive power. And it seeks to maximize the turnover rate of the regen charge and minimize the turnover rate of the engine charge. Obviously, it in cost-effective to provide a large-capacity power-type battery pack (such as an effective capacity of more than 50 kWh) for ACE HDTs operating in high mountain areas for a long time; while provide a power-type battery pack with an effective capacity less than 30 kWh for ACE HDTs operating nationwide. The core (i.e., the fundamental core function of Level I fuel-saving robot eBOT) of the fuel saving strategy for the ACE HDT of the present invention is to dynamically adjust the path, amplitude, or direction of mechanical power flow and electric power flow of the vehicle by performing PWM or pulse-amplitude modulation (PAM) on the instantaneous power of engine or battery pack through predictive adaptive cruise control (PACC) (i.e., one-dimensional longitudinal L1 automatic driving) by making full use of the prior 3D data of the road in the electronic horizon and the 100 kW-level longitudinal slope power positive and negative fluctuations brought by the longitudinal slope change along the road on the premise of ensuring the power performance and active safety of the vehicle to satisfy the vehicle dynamics equation (1-1) and power balance equation (2-4) or (3-3) in teal time. The battery packs 130a&B stably work in any one of the three modes of CS, CD and CI or smoothly switch among the three modes to maximize the accumulated regen charge throughput or turnover rate of the battery packs while minimizing the accumulated engine charge throughput or turnover rate, so as to realize the predictive SOC control (PSC) function and achieve the beneficial effect of energy saving and emission reduction optimization of the vehicle.

In the series hybrid mode (with the clutch 111 disengaged), when the battery packs 130a& 130b are discharged, driving power is supplied to the ACE t 010 through the driving motors 140 and 170, and when the battery packs 130a& 130b are charged, the energy is recovered through the regenerative braking of the driving motors 140 and 170; in the parallel hybrid mode (with the clutch 111 engaged and locked), in addition to the engine 101 directly involved in vehicle driving or braking, the generator 110 can also be involved in vehicle driving or regenerative braking to recover energy, which can further increase the regen charge throughput and improve the fuel saving effect. If the ACE HDT is climbing a long slope and the battery packs 130a&b are basically exhausted (SoC reaches the LRL), the ACE HDT at this lime should work in the parallel hybrid mode, and its power performance depends entirely on the peak power of the engine 101. If the peak power of the engine 101 is not large enough, the truck has to shift to a lower gear to speed down and continue to climb the slope, temporarily reducing the power performance and freight timeliness of the vehicle. The generator 110 and/or the driving motors 140&170 can take a chance for charging the battery packs 130a&b by regenerative braking again until there is a level road or downslope ahead of the vehicle considered.

After parking outdoors at low temperature (below 0° C.) for a long time (more than ten hours) in winter, the HDT for long-haul freight generally needs to idle at parking to warm up the engine for a few minutes before running. The LTO battery pack can still maintain high rate charge-discharge performance of more than 75% after being placed outdoors at minus 30° C. for a long time (more than 10 hours), with small capacity decline and no impact on cycle life. Moreover, the cell will be heated internally in an uniform mode due to bidirectional pulse current excitation under the HRP-SoC condition. The internal heating rate of the cell is higher than 1.0° C./minute, and the optimal working temperature of all the automotive-grade Li-ion battery cells is basically plus 25° C. Heat is constantly generated inside the cells when the power-type battery packs 130a&b of the ACE HDT run under the HRPSoC condition for a long time, so it is necessary to configure a liquid cooling unit to basically maintain the temperature inside the battery packs at 25° C. In addition to the cooling function, the unit can also be provided with a PTC electric heater to preheat the refrigerant fluid and perform external heating on the cells.

In addition to the LTO cell is not afraid of cold, the mainstream automotive-grade battery cells such as NMC or LFP are afraid of cold. At high-rate discharge below minus 10° C. (2C+), the effective capacity is severely reduced temporarily (lees than 50%), but low-temperature high C-rate discharge will not permanently damage the cells. At high C-rate charge below 0° C. (2C+), not only the effective capacity is severely reduced temporarily, but also lithium plating on the graphite anode of the cell will happen, resulting in permanent damage to the cell life, and even causing a short circuit inside the cells and thermal runaway, leading to a fire. In cold winter, the LFP or NMC cell must be preheated to plus 10° C. before it starts to work under the HRPSoC condition. There are two types of low temperature preheating methods for Li-ion cell, external heating method and internal heating method. The existing electromechanical systems that perform external heating method (gas heating or liquid heating) are mature, relatively simple and cost-controllable, but cannot guarantee uniform heating. The significant temperature gradient in the battery pack has an irreversible negative impact on the overall long-term performance and cycle life of the battery pack. The cell provided with heating wire (such as nickel wire) internally belongs to non-standard special cell, which is not cost-effective and rarely used in the automotive-grade power-type battery pack. Heating low-temperature cells through current excitation, such as low-temperature DC preheating or AC preheating, is the mainstream internal heating method at present. The internal heating method can ensure uniform heating of the cell inside the battery pack and very small temperature gradient, which has no negative impact on the overall long-term performance and cycle life of the battery pack. However, the internal heating method will waste most of the electric energy because the equivalent internal resistance of the battery pack is far less than the load resistance of the external electric circuit, and the cell heating efficiency (the ratio of the energy of cell heating to the total power consumption) is far less than 50%.

The present invention further includes the following device and method of "intelligent pulse preheating" (iPH) technology for realizing uniform, efficient and accurate preheating for the internal cells of the battery packs 130a&b of the ACE HDT The lithium-ion battery industry agrees that the low-temperature high-rate discharge does not permanently damage the cells (NMC, LFP and other mainstream automotive-grade cells), but the low-temperature high-rate charge permanently damages the cells. If the width of rectangular pulse of equivalent impulse current can be strictly controlled within L5 seconds at high-rate charge of low-temperature cells, and zero current or discharge pulse current of at least three times the above pulse width time can be combined, it can not only heat the cells uniformly by the bidirectional pulses current excitation inside the cells, but also avoid slow electrochemical reaction (with a reaction time of above 2 seconds) of lithium plating on the graphite anode of the cells, so as to eliminate the irreversible negative impact of low-temperature (below minus 10° C.) rapid charge (above 2C) on the performance and life of Li-ion cells. The specific technical measures are as follows: Before the engine is started in cold state for the first time after long-term (more than ten hours) parking outdoors (below minus 10C) of the ACE HDT in cold winter, all the motors (110, 140, 170) do not work, the VCU 201 can enable the automatic wake-up of the system and activate the iPH function of the battery packs 130a&b according to the driver's preset advance warm-up time, and the primary battery pack 130a plus chopper 132a and the auxiliary battery pack 130b plus chopper 132b will charge of discharge each other in an asymmetric bipolar PWM current time sequence mode, provided that the primary battery pack 130a is the high-pulse discharge side (referred to as the discharge side) and the auxiliary battery pack 130b is the high-pulse charge side (referred to as the charge side). The PWM pulse sequence consists of a high-amplitude narrow pulse and a low-amplitude wide pulse with opposite polarity. The amplitude of the high pulse is between 3C and 15C (a positive value of current represents discharge and a negative value represents charge), and the high-amplitude pulse width is between 0.5 seconds and L5 seconds; the amplitude of the low pulse is one $N_{iPH}$ of the amplitude value of the high pulse, the current polarity is opposite, and the low pulse width is $N_{iPH}$ times the high pulse width. The $N_{iPH}$ is a positive integer between 3 and 10. Obviously, the impulse (i.e., the time integral of the current pulse) of one cycle of the current PWM pulse sequence is zero. The above current PWM pulse time sequence is generated by the choppers 132a and 132b cooperatively. The discharge side (130a) and charge side (130b) are mutual loads and can charge each other. The discharge side discharges quickly and charges slowly, while the charge side charges quickly and discharges slowly. In addition to a pan of the electric energy preheating cells internally in the pulse current excitation mode, the remaining electric energy is basically recovered by the discharge side or charge side, and very little electric energy is wasted by other electric loads in the circuit. The heating efficiency (the ratio of the energy of cell heating to the total power consumption) is significantly larger than 50%. The iPH technology is suitable for both a hybrid battery pack system comprising the LTO primary battery pack (030a) and the LFP or NMC auxiliary battery pack (130b), and a uniform battery pack system comprising the main and auxiliary battery packs with the same cell (such as LTO, LFP and NMC).

The iPH technology defines and dynamically adjusts the amplitude, width and $N_{iPH}$ (equivalent to PWM duty cycle) of the high pulse of the current PWM pulse sequence through software, so as to achieve the purpose of dynamically controlling the time-varying function (° C./minute) of the cell temperature and that of the heating rate, thereby optimizing the performance of battery pack, especially low temperature performance, and cycle life. The internal Li-ion cell is a complex and fragile electrochemical ecosystem. If the cell is heated too fast at low temperature, it will have an irreversible negative impact on cell cycle life. The preferred heating rate is less than 2.0° C./min. The iPH technology of the present invention provides an efficient, uniform, accurate and adjustable cell internal preheating function for the power-type battery packs (130a&b) of the ACE HDT without adding any new hardware, which is more cost-effective than various existing technologies for low-temperature heating of battery packs. Obviously, the iPH technology is not only applicable to the ACE HDT, but also to the electric hybrid technology of the light-duty vehicles, especially the hybrid light-duty vehicles with the electrical power split device ePSD 123.

In the next 20 years, the annual cost effectiveness improvement rate of power electronic (PE) power modules based on silicon IGBT or silicon carbide (SiC) MOSFET will be significantly higher than that of motors or battery packs. Continuously refer to FIG. 2, priority should be given during the design of the six 100 kW-level PE power modules contained in the ePSD 123 (e.g., the port I is internally connected with the standard inverter 121, the port II is internally connected with the standard primary inverter 122a and the optional auxiliary inverter 122b, the port III is internally connected with the voltage-controlled switch 133, the standard primary chopper 132a and the optional auxiliary chopper 132b and the like) to leave over-design in the function and performance (especially the nominal power and peak power) of power electronic hardware, in order to continuously improve the existing performance and functions of each subsystem or add new functions through the OTA in the full life cycle of the ACE HDT. The peak power $P_{igx}$ of the inverter 121 should be more than 15% higher than the peak power $P_{gx}$ of the generator 110, the peak power $P_{imx}$ of the main inverter 122a should be more than 15% higher than the peak power $P_{pmx}$ of the primary driving motor 140, and the peak power of the auxiliary inverter 122b should be more than 10% higher than the peak power $P_{smx}$ of the auxiliary driving motor 170, $P_{pmx} > P_{smx}$. The peak power of the primary chopper 132a and the auxiliary chopper 132b should be more than 15% higher than that of the primary battery pack. 130a or the auxiliary battery pack 130b respectively, and the total peak power of the choppers 132a&b should be more than 20% higher than the peak power $P_{pmx}$ of the primary driving motor 140. The nominal power of the voltage-controlled switch module 133 should be more than 15% higher than that of the primary driving motor 140.

Power semiconductor modules such as IGBT or SiC can improve the average cost effectiveness pet year more quickly than the battery pack, motor and brake resistor. The continuous innovation and upgrading of the global power semiconductor industry can be fully utilized to achieve a cost-effective ePSD 123 by using a variety of power electronic circuit topologies. The ePSD 123 with hardware design margin is a software defined electrical power split device from the beginning, and can continuously improve and evolve the existing functions or add new functions through the OTA. With the above modular design strategy, the three ports of the ePSD and external electrical loads such as motors, battery packs or brake resistors can adopt standard mechanical and electrical interfaces in the industry, which are convenient and flexible for adapting to various motors and battery packs provided by many high-quality automotive suppliers that satisfy the performance requirements and target cost. The cost effectiveness of ACE HDT's can be continuously improved, and the quality and supply can be guaranteed for a long term.

The inverter is the core of the modern motor control unit (MCU). In the disclosure, the inverter should be understood as follows: there are a variety of mature circuit topologies that are achievable for the complete MCU with the inverter as the kernel module, so that there is no ambiguity for those skilled in the art. The inverters (121, 122a, 122b) can control the speed or torque of the three-phase AC motors (110, 140, 170) in a vector control mode dynamically and accurately, so that the amplitude and direction of 100 kW-level motor power flow can be regulated continuously in real time (10-millisecond level). The chopper 132a, 132b is a bidirectional buck boost DC-DC converter (Boost-Buck), the high-voltage side is bidirectionally and electrically connected with the DC bus of ePSD 123, preferably the nominal voltage range of the DC bus is 620 V-750 V; the low-voltage side is bidirectionally and electrically connected with the battery packs 130a&b, preferably the nominal voltage range of the battery pack is 320 V-450 V, and the low-voltage side should be close to the voltage platform of the mainstream new energy passenger vehicle as much as possible. Of course, a higher nominal voltage range (600V-750V) of the battery pack is also optional, but the cost effectiveness of the battery pack is suboptimal. The choppers 132a&b can not only flexibly match the battery packs 130a&b with different nominal voltages (320V-750V) through software definition, but also automatically customize and dynamically update the charge-discharge control solution for each battery pack through the HDT program for software definition and OTA of the choppers according to different charge-discharge technical requirements put forward by the power battery supplier for the cells at different internal temperature and SoC in order to ensure the performance, safety and cycle life of the cells in the full life cycle, thereby maximizing the dynamic compensation of weaknesses in high-low temperature operating performance, reliability and cycle life of the battery packs (130a&b).

The VCU 201 and the AIU 202 of ACE HDT can enable ePSD 123 to regulate three interdependent 100 kW-level electric power time functions, including generator power $P_g(t)$ as an independent variable, driving motor power $P_m(t)$ as an independent variable, and battery pack charge/discharge power $P_b(t)$ as a dependent variable, continuously in real time according to the fuel saving control strategy and fuel saving machine learning (ML) algorithm, to satisfy the electric power balance equation at the ePSD DC bus junction X at any time:

$$P_m(t)+P_g(t)-P_b(t)=0. \quad (6\text{-}1)$$

The electric power balance equation is equivalent to the previous equation (2-2) in the series hybrid mode and the equation (3-2) in the parallel hybrid mode.

Preferably, the standard primary driving motor (MG2) 140 is a low-speed high-torque large permanent magnet synchronous motor, with a nominal power range of 200 kW~300 kW, a peak power range of 300 kW~450 kW and a peak torque range of 1,800 Nm~2,500 Nm. The driving motor 140 can also be a low-speed high-torque large AC induction motor or a reluctance motor meeting the power and torque requirements. The peak power of the main inverter 122a should be more than 15% higher than that of the primary driving motor, and a margin is reserved. Since the annual sales of the hybrid passenger vehicles is two orders of magnitude higher than the annual sales of the hybrid commercial vehicles, some core components shared with the passenger vehicles are selected as far as possible, so as to effectively reduce the cost of the hybrid commercial vehicles and guarantee supply in volume production. The nominal power of a single motor and inverter for the electric (hybrid) passenger vehicles is generally lower than 180 kW. An optional permanent magnet synchronous motor with a nominal power of 180 kW~250 kW and a maximum torque of 350 Nm~500 Nm for large new energy passenger vehicles can also be provided for the driving motor 140. The parallel-axis arrangement may be used, and the permanent magnet synchronous motor is connected with the input shaft of the transmission bidirectionally and mechanically through a heavy-duty reducer with a gear ratio ranging from 4 to 8.

For the 6×2 or 6×4 ACE HDT system block diagram in FIG. 1, a standard generator (MG1) 110 is connected bidirectionally and mechanically to the flywheel end of the engine 101 (the so-called hybrid P1 position) and to the driven end of the clutch 111. The specific mechanical connection structure can be divided into two types: Type I is the single-axis coaxial structure, in which the three (engine, generator and clutch) are connected to the same mechanical transmission shaft. At this time, the speed of the generator 110 is exactly the same as that of the engine 101 (speed ratio 1.0), and a low-speed high-torque large permanent magnet synchronous motor with a nominal power of 150 kW~200 kW and a maximum torque of 1,200 Nm~2,000 NM can be preferred; Type II is the parallel axis structure (multi-axis), and the three are connected through the gear reducers bidirectional and mechanically. At this time, the generator 110 and the engine 101 are connected through heavy duty gear reducers, and the speed ratio is fixed. The speed of high efficiency zone of HDT engine is generally 1,000 rpm~1,800 rpm, and the peak torque range is 2,000 Nm~2,500 Nm. The engine has the lowest specific fuel consumption (BSFC, g/kWh) when working stably at low speed and high load. The power of the engine and motor is directly proportional to the product of their speed and torque, and the maximum torque of the engine and generator has highly positive correlation with their volume, weight and price. The use of Type II parallel axis structure can increase the speed ratio between the generator 110 and the engine 101 to 3.0-8.0 through the constant speed ratio heavy duty reducer, so that it is possible to select a high-speed low-torque high-power permanent magnet synchronous motor in the mature supply chain system for new energy passenger vehicles, which greatly reduces the volume, weight and price of the generator 110 and realizes cost-effective quality and supply guarantee. The generator 110 can also be provided with a medium-to-high speed (maximum speed 12,000 rpm) automotive-grade permanent magnet synchronous motor with a nominal power of 150 kW~250 kW and a peak torque less than 500 Nm.

The standard primary driving motor (MG2) 140 is connected bidirectionally and mechanically to the driving end of the clutch 111 (the so-called hybrid P2 position), and to the input shaft of the automatic transmission 150 of the HDT through the large flexible coupler or a clutch-by-wire 152 of the HDT. The specific mechanical connection structure can be divided into two types: Type I is the single-axis coaxial structure, in which the three (clutch, driving motor and transmission) are connected to the same mechanical transmission shaft. At this time, the speed of the driving motor 140 is exactly the same as that of the input shalt of the transmission 150 (speed ratio 1:1); Type II is the parallel axis structure (multi-axis), and the three are connected through gear reducers bidirectional and mechanically. At this time, the speed ratio of the driving motor 140 and the input shaft of the transmission ISO is fixed, with a preferred range 4-8. When the clutch 111 is engaged, the output shaft of the flywheel end of the engine 101 and the input shalt of the transmission 150 are bidirectionally and mechanically connected concentrically and coaxially. The speed of the two is the same, and the speed ratio is 1.0. The peak torque upper limit of the traditional HDT engine is 2,500 Nm, so the maximum input torque upper limit of the current input shaft of the HDT transmission is also 2,500 Nm. With the ACE HDT in the parallel hybrid mode, the engine 101 and the double motors 110&140 can apply force together by torque superposition, and the total torque can exceed 4,000 Nm. The heavy duty AMT subjected to enhanced design is preferred, its input peak torque should be higher than 3,500 Nm, the total number of gears can be reduced to 6 gears, preferably including Direct Drive with a speed ratio of 1.0 and Overdrive with a speed ratio less than 1.0. The use of Type II parallel shaft structure can increase the speed ratio between the primary driving motor 140 and the input shaft of the transmission 150 to 3.0-8.0 through the constant speed ratio heavy-duty reducer, so that it is possible to select a high-power permanent magnet synchronous motor in the new energy passenger vehicle system, which greatly reduces the volume, weight and price of the driving motor 140. The primary driving motor (MG2) 140 can be preferably a permanent magnet synchronous motor or AC asynchronous motor with a nominal power of 175 kW~250 kW. Under Type I structure, the driving motor 140 is a permanent magnet synchronous motor or AC asynchronous motor with a low speed (maximum speed below 3,000 rpm) and a high torque (peak torque above 1,500 Nm); under Type II structure, the driving motor 140 is a permanent magnet synchronous motor or AC asynchronous motor with a medium-to-high speed (maximum speed below 10,000 rpm) and a medium torque (peak torque below 500 Nm). The latter is smaller in size and mass and cheaper than the former.

The optional auxiliary driving motor (MG3) 170 can be configured between the output shaft of the transmission 150 and the driving axle 160 (hybrid position P3) or in front of the second driving axle 180 (hybrid position P3); the motor and the driving axle are connected bidirectionally and mechanically. The peak torque at the input end of the driving axle of HDT can be up to more than 20,000 Nm. A heavy-duty reducer should be installed between the driving motor (MG3) 170 and the driving axle (160 or 180), and the speed ratio range is 8.0~16.0. The high-speed and low-torque automotive-grade permanent magnet synchronous motor or AC asynchronous motor with a nominal power of 100 kW~150 kW and a peak torque less than 500 Nm (Newton meter) are preferred.

In FIG. 1, the input shall of the transmission 15 is connected with the output shaft of the primary driving motor 140 through the large flexible coupler 152 bidirectionally and mechanically, and the output shaft of the transmission is connected with the first driving axle 160 bidirectionally and mechanically. Preferably, the current mature volume production heavy duty 10-18-speed AMT (AMT-10~AMT-18) with the maximum input torque of 2,500 Nm is adopted, or the heavy-duty double-clutch transmission (DCT) or the automatic transmission (AT) with a hydraulic torque converter can also be selected; the emerging 5-gear or 6-gear heavy duty AMT (AMT-5 or AMT-6) with the maximum input torque of greater than 3,500 Nm subjected to enhanced design can also be selected, preferably including Overdrive (speed ratio less than 1.0), in addition to Direct Drive (speed ratio 1.0). Different from the dynamic characteristic that the torque is smaller at low speed of the engine, the torque of the driving motor is the maximum at low speed, so the forward speed gears 5-6 of the automatic transmission are sufficient, and excessive gears are not required. However, the driving rotation system of the ACE HDT in the present invention, including the transmission, is not the standard one-way mechanical power transfer of the traditional engine HDT but two-way mechanical power transfer, and the maximum reverse torque during regenerative braking is basically the same as the forward peak torque, so the design and manufacturing of the main bearings and gears in the transmission 150 should be specially strengthened, and then it can be ensured that the performance and life of the transmission can meet the standard reliably.

In the disclosure, the auxiliary driving motor (MG3) 170, the inverter 122b (MCU) and the second mechanical driving axle 180 can be combined to form an "integrated e-axle". The traditional 6×2 HDT with diesel engine can also be equipped with an integrated e-axle to become a 6×4 hybrid HDT, but at this time, the pure mechanical powertrain of the engine and transmission and the integrated e-axle operate independently of each other, there is a lack of close coordination, and the fuel saving effect is not the best. Unlike prior art, for the ACE HDT in FIG. 1 of the disclosure, its integrated e-axle is dynamically strongly coupled and closely dynamically coordinated with mote than one subsystem including engine 101, engine control unit 102, generator (MG1) 110, ePSD 123, primary driving motor 140, battery packs 130a&130b, clutch 111, transmission 150 and transmission control unit 151, and are jointly controlled by the VCU 201. Depending on specific vehicle conditions and the road conditions, through the dynamic adjustment of the path, amplitude and direction of mechanical power flow or electrical power flow of the vehicle powertrain, the ACE HDTs are jointly driven to achieve the beneficial effect of optimizing energy saving and emission reduction of the vehicle, while also improving vehicle power and braking performances, and increasing the redundancy of the vehicle power system and brake system.

A large HDT diesel engine or natural gas engine with a displacement of 11 L-15 L, a peak power of 280 kW~450 kW and a peak torque of 2,000 Nm~2,500 Nm can be selected for the engine 101; a medium and HDT diesel engine or natural gas engine with a displacement of 7 L-10 L, a peak power of 250 kW~320 kW and a peak torque of 1,500 Nm~2,100 Nm can also be selected. The mixed hybrid ACE HDT is preferably provided with the mainstream diesel engine with a displacement of 11 L-13 L in the world. For example, the ACE HDT is equipped with a 11 L diesel engine 101 (base model or advanced model) (with a peak torque of 2,200 Nm@1,200 rpm and a peak power of 300 kW@1,800 rpm) with the largest consumption in the current market; a permanent magnet synchronous generator 110 with a nominal power of 175 kW and a peak torque of 1,400 Nm; a permanent magnet synchronous driving motor 140 with a nominal power of 200 kW and a peak torque of 1,600 Nm; ultra-long life power-type battery packs 130a&b with a continuous charge-discharge power (nominal power) of greater than 250 kW and an effective capacity of 30 kWh at the EOL; in the parallel hybrid mode and in the high efficiency zone of the engine (1,100 rpm~1,800 rpm), the engine and the double motors can apply force together, the total driving torque of the input shaft of the vehicle transmission can be up to more than 4,000 Nm, and the vehicle power performance (high-speed climbing with goods, speed up to overtake, etc.) is obviously superior than that of the traditional high-end HDT equipped with top-level 16 L diesel engine. The actual overall fuel consumption (11100 km) of the ACE HDT in freight events with the same load and route is more than 25% lower than that of any traditional diesel HDT, and the optimal fuel consumption that the ACE HDT can achieve completely depends on the fuel saving MIL algorithm of the fuel-saving robot, independent of the driver's driving skill and the consistency is extremely high.

Figure 4:
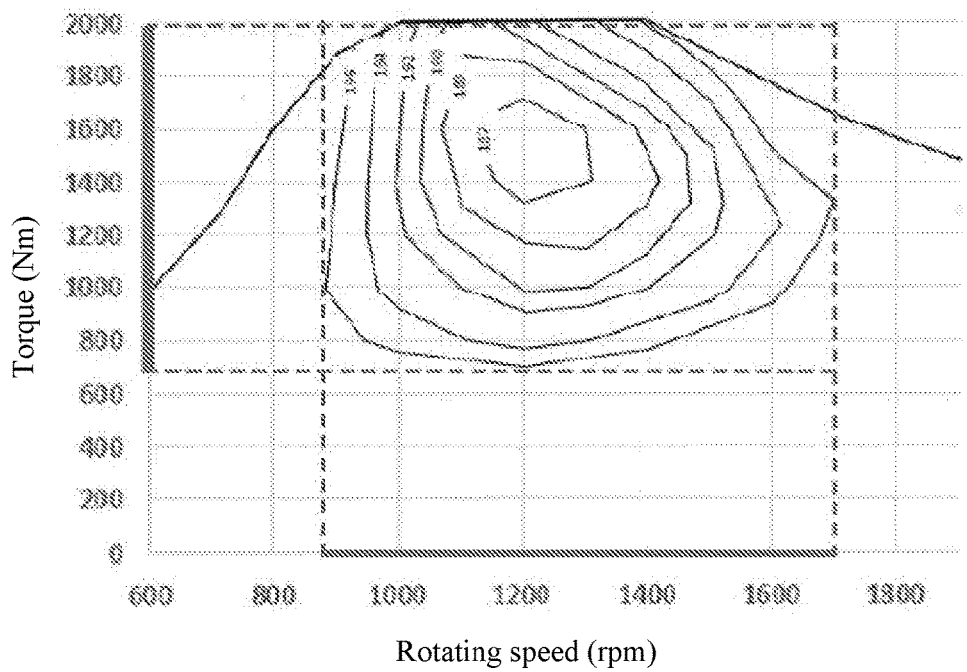
FIG. 4 illustrates a universal characteristic curve of the engine of the ACE HDT of one embodiment of the present disclosure.

FIG. 4 is a universal characteristics curve graph (fuel map) of a 11 L, diesel engine of the typical modern HDT. The engine has a peak torque of 2,000 Nm, a peak power of 300 kW, and the lowest BSFC of 187 g/kWh. The figure is full of several complementary disjoint irregular curves, each of which is a contour line of BSFC. The complete and detailed universal characteristic curve of the engine is the trade secret of the engine manufacturer and will only be shared with the OEMs or related primary suppliers after signing a confidentiality agreement. At present, the lowest BSFC of mainstream HDT diesel engines in volume commercial use in the world is 182 g/kWh, corresponding to the brake thermal efficiency (BTE) of 46%. The HDT diesel engine with BTE of 50%-5% is still in the development stage in Europe and the USA, and they are still more than live years away from mass production and commercial use in Europe and the USA. If the high efficiency zone of the engine is defined as the operating range within the contour BSFC curve with the lowest BSFC of 108%, with reference to FIG. 4, the engine speed range corresponding to the high efficiency zone is 800 rpm to 1,800 rpm, and the torque range is 600 Nm to 2,000 Nm, i.e., the torque load rate 30% to 100%. It is easy to digitize the universal characteristic curve of the high efficiency zone of the engine in FIG. 4 and transform it into a list (look-up table) convenient for computer processing. Preferably, a 140×100 matrix describing the high efficiency zone of the engine is generated with a speed step spacing of 10 rpm and a torque step spacing of 10 Nm, each row of the matrix corresponds to constant torque and each column corresponds to constant speed, and each element (specific row/column number) in the matrix corresponds to the BSFC (g/kWh) of an engine operating point (specific speed/torque), called "original BSFC list" (referred to as "original list"), and the original list reflects the original design index of the engine. The engine control unit (ECU) 102 of the ACE HDT 010 can generate a "corrected BSFC list" (referred to as "modified list") every two days or 1,000 miles according to the actual operation of the engine 101, and the modified list reflects not only the original design performance index of the engine model, but also the current actual performance index of the specific engine, which is used by the fuel-saving robot.

Example of series hybrid iSS: Provided that the nominal power of the generator 110 of the ACE HDT is 175 kW, preferably the operating point of the engine 101 with speed 1,200 rpm and torque 1,400 Nm in the modified list is the "best operating point" (HOP), and the engine power at this point is 176 kW which can also be called "high-state operating point"; and preferably the engine runs at 600 rpm idle without combustion, the resistance torque of the engine at this time can be approximated as −250 Nm, and the engine power at the non-combustion idle (NCI) point is −16 kW, which can also be called "low-state operating point". The ECU 102 controls the operating point of the engine to dynamically switch between BOP and NCI to realize the bipolar asymmetric rectangular PWM of the instantaneous power function of the engine 101 in the series hybrid mode. Preferably the cycle $T_c$ of the PWM pulse sequence ranges from 10 seconds to 60 seconds, and the duty cycle $k_s$ (i.e., the ratio of the BOP operation occupation to the pulse cycle $T_c$ in the same cycle) is arbitrarily adjustable between 0.0 and 1.0. Obviously, the minute-level rolling time average power function (referred to as the average power function) value of the engine can be continuously and arbitrarily adjustable between −16 kW and 176 kW in the series hybrid mode by dynamically adjusting the duty cycle $k_s$. According to the series hybrid power balance equation (2-4) and the vehicle dynamics equation (1-1), the instantaneous power PAM pulse sequence of the battery pack 130a&b synchronized with the instantaneous power PWM pulse sequence of the engine 101 can be generated by the ePSD 123 and the power-type battery pack 130a or 130b cooperatively. Preferably, the cycle of the PAM pulse sequence of the battery pack is one-tenth of the cycle $T_s$ of the PWM pulse sequence of the engine, which can adopt both natural sampling (curve-top sampling) and equivalent flat-top sampling.

Example of parallel hybrid iPS: The configuration parameters of the ACE HDT are the same as the above example. The gear shifting control strategy of the transmission 150 can always control the speed of the engine 101 in the high efficiency zone. With reference to FIG. 4, the engine speed range corresponding to the high efficiency zone is 900 rpm to 1,700 rpm, and the base speed (the speed of the peak torque center point) of the engine is 1,200 rpm. When the ACE HDT 010 enables the PACC function on non-congested highways, the vehicle speed can be steadily maintained at about 10% of the nominal cruising speed (e.g., 60 miles/hour), that is, the vehicle speed can fluctuate slowly and continuously within a narrow speed band; in the parallel hybrid iPS control mode, the speed of the engine 101 is a dependent variable and fluctuates slowly and continuously within a narrow speed band (1,080 rpm to 1,320 rpm) of about 10% delta around the base speed 1,200 rpm); while the engine torque is an independent variable and can change rapidly and continuously below the peak torque. Corresponding to the dependent variable of instantaneous speed of each engine, in the correct list, with a refresh rate of no less than 10 Hz, the high-state operating points with the minimum BSFC and the maximum torque in the high efficiency zone of the engine and the line connecting all the different high-state operating points of the PWM pulse sequence in the high-state operation period are selected in real time to form a high-state operating line. Obviously, the high-state operating line is an irregular curve that slowly changes with time in the high efficiency zone of the engine. The instantaneous power of the engine corresponding to each high-state operating point on the line is between 200 kW and 251 kW, and the high-state arithmetic average power is 225 kW. Corresponding to each low-state operating point, when the engine 101 runs without combustion and is driven by the generator 110, the resistance torque can be approximated as −300 Nm. All different low-state operating points are connected to form a low-state operating line, which can be approximated as a constant torque operating line in the fourth quadrant (i.e., negative torque and positive speed) of die universal characteristic curve of the engine. The instantaneous power of each low-state operating point is between −41 kW and −34 kW, and the low-state arithmetic average power is −38 kW. Obviously, in the iPS mode, the ECU 102 controls the engine to dynamically switch between the high-state and low-state operating lines, and performs PWM on the instantaneous power function of the engine, generating a bipolar asymmetric non-rectangular PWM pulse sequence. The optimal cycle $T_p$ of the PWM pulse sequence ranges from 10 seconds to 60 seconds, and the duty cycle $k_p$ (i.e., the ratio of the high-state operation occupation to the pulse cycle $T_p$ in the same cycle) is continuously adjustable between 0 and 1, so that the minute-level rolling time average power function of the engine 101 can be continuously adjustable between −38 kW and 225 kW in the parallel hybrid iPS mode. According to the parallel hybrid power balance equation (3-3) and the vehicle dynamics equation (1-1), the instantaneous power PAM pulse sequence of the battery pack 130a&b synchronized with the instantaneous power PWM pulse sequence of the engine 101 can be generated by the ePSD 123 and the power-type battery pack 130a or 130b cooperatively. Preferably the cycle of the PAM pulse sequence of the battery pack is one-tenth of the cycle $T_s$ of the PWM pulse sequence of the engine, which can adopt both natural sampling (curve-top sampling) and equivalent flat-top sampling. Although theoretically, the duty cycle ($k_s$ or $k_p$) of the engine PWM pulse sequence is continuously and arbitrarily adjustable between 0 and 1, in fact, from the perspective of noise & vibration & harshness (NVH) optimization of the engine 101 or ACE HDT 010, too short transition time (sub-second level) of the engine 101 switching between the high-state and low-state conditions and insufficient operation time (less than 5 seconds) under the high-state pulse condition should be avoided as much as possible. The dynamic value range of duty cycle should be further restricted. In each PWM pulse cycle, preferably the high-state operation time of the engine 101 is either zero (i.e., the duty cycle is zero) or greater than 5 seconds; if the PWM pulse cycle is selected as 30 seconds, preferably the value range of the duty cycle is zero or greater than 17%; preferably the transition time of switching between the high-state and low-state conditions of the PWM pulse sequence is 1 second. If the speed of the engine 101 is 1,200 rpm, it means that each cylinder of the engine can have 10 combustion power strokes per second, and the engine can complete smooth switching between the high-state and low-state conditions rapidly with the power step spacing (less than 27 kW) of 10% of the high-low state average power difference of the PWM within the transition time of 1 second. The vehicle NVH performance can be optimized to avoid degradation due to the completion of rapid power mutation over 260 kW in 1 power stroke of the engine within too short transition time (such as 0.1 second). Obviously, both the cycle of the PWM pulse sequence and the high-low state transition time of the engine 101 are defined by software and dynamically adjustable, which can effectively avoid the mechanical resonance produced by the ACE HDT 010, and dynamically optimize the vehicle NVH performance in the series hybrid iSS mode or parallel hybrid iPS mode.

The above content describes the ACE HDT system of the disclosure, which is the hybrid powertrain architecture and hardware foundation to realize the ACE HDT fuel saving and emission reduction optimization in the application scenario of long-haul freight, and the specific technical measure to perform PWM or PAM on the instantaneous power functions of the engine 101 and the battery packs 130a&b. Next, we will further describe how to use the vehicle-mounted 3D electronic map, vehicle-mounted navigation equipment and ACE HDT cluster structured big data stored on the cloud computing platform (such as the cloud server) in combination with the fuel saving ML algorithm and cloud platform computing power to train the cloud and vehicle-mounted fuel saving AI brain, perform PACC of the ACE HDT in the same lane on a highway, and achieve the beneficial effect of energy saving and emission reduction optimization.

In some embodiments of FIG. 1, the ACE HDT is equipped with a map unit (MU) 240 and a satellite navigation receiver (GNSS) 220. The map unit 240 stores a priori three-dimensional electronic map (or 3D map) coveting countrywide expressways and other main semi-closed roads, while the 3D map information includes, but not limited to: the longitude and latitude of a whole journey expressway describing the absolute geographical position of the vehicle, especially the information indicating the longitudinal slope of the road (such as the uphill angle $\alpha_u$ and downhill angle $\alpha_d$ shown in FIG. 5). For example, a memory of the vehicle-mounted map unit 240 shown in FIG. 1 can include a 3D map with a meter level positional accuracy (longitude and latitude) of a road and 0.1-degree level accuracy of a longitudinal slope (or road grade). At present, various advanced driver assistance system (ADAS) maps including the above-mentioned three-dimensional information of the road have been commercialized in batches in all major automobile markets worldwide High definition maps (HDT Map) capable of supporting an SAE L3 or IA autonomous driving system have already entered an initial commercializing stage. In description of the present invention, the ADAS maps should be generally construed as inclusion of HD maps.

The Global Navigation Satellite System (GNSS) 220 is used for measuring in real time information such as the longitude, latitude, altitude, longitudinal road slope, longitudinal linear speed, longitudinal linear acceleration and current absolute earth geographic position of the ACE HDT 010. In some embodiments, the satellite navigation receiver adopting a dual-antenna 221 and 222 input carrier phase real-time kinematic (RTK) differential technology ("RTK receiver" for short) 220 can be used for real-time accurate positioning and orientation determination of the HDT at the measuring speed of over live times per second (the measuring frequency is higher than 5 Hz). At present, GNSS has four independent systems, namely GPS of America, Glonass of Russia, Galileo of European Union and BeiDou (BD) of China. At present, the BeiDou Navigation Satellite System III can provide latest satellite navigation services for the Asian-Pacific region centered on China and for countries along "The Belt and Road", and it is predicted that the global coverage can be finished in 2020. At the same time, BeiDou system of China has signed a compatible protocol with the other three satellite navigation systems. Preferably, the satellite navigation receiver (GNSS) 220 including the latest BDS-3 RTK chip is matched with the two satellite antennas 221 and 222 installed on the top of the HDT cab at the interval of at least 1 m, and the timing, speed, position (longitude/latitude), and longitudinal orientation (namely road longitudinal slope angle) of the vehicle are calculated in real time. The RTK chips can finish calculation of satellite navigation positioning and orientation determination according to the received independent signals of four navigation satellites combined in the four systems of the GNSS. The timing accuracy is 50 nanoseconds, the speed measurement accuracy is 0.2 m/s, the longitude and latitude positioning accuracy of a horizontal plane is smaller than 2.5 m, the longitudinal slope progress of the road is smaller than 0.15 degree, and the highest measurement frequency is 10 Hz; the RTK navigator cannot accurately measure the perpendicular altitude of a road surface under a vehicle wheel in real time. Meanwhile, many countries in the world strictly control surveying and mapping and issuing of accurate altitude information. Fortunately, the present invention imposes no strict requirement on measurement accuracy of the absolute altitude of the road surface of a vehicle, and a 10-meter level accuracy is acceptable. In some embodiments, the single-antenna GNSS plus inertial measurement unit (IMU) can also be used to complete vehicle 3D positioning and navigation. The automotive-grade mass-produced IMU based on multiple MEMS acceleration sensors and Gyro plus dedicated processing chip can measure the longitudinal slope function of the road where the ACE HDT runs in real time with the measurement frequency higher than 10 Hz and the measurement accuracy of 0.1 degree. The GNSS 220 in the present invention should be construed as either a double-antenna RTK receiver or a single-antenna satellite navigator plus IMU. Real-time and accurate measurement of longitudinal slope distribution function along the expressway by the GNSS 220 is essential for the implementation of the present disclosure because the instantaneous small 0.1-degree-level change of the road longitudinal slope function is the secret source of substantial fuel saving and emission reduction when the ACE HDT is running at high speed. It needs to be emphasized that the measurement accuracy and the measurement refresh rate for the longitudinal slope of the road of the GNSS 220 both are obviously higher than those of a longitudinal slope sensor configured in an automatic transmission of the HDT in the prior art.

The actual fuel consumption of each ACE DT completing a transport event (from a freight transport starting point to a freight transport end point) is highly correlated with various parameters or variables of each important sub system of the HDT such as configuration parameter constants (including hybrid powertrain, vehicle air drag coefficient, friction coefficient and the like), a discrete variable; vehicle total mass (a power unit and a cargo trailer with payload), two continuous variables: longitudinal vehicle speed and acceleration and three other continuous variables: longitude, latitude and longitudinal slope distribution function of a driving path, and is substantially independent of the macroscopic average fuel consumption of all ACE HUTS driving on all roads. Before an ACE HDT departs for freight transport, the driver of the ACE HDT inputs the starting point and finishing point of the freight event route to the system, the fuel-saving robot of the HDT then can automatically generate a driving path and request the cloud-based 001 artificial intelligence (AI) fuel saving brain to calculate and download the default optimal fuel saving control strategy customized for the vehicle and a specific path in real time with reference to all the cloud-stored fuel saving data sets about the operation of the ACE HDTs running in this road section in history, and edge computing is carried out combined with the vehicle-end AIU 202 (A1 inference chip) to modify and optimize the fuel saving strategy in real time. Every ACE HDT can consistently achieve the optimal fuel consumption each time relying on the collective intelligence and wisdom of all ACE HDTs regardless of whether the driver has driving experience of the particular freight path. The actual fuel consumption is reduced by 30% compared with that of a modern internal combustion engine HDT. Moreover, the energy saving and emission reduction effect is decoupled with the skill of the driver and the performance of the engine, and are consistently superior to those of a human driver.

The ACE HDT 010 can automatically collect, denote, vehicle-side-store and cloud-update the fuel saving data set of the whole freight event. The so called "fuel saving data set" includes the overall dynamic operation data of key subsystems such as ACE truck 010, engine 101, transmission 150, generator 110, driving motor 140 or 170, battery pack 130*a* or 130*b*, clutch 111, GNSS 220 and ePSD 123 in the entire freight event. The data is both the dedicated structured big data about the energy management of the ACE HDT and the "data oil" of the machine learning (ML) algorithm for training and continuous autonomous evolution of the fuel-saving robot of the HDT. The structured big data is the "fuel saving data set" for short.

One of the core elements of the fuel saving data set of the ACE HDT is operating big data of its ePSD 123 and can include the following contents: the sampling and recording frequency is at least 10.0 Hz; clocks of microprocessors of all other onboard subsystems are calibrated according to timing of the satellite navigation receiver 220 as the unique system clock of the whole vehicle system; at each sampling time point $t_i$, each microprocessor of the ACE HDT directs related sensors to locally collect and store at least the following variable values: current longitude $L_{lg}(t_i)$, latitude $L_{lat}(t_i)$, longitudinal slope $G(t_i)$, vehicle speed $v(t_i)$, vehicle acceleration $a(t_i)$, direct current $I_g(t_i)$ of the generator 110, summated direct current $I_m(t_i)$ of driving motors 140&170, summated direct current $I_{bat}(t)$ of battery packs 130*a*&*b*, direct current voltage $V_{bus}(t_i)$ at a direct current bus junction X, state of charge $C_{bat}(t_1)$ of battery packs 130*a*&*b*, direct current $I_{bx}(t_i)$ of brake resistance, external environmental temperature $T(t_i)$ and environmental wind speed and wind direction $v_{xyz}(t_i)$ of the ACE HDT; it can further locally sample and store main time variable operation data of each motor (generator 110, primary driving motor 140 and auxiliary driving motor 170), engine 101 and automatic transmission 150 at the sampling time point ($t_i$), for example rotating speed, torque, gear, fuel delivery rate (g/s), specific fuel consumption (g/kilowatt-hour) and the like; it can further collect and store data such as period, amplitude and duty cycle of a instantaneous mechanical power time-varying function of the engine 101 in a series hybrid iSSPWM impulse sequence or a parallel hybrid iPS PWM impulse sequence, and data such as period and amplitude of a instantaneous electrical power function of the battery packs 130*a*&*b* in a corresponding PAM impulse sequence in a series hybrid iSS control mode or a parallel hybrid iPS control mode. It should be emphasized that the above-mentioned fuel saving data set of the ACE HDT must be collected and stored onboard and dynamically once in real time in a concentrated way by using the parallel-series ACE HDT system shown in FIG. 1 of the disclosure. It is not possible to collect or simulate the data in a decentralized way (generally referring to different times, roads and subsystems on more than one HDT) before splicing and combining to form the desired data. To complete the initial training and subsequent continuous improvement of the AI brain of cloud-end or vehicle-end fuel-saving robots, a variety of open source or proprietary MIL algorithms and networked cloud computer computing power (available when you need to buy it) can be used to complete training, modeling and optimization of a deep neural network (DNN) of the fuel saving algorithm in combination with the above-mentioned fuel saving data set. The fuel saving data set for operation of the ACE HDT is non-public proprietary data. The more you accumulate data, the greater value you get. Compared with petroleum, the data can continuously enhance and maintain the long-term competitive advantages for long-haul freight enterprises using the fuel-saving robot of the present invention. In some embodiments, the VCU 201 of the ACE HDT 010 can be configured for predictive power control over the at least one of the subsystems: the ePSD 123, the engine 101, the generator 110, the driving motor 140 or 170, the clutch 111, the transmission 150 and the battery packs 130*a* or 130*b* in an "independent" way based on the longitude and latitude (equivalent meter-level positioning accuracy) of the electronic horizon (meter-level interval density), the longitudinal road slope ("longitudinal slope" for short, accuracy 0.1 degree) along the full freight event based on the priori 3D map prestored in the map unit 240, and/or based on dynamic data such as the longitude, latitude, altitude and longitudinal slope measured by the GNSS 220 of the position where the vehicle is located, and/or the configuration parameters of the ACE HDT 010 and dynamic working conditions of key subsystems in pursuit of minimized actual fuel consumption of ACE HDT on the premise of ensuring vehicle driving power performance and safety.

Optionally or additionally, under the condition that the deviation between the priori road information prestored in the 3D map in the map unit 240 and the road information actually measured by the GNSS 220 is beyond the range of allowable tolerance, especially when the deviation of the current longitudinal slope data (as key information of the fuel saving ML algorithm) of the vehicle is beyond the range of allowable tolerance, the VCU 201 can control the instantaneous electric power distribution among the three ports of the ePSD 123 preferably subject to the longitudinal slope data actually measured by the GNSS 220 to satisfy the vehicle dynamic equation (1-1) in real time. If the speed or acceleration of the vehicle obviously deviates from the desired control value at this time, it indicates that the fact is that the GNSS 220 measurement data is wrong and the 3D map priori data is correct, the VCU 201 can make a judgment after vehicle-in-the-loop simulation calculation according to the instantaneous power distribution parameters of the three ports of the ePSD 123 of the ACE HDT, the longitudinal linear speed and acceleration of the vehicle 010 and in combination with the vehicle dynamics equation, reelection shall be subject to the onboard 3D electronic map, so as to achieve the automatic error detection or correction function.

The double-antenna RTK receiver solution used by the GNSS has a complex system and superior performance, but the cost is high. Of course, to reduce the system cost, a normal satellite navigation receiver 220 with only a single antenna 221 can be selected without antenna 222; then, an inertial measurement unit (IMU) with single-axis or multi-axis dynamic tilt sensor (the measuring accuracy is superior to 0.15 degree, the measuring range is greater than +/−15 degrees, and the horizontal direction is 0 degree) can be selected to measure the running vehicle's absolute positioning (longitude/latitude) and road longitudinal slope in real time. There are many implementation methods fir the dynamic tilt sensor. One of the cost-effective embodiments is the Accelerometer of the automotive-grade micro-electro-mechanical system (MEMS), the Gyroscope and the special-purpose chip integration. In several embodiments below, the following is the exemplary description on how to achieve the automatic predictive fuel saving control through the VCU 201 using the vehicle dynamic 3D positioning and orientation-determining navigation information (especially the road longitudinal slope distribution function) It is indicated that the following specific examples should not be interpreted as restrictions on the protective range of the invention, but for those in the art to understand the invention properly.

In some embodiments, when there are only short slope of the expressway within 100 kilometers ahead of the vehicle, short slope refers to the road section whose slope is less than the predefined second slope threshold (e.g., less than 3.0°) and the length of slope section is less than the predefined second length threshold (e.g., less than 10 km, or even less than 2 km), and the average output power of the engine 101 can be regulated by the VCU 201 by means of the series hybrid iSS or the parallel hybrid iPS to realize a predicative SoC control function (PSC), so that the battery packs (130*a*&*b*) operate stably or are switched dynamically between a charge depleting (CD) working mode and a charge sustaining (CS) working mode. It is particularly suitable for a scene with a "short slope" (also referred as to "a small slope") of the road section ahead. As the slope length is shorter (e.g., less than 2 km), before the battery packs 130*a*&*b* completely release stored electric energy, the vehicle has climbed to the top of slope. In the subsequent down-slope stage, the battery packs 130*a*&*b* can be further re-charged by means of hundred kW-level regenerative braking power of the driving motor 140 so as to recycle kW level energy. In this way, the power throughput turnover rate of the power-type battery pack (10 kW level) with a limited capacity can be increased, especially, the maximum value of the regenerative charge turnover rate pursuing quasi-zero cost and the minimum value of the charge turnover rate of the engine are increased, and the cost effectiveness is higher than that of the solution using a high-capacity battery pack (large volume/weight, high price) of hundreds of kilowatt hours. In an expressway of a relatively flat terrain or hilly area without long slopes or high mountains (referring to a scene where the absolute value of the longitude slope is greater than 2.0 degrees and the slope length is beyond 10 km), an intelligent mode switching control mode (iMS) can be further used to dynamically switch between iSS and iPS, and the fuel saving machine learning algorithm automatically explores and finds the optimum fuel saving control strategy for the appointed path.

With reference to FIG. 1, for the sake of driving safety in some embodiments, the ACE HDT can further include a vehicle-level millimeter wave radar module (mWR) 230 and a radar antenna 231 installed at the front end of the HDT to real time measure the absolute distance between the HDT and the leading vehicle right ahead in the same lane and the relative speeds between the two vehicles. The front maximum detection range of the long distance millimeter wave radar (LRR) is beyond 250 m, with a horizontal view (FOV) range of +/−10 degrees. The millimeter wave radar 230 can further include automotive-grade short distance large view radar (SRR), with the maximum detection range of 70 m and the view range of +/−65 degrees. An automotive-grade forward monocular or binocular camera and a processing chip with the maximum detection distance of more than 250 meters can also be used for integrating with the forward-looking millimeter wave radars (LRR&SRR) to enhance the front-end speed and distance measurement properties of the vehicle and the system robustness. If it needs to ensure redundancy and robustness of the front speed and distance sensor of the vehicle, low cost laser radar (LiDAR) with over 16 lines in front view at small horizontal view (FOV+/−10 degrees) can be further installed, with the farthest detection range exceeding 200 m). The millimeter wave radar mWR 230 in FIG. 1 of the disclosure should be construed as any combination of the above three types of the plurality of sensors (millimeter wave radar, laser radar and camera) for measuring, tracking or identifying the periphery of the vehicle, in particular relative speed and absolute distance of a front object or event.

In some embodiments, the HDT further includes an onboard wireless communication gateway (T-Box) 210 and an external antenna 211, used for connecting the HDT 010 with a cloud computing platform 001 in a wide area through the $3^{rd}/4^{th}/5^{th}$ (3G/4G/5G) generation cellular mobile network 002 (referring to FIG. 4) while supporting V2X (vehicle-road, vehicle-vehicle, vehicle-network, vehicle-human, etc.) real-time communication.

The VCU 201 can be in unidirectional or bidirectional real time communication with numerous vehicle sensors including the GNSS 220 and the millimeter wave radar 230 for real-time control of modules or subsystems including the engine 101 and its ECU 102, the generator 110, the ePSD 123 (including the inverters 121, 122a&b, the high power soft switch 133 and the choppers 132a&b), the battery packs 130a&b, the driving motors 140 and 170, the automatic transmission 150 plus the TCU 151 and the map unit 240, thus achieving the PACC function of the vehicle in the same expressway lane through the "symphony orchestra type" multi-module real time dynamic coordination, i.e., SAE L1 or L2 level autonomous driving, liberating the driver's feet, alleviating the driving labor intensity, and optimizing the vehicle's power and fuel saving property as well, and ensuring that the actual vehicle exhaust pollutant emission meets the emission standards (China-6, Euro-VI, US EPA-2010) stably within the warranty period of 700,000 km. Under the premise of ensuring the vehicle dynamic performance, the VCU 201 can minimize comprehensive fuel consumption for the whole journey by making use of electronic horizon 3D road information within 50 km and even 500 km effectively through the PACC of the ACE HDT of an accumulated sequential km-level granularity road section.

In addition, the driver can manually turn on or off the Predicative-Adaptive-Cruise-Control (PACC) function when the ACE HDT is running on a closed expressway to realize the SAE L1 or L2 autonomous driving function combined with the mass-produced commercial ADAS, which basically frees up the driver's feet and reduces the driver's driving labor intensity; the PACC function can be started within an expressway ODD and various vehicles and speeds in non-extreme weather (without heavy rain, heavy snow, hail, flood and the like).

In some embodiments, the above-mentioned PACC can include the following three subdivided working modes: 1) Normal mode N, 2) fuel saving mode Eco (Eco Mode) and 3) high-performance mode P (Power Mode), collectively known as PACC sub modes.

For example, for a passenger vehicle with a gross weight not greater than 3.0 tons, its maximum driving power exceeds 125 kW; but for a fully loaded HDT with a gross mass (or weight) up to 40 tons, its maximum driving power is not greater than 400 kW. The driving power per unit weight (kW/ton) of the HDT is far less than that of the passenger vehicle; in other words, the acceleration performance of the HDT is much less than that of the passenger vehicle, and the emergency braking distance of the HDT is much longer than that of the passenger vehicle, and the dynamic driving characteristics of the two vehicles are quite different. It is difficult for a fully loaded HDT to maintain a constant speed on the highway with more than 2.0 degrees up and down the longitudinal slope and follow the passenger vehicle straight ahead with a constant distance when running on an uncrowded expressway. Every time the HDT is accelerated uphill or braked downhill, the fuel consumption and emission will increase. When the ACE HDT enters PACC cruise control, it needs to set an upper limit and a lower limit of a cruise speed zone reasonably according to the rated cruise speed Vc and sub modes selected by the driver. The three PACC sub-modes have different focuses, where the normal mode (N) gives consideration to fuel saving and freight transport timeliness; the fuel-saving mode (Eco) emphasizes fuel consumption but relaxes the requirement on freight transport timeliness (it can be slow but must save fuel); the high-performance mode (P) emphasizes freight transport timeliness but relaxes the fuel-saving requirement (it can consume fuel but must be fast). Preferably, the upper and lower limits of the cruise speed zones of the following sub-nodes can be selected;

In the normal mode (N), the cruise speed (1.0-0.08) Vc<V<(1.0+0.05) Vc and cannot exceed 103% of the legal maximum speed in this road section; in the Eco mode, the cruise speed (1.0-0.12) Vc<V<(1.0+0.05) Vc and cannot exceed the legal maximum speed; in the high-performance mode (P), the cruise speed (1.0-0.04) Vc<V<(1.0+0.05) Vc and cannot exceed 105% of the legal maximum speed.

The VCU 201 calculates and adjusts the safe following distance time-varying function $L_s$ (t) (safe following function for short) of adaptive cruise control in real time according to the configuration parameters (particularly the gross weight of the whole vehicle) and dynamic operation data (particularly longitudinal speed) of the ACE HDT 010 in combination with the current 3D road information (longitude, latitude and longitudinal slope) of the vehicle as well as the longitudinal slope distribution function, bend curvature and other three-dimensional information of roads within the vehicle electronic horizon (km-level) stored in the map unit 240. Different from fast-moving passenger vehicles, the longitudinal slope data (positive and negative/size) of the road ahead has a great influence on the acceleration quality (i.e., power performance) and the deceleration quality (i.e., braking effectiveness) of loaded ACE HDTs running at a high speed. It is unnecessary to dynamically adjust the safe following distance $L_x$ of the passenger vehicle according to the longitudinal slope distribution function of the road because both the driving power (kW/t) and braking power per unit mass are several times as much as those of a HDT; dynamic adjustment of $L_s$ is very important for the driving active safety of the ACE HDT in above-mentioned PACC sub modes. The safe following distance $L_s$ can be then subdivided into three specific distances: L1 is the early waning distance, L2 is the warning distance, L3 is the emergency braking distance, where L1>L2>L3. The VCU 201 can dynamically calculate the above three following distance functions L1, L2 and L3 at a refreshing frequency of being higher than 10 Hz according to the vehicle configuration parameters and driving condition data (e.g., vehicle gross weight and vehicle speed, etc.), real-time weather conditions (wind, rain, snow, ice, temperature, etc.)

and the 3D road data (longitude, latitude and longitudinal slope, etc.) within a kilometer-level range ahead of the vehicle in combination with the vehicle dynamic equation (1-1). It is apparent that the safe distance functions are in highly direct association with known data such as the instantaneous vehicle speed of the ACE HDT, the longitudinal slope function within a hundred meter-level range ahead of the vehicle, the weight of the whole vehicle and the like In a road section without long slopes or high mountains, for a fully loaded HDT driving at the vehicle speed of 60 mile/h, the early warning distance L1 is longer than or equal to 250 m, the warning distance L2 is longer than or equal to 150 m, and the emergency braking distance L3 is longer than or equal to 50 m.

When the safe distance function $L_s$ of the ACE HDT 010 is equal to the early warning distance L1 and the relative speed v is greater than 0 (the following distance between two vehicles is shortened continuously), the VCU 201 gives an early warning prompt according to at least one of various physical signals such as sound sensation, vision and tactile sense in the vehicle, and reduces (0.1 s time delay) the duty cycle of the PWM impulse sequence of the engine 101 to be smaller than 0.5 immediately as well and to reduce the average power function value of the engine. The vehicle is driven based primarily on the battery packs and secondarily on the engine. The battery packs 130*a*&*b* work in the CS mode or the CD mode, so as to make preparation for fast (10 ms level time delay) regenerative braking; when the safe distance function $L_s$ is equal to the warning distance L2 and the relative speed v is greater than 0, the VCU 201 gives a higher strength warning prompt according to at least two of various physical signals such as sound sensation, vision and tactile sense in the vehicle, and reduces (ms-level time delay) the duty cycle of the PWM impulse sequence of the engine 101 to be zero immediately as well. The engine then enters a non-combustion and dragged state, and the minute-level average power function value of the engine is a negative number, and the engine becomes a mechanical load. The battery packs 130*a*&*b* work in the CS mode or the CD mode and provide all driving electric power of the vehicle. The following distance $L_s$ can be maintained between the warning distance L2 and the emergency braking distance L3 as best as one can by means of an ability of the motor and the battery packs that are switched quickly between hundred kW level driving power and the regenerative braking power within a 10-ms response time, and is ready for emergency braking; when the safe distance function $L_s$ is equal to the emergency braking distance L3 and the relative speed v is greater than 0, the VCU 201 gives the highest strength emergency braking prompt simultaneously according to various physical signals such as sound sensation, vision and tactile sense in the vehicle, and maintains the duty cycle of the PWM impulse sequence of the engine 101 to be zero, and starts the braking function of the engine immediately. At this time, the minute-level power function value of the engine is a negative number. After second-level time delay, the braking power of the engine can reach hundred kW-level, and regenerative braking emergency brake assistance with a peak value of 5 hundred kW (10 ms time delay) is implemented immediately, and meanwhile, a one megawatt-level mechanical braking emergency brake (sub-second-level time delay) is started immediately; regenerative braking and engine braking both are emergency braking assistant functions. The combined braking power is not enough for emergency stop of the HDT driving at a high speed, but out-of-control of the vehicle due to locking of driving wheel can be avoided; for the fully loaded HDT driving at the high speed, the maximum regenerative braking power of the driving motor (140 or 170); 500 kW can only meet the auxiliary braking deceleration requirement when the acceleration is about −0.1 G (gravitational acceleration); in emergency, emergency braking with the acceleration exceeding −0.2 G can be realized by starting the frictional mechanical braking system (megawatt-level) of the HDT by means of stepping on a braking pedal by a driver or a wire control signal of the ADAS system. Summated time delay of the response time of the driver braking plus the response time of the mechanical braking (pneumatic brake) system of the HDT exceeds 500 ms; however, the system response time of the VCU 201 from hundred kW-level driving mode to hundred kW-level regenerative braking mode can be completed in 25.0 ms, an order of magnitudes faster than the response speed of the traditional HDT driver+ mechanical braking system, and the power regenerative braking system and the mechanical braking system are completely independent of each other; the regenerative braking function of the driving motor of the ACE HDT not only improves the comprehensive braking performance of the vehicle, but also provides safety redundancy. Above-mentioned various technical measure sets for dynamically controlling the vehicle cruising speed zone or the safe following distance are collectively called an intelligent cruise control (iCC) technology or function. Apparently, compared with ACC for vehicle or conventional diesel HDT in the set in the prior art, the iCC of the present invention has an essential difference in either specific technical measure or technical effect. Compared with modern European and American 15 L diesel HDTs with top configuration, the ACE HDT of the present invention has obvious advantages in whole vehicle power performance, braking effectiveness, system redundancy and the like. The iCC function is an important sub-function in the PACC function of the ACE HDT.

The working scenario of PACC of the ACE HDT can be divided into two categories. The first category: when there are no vehicles within a distance of 200 m in the same lane ahead, the ACE HDT is controlled to drive in an appointed vehicle speed zone according to the fuel saving ML algorithm. The second category: when there are vehicles within a distance of 200 m in the same lane ahead, first, it needs to control the ACE HDT within the above-mentioned three safe following distances L, and then consider the fuel saving ML algorithm. In other words, the control algorithm involving driving safety of the vehicle has higher priority or weight of the wire control signal than the control algorithm involving energy saving and emission reduction.

Heavy duty trucks for long-haul freight will encounter congested roads due to rush hour traffic, road repairing or traffic accidents and other factors from time to time (the average speed is less than 40 km/h; frequent active acceleration and deceleration); at the moment, both the driver's driving labor intensity and the fuel consumption of the HDT are increased sharply. Congested expressways are one of the long-term "pain points" in the road freight industry in the world, and the average congestion degree of expressways in China is higher than that in America, and the average vehicle speed is lower. At the moment, the ACE HDT can enable the "intelligent following" function, which can only be used when driving at low speed on a closed road (e.g. expressways or urban elevated highways) (the average speed is less than 30 km/h), not suitable for use on open urban or suburban roads. By using the SRR and the camera 230, a set safety following distance L0 is kept with the lead vehicle right ahead in the same lane in a closed congested highway section, the ACE HDT is commanded by the VCU 201 to disengage the clutch 111, so that the ACE HDT operates in the series hybrid mode. The iSS is performed on the engine 101, the vehicle mainly operates in the CS mode, and the frequent active acceleration or braking of the vehicle is completely realized by the driving moto. The driving motors 140 and 170 can maintain the maximum torque output from zero speed to rated speed. Both the starting acceleration and braking deceleration of the ACE HDT are significantly higher than those of the conventional HDT with an engine and even comparable with the acceleration and deceleration performances of a light duty trucks with a conventional engine. At the moment, the HDT brakes frequently, which is quite favorable for recycling energy by hundred kW-level regenerative braking. The ACE HDT is more fuel efficient in the "Intelligent following" node compared with the conventional HDT with an engine. The actual fuel saving rate can be obviously higher than 30%. Meanwhile, the driving labor intensity of the driver can be reduced greatly.

When a loaded HDT runs along a long-downhill path of a highway, the risk of performance degradation (Brake Fade) in the mechanical brake system due to long-time braking friction and heating, or even complete failure, cannot be overlooked. In March 2018, 17 people were killed and 34 injured in a traffic accident at a toll station of Lanzhou. China's Lanhai highway, when a HDTs braking system overheated and failed as it was driving along a long downhill section. European regulations mandatorily require that frictionless retarders must be installed for HDTs for long-haul freight. Although there are no mandatory regulation requirements for retarders of HDTs in America and China, more and more users choose HDT retarders. The existing mass-produced commercial retarders, such as eddy current retarder, hydraulic retarder and engine brake retarder, have their own advantages and disadvantages. Both the eddy current retarder and the hydraulic retarder have only one retarding function, which makes no contribution to vehicle driving, increases the vehicle weight and cost more than ten thousand yuan (RMB), and leads to poor retarding effect when the vehicle is running at low speed. The engine in-cylinder or out-cylinder brake retarder has the advantage of one machine serving several purposes, but the in-cylinder retarder working brings great noise, the braking power is mostly below the peak power of the engine, and the retarding effect decreases obviously when the vehicle is running at low speed. In addition to the beneficial effects of fuel saving and emission reduction, the ACE HDT powertrain of the disclosure can also realize the long-downhill retarder function of the ACE HDT through regenerative braking of the motors (110, 140, 170) and in-cylinder and out-cylinder braking of the engine 101 without adding any extra hardware. It can completely replace the eddy current retarder or hydraulic retarder, and the performance to price ratio is higher than that of several commercial HDT retarders.

When the ACE HDT 010 drives downwards in a long slope road section (the absolute value of the longitudinal slope is greater than 2 degrees and the slope length is greater than 5 km), the grade power is enough to overcome rolling resistance power and air drag power to drive the vehicle downward at a constant speed. Surplus grade power is recovered through regenerative braking of the motors (110, 140 and 170), to avoid downward acceleration of the truck or using the mechanical brake to waste the surplus grade power into heat. The clutch 111 commanded by the VCU 201 can be closed and locked, and the vehicle works in the parallel hybrid mode. At this time, the engine 101 can work in the intelligent power switching (iPS) control mode in a particular case, namely, the duty cycle of the PWM impulse sequence is reduced to zero, and enter the zero fuel consumption and zero emission working conditions of non-combustion low load idling (the engine braking function is not started) or non-combustion high load idling (the engine braking function is started). The generator 110 and the driving motor 140 or 170 can cooperate to generate electrical power through regenerative braking to recover the mechanical energy of the vehicle going downhill, and the battery packs 130a&b are charged via the ePSD 123. When the battery packs 130a&b are fully charged (the SoC reaches URL), the choppers 132 a&b cut off the battery packs 130a&b, and meanwhile, the voltage-controlled switch 133 is switched from oft state to on state and is unidirectionally and electrically connected to the braking resistor 131 so as to convert surplus electric energy into thermal energy depleted as an effective load of the regenerative braking. In the parallel hybrid mode, the braking power of the engine and the regenerative braking power of the motor can be combined, which can not only greatly improve the total power of the frictionless retarder, but also provide two sets of mutually independent redundant retarding systems to improve the active safety of the HDT running downhill. In addition to energy recovery for fuel saving and emission reduction at near zero cost, the regenerative braking can also significantly prolong the life of mechanical brake pads and obviously reduce the total operation and maintenance costs of the mechanical braking system within the whole life cycle of the ACE HDT 010. For the sake for safety, when going down a long slope, regardless of high and low vehicle speeds, the ACE HDT should operate in the parallel hybrid mode first and avoid the series hybrid mode.

The ACE HDT hybrid powertrain system of the disclosure is a fully digital software-defined powertrain system, including a 1D longitudinal L1 autonomous driving function and various upgradable items of 2D horizontal L2, L3, or L4 autonomous driving function. The volume commercialization of ACE HDT will have a profound impact on the HDT industry for global long-haul freight, similar to the industrial upgrading of the global mobile communications industry from feature phones to smart phones. The ACE HDT can be easily upgraded from L1 to L3 or L4 by installing a variety of environment sensors, wire-controlled automatic steering device, autonomous driving AI chips and other hardware and software upgrades. Industry experts agree that it will be difficult for L5 driverless HDT to enter volume commercialization in major global markets by 2030. All autonomous driving HDTs of L1 to L4 must comply with the functional safety standard ISO 26262 for road vehicles to achieve a specific automotive safety integrity level (ASIL level). The higher the level is, the higher the requirement on system reliability and redundancy is. The ACE HDT is based on system integration including drive motors 140 and 170, battery packs 130a&b, and ePSD 123 to achieve the high-performance pure electric driving, the regenerative braking and energy recovery, the automatic emergency braking assistance (AEBA) and the long-downhill retarder function. Besides the conventional engine and mechanical brake systems of the vehicle, a separate set of completely independent and redundant active safety system of power regenerative braking is installed, as well as a redundant vehicle electric driving system (engine with multiple motors) and a redundant electrical power supply. Compared with the traditional HDT with an engine based on the prior art, the ACE HDT of this disclosure can improve the three ultimate goals of the automobile industry simultaneously with high cost effectiveness: safety, energy saving and environmental protection.

It is predicted that the preliminary small-scale business of "Truck Platooning" of HDT can be implemented in relatively open closed highway areas in Europe and America from 2020. The "Truck Platooning" of HDT means reducing the safe following distance between two HDTs running at a high speed from the regulatory requirement of over 45 m to under 15 m below through a complete set of advanced driving assistant system (ADAS)+a real-time reliable wireless mobile communication (V2V, V2X) between vehicles as well as between the vehicle and cloud, which helps to reduce the air drag power of the two HDTs ahead and behind significantly, saving 4% fuel of the leading HDT and saving 10% fuel of the following HDT. In view of safety, the emergency braking performance of the following HDT should be superior to the leading HD, so as to avoid rear-end collisions. The high speed emergency braking performance of the ACE HDT is significantly superior to traditional fuel HDT with the same gross weight, therefore the ACE HDT should be following HDT in the truck platooning of HDT, which may further save fuel. In view of fuel saving, smaller following distance in truck platooning is not necessarily better. When the following distance is less than 7 m, the effective air speed of the front radiator of the following HDT will be reduced, and the heat dissipation effect will be lowered; and at the moment, it is required to start the mechanical fan of the radiator with a power dissipation of tens of kilowatts to provide the dynamic heat dissipation power required for the HDT diesel engine, which may result in no reduction and even a rise of comprehensive fuel consumption of the following HDT. The engine displacement of the ACE HDT is reduced by nearly 20% than the engine displacement of the conventional HDT, which means both cross section area and heat dissipation power of its radiator may be reduced by about 20%, and therefore, an efficiently wire-controlled electric fan of the water tank can be used; meanwhile, compared with the conventional HDT, the ACE HDT has faster emergency braking response, and shorter braking distance. Serving as a following vehicle, the ACE HDT can shorten the safe following distance of a truck array of the ACE HDTs to 6 m, or even 5 m, in an expressway section without long slope (the absolute value of longitudinal slope is less than 2.0 degrees and the slope length exceeds 5 km), and may achieve more than 10% additional fuel saving by further reducing the air drag power. When the HDT platoon goes down a long slope, for the sake of safety, spacing among HDTs shall be increased properly, which not only guarantees the safety, but also keeps the fuel consumption in check. After the HDT array arrives at the slope bottom, normal spacing is then recovered.

In North American or European markets, there are mandatory regulatory requirements on daily hours of service (HOS) on long-haul freight HDT drivers like airline pilots. They work for 14 hrs. at most every day, the driving time is 11 h at most, and then the drivers must rest for 10 h. In China. HDT drivers (single or double drivers) also need to stop for several hours in route. Different from the situation that Chinese HDT team drivers are very common, European and American double drivers (Team Drivers) are rare. When parked to rest, the HDT is the hotel of the driver. The engine needs to idle (low speed and low load) to provide mechanical energy or electric energy needed by normal operation of various hotel loads. For example, various electric appliances need to be powered in the cab, and particularly, a mechanical or electrical air conditioner which cools in summer and heats in winter. Apparently, long-time idling of the engine of the HDT not only wastes fuel, but also increases pollutant emissions. For energy saving and emission reduction. Europe has strict anti-idling regulation, while China and the USA currently do not have any national anti-idling regulation. Several states in the USA have local regulations specifying that the engine idling of the HDT during parking shall not exceed 5 minutes. In order to meet the EU Anti Idling regulations and/or improve the quality of life for HDT drivers during long haul, each European HDT is equipped with a battery pack or pocket diesel engine based APU costing tens of thousands of yuan (i.e. thousands of dollars), and some American and Chinese HDTs are gradually equipped with the above-mentioned system. For the ACE HDT of the present invention, the battery packs $130a\&b$ can be fully charged (SoC reaches URL). At the moment, the battery packs $130a\&b$ and the ePSD 123 can completely replace the above-mentioned independent APU, major advantages of the APU in the prior art are maintained, and major defects thereof are overcome. On the premise of not increasing the hardware cost, it can support all the Hotel Load power demands of HDT drivers when they park and stop their engines for ten hours, for example household or office electric appliances such as A/C heating or refrigeration, electric lamp, TV, refrigerator, microwave oven, induction cooker, computer and printer. It not only optimizes energy saving and emission reduction, but also improves the living quality of the HDT driver in long haul freight transport obviously.

In a special or emergency situation, the ACE HDT 010 can further increase a brand new "Intelligent Mobile Micro Grid" (iMMG) function only through software definition without adding any extra hardware. The ACE HDT is parked to generate electrical power by fuel to become a mobile three-phase alternating current micro grid (Micro Grid) temporarily with 250 kW nominal power. There are two specific implementation methods: first, the truck is parked to generate power in the series hybrid iSS mode, and at the moment, the driving motors (140 and 170), the transmission 150 and the like are not in operation, and a three-phase alternating current suitable for all regions in the world is outputted outwards from a port I or a port II of the ePSD 123 by utilizing the inverters 121, $122a\&b$; the battery packs $130a\&b$ serve as the energy storage units of the micro grid for dynamic peak-load shifting on its electric power, thereby guaranteeing that the engine 101 operates in an efficient area all the time and optimizing energy saving and emission reduction. Apparently, in the series hybrid iSS mode, the nominal power of the mobile micro grid is limited to nominal power of the generator 110 and is smaller than 200 kW. Second, the parallel hybrid iPS mode is used, and at the moment, the clutch 111 is closed, and the generator 110 and the driving motor 140 can operate synchronously to generate power, and a three-phase alternating current suitable for all regions in the world is outputted outwards from a port I or a port II of the ePSD 123 by utilizing the inverters 121, $122a\&b$; the sum of the nominal powers of the double motors (110& 140) is greater than the peak power of the engine 101, and the upper limit of the nominal power of the micro grid is increased to the peak power of the engine 101 (i.e., the maximum continuous mechanical power) and is greater than 300 kW; the battery packs $130a\&b$ also serve as the energy storage units of the micro grid for dynamic peak-load shifting on its electric power, thereby guaranteeing that the engine 101 operates in an efficient area all the time and optimizing energy saving and emission reduction. Apparently, at the moment, the transmission 150 must operate in Neutral gear. Provided that the fuel (diesel or natural gas) of the engine is sufficiently supplied, the ACE HDT can operate for several days or a longer time in the iMMG mode so as to provide the high quality three-phase alternating current with nominal power exceeding 250 kW for emergency use continuously.

It is needed to emphasize that the I fuel-saving robot configured for the ACE HDT realizes the 1D longitudinal SEA L1 autonomous driving function through the technical measures of the PACC in the expressway ODD, thereby achieving a beneficial effect that the comprehensive fuel consumption (liter/100 km) is reduced by nearly 30% compared with that of the conventional diesel HDT. It is mainly dependent on a electric hybrid powertrain technology, particularly the ePSD, and makes full use of priori data of the 3D map of the electronic horizon, vehicle dynamic working condition data and the onboard-cloud cooperated fuel saving data set and the fuel saving machine learning (ML) algorithm. Even if the human driver drives the ACE HDT manually, nearly 25% of fuel saving rate can be also realized (compared with that of the conventional diesel HDT), namely, about 80% of energy saving and emission reduction optimizing potential. Commanded by the "fuel-saving robot", the longitudinal L1 autonomous driving (i.e., PACC) in the expressway ODD is realized, so that it is ensured that the comprehensive fuel consumption (liter/100 km) of each ACE HDT is highly decoupled with the technical sophistication and performance of the engine of the vehicle and the personal driving skills of the driver (referring to ability, road experience, working altitude and the like). It is obviously superior to the human driver in both fuel saving rate and consistency. The ACE HDT of the present invention adopts the mature and volume production key components and system integration technology, which has obvious fuel-saving effect and high cost effectiveness. Not dependent on government subsidies, payback can be realized within 2.5 years (i.e., the price difference between the ACE HDT and the conventional diesel HDT is made up) simply relying on saving of fuel charge. The accumulated profit of the trucking company is doubled in 5 years. The retrofit ACE HDT can be commercialized at volume in North America within three years. Other commercialized fuel saving technologies of HDTs for long-haul freight, such as low rolling friction tires, lightweight and low drag coefficient (tractor and trailer) and the like, can be directly applied to ACE HDTs. It is expected that the ACE HDT that will be commercialized at volume around 2022 will reduce the overall fuel consumption (L/100 km) of the baseline for 2018 version or the traditional heavy duty diesel truck by more than 25%.

Unlike prior art, the ACE HDT 010 of the embodiments shown in FIG. 1 to 5 in the present disclosure depends on the tilly digital software defined mixed hybrid powertrain, the VCU 201 gives command in cooperation with the AIU 202 according to vehicle parameters and dynamic operational data and using the prior 3D road map data in the electronic horizon stored in the MU 240 and the fuel saving ML algorithm, and the average power function value (i.e., minute-level rolling time average power) of the engine is controlled dynamically and continuously by implementing Pulse Modulation (PM), particularly bipolar pulse width modulation control (PWM), including iSS or iPS in addition to iMS and clutch-free gear shift control (CGS) on the instantaneous power function of the engine 101; in addition, the flow direction, path and amplitude of the 100 kW-level electric power are regulated dynamically among numerous power sources or loads (e.g. generator 110, driving motor 140 or 170, battery pack 130*a* or 130*b*, brake resistor 131 and the like) externally connected to a power electrical network with three ports through the ePSD 123; Pulse amplitude modulation control (PAM) is implemented on the instantaneous powers of the battery packs 130*a*&*b* according to a series hybrid power balance equation (2-4) or a parallel hybrid power balance equation (3-3), so that the battery packs (130*a*&*b*) work stably in one of CS, CD or CI modes or are switched smoothly among the three modes, thereby achieving predictive control on the average SoC function (i.e., minute-level rolling time average function of the instantaneous SoC function) of the battery packs, and meanwhile pursuing the maximized regenerative braking charge turnover rate and the minimized engine charge turnover rate; the vehicle dynamic equation (1-1) is met in real time; further, in combination with the iCC function, the PACC function of the whole vehicle is realized; and multiple beneficial effects of reducing more than 25% of fuel consumption (liter/100 km) compared with that of modern diesel HDT, greatly enhancing the power performance and the braking effectiveness of the vehicle, ensuring that actual exhaust emission reliably meet the emission standard for a long time, reducing the driving labor intensity of the driver, improving the rest experience of the driver with the vehicle parked in an anti-idling state and the like are achieved. The fuel-saving robot of the present invention converts the power management problem or the energy management problem of the ACE heady duty truck in the expressway ODD into an equivalent narrow artificial intelligence problem of playing the game of go by a computer through the technical measures of PACC, which is quite suitable for storing and uploading the cloud fuel saving data set by utilizing the ML fuel saving algorithm and the computer readable medium of the present invention, and automatically masters the optimum fuel saving strategy and evolves continuously and independently through linking (training or inferring) of fuel saving AI chips at the cloud and on the vehicle. The fuel-saving robot of the ACE HDT is much better than the human driver in optimization of actual energy saving and emission reduction with extremely high consistency, and can become a reliable copilot of the human driver.

As discussed above, when driving on a loaded expressway, the ACE HDT can harvest 100 Wh level or kWh level "zero-cost electric energy" (regenerative braking charge) from each downslope between one hundred meter and several kilometers by skillfully using the downhill longitudinal slope power between tens of kilowatts and hundreds of kilowatts generated from subtle changes in the accuracy along the longitudinal slope 0.1° along the road that frequently occurs and by charging the battery packs 130*a*&*b* through the regenerative braking power generation of the driving motors 140&170 after the ePSD 123 performs rectification. Many small savings accumulated to become a large one. In addition, the comprehensive energy conversion efficiency from the battery to the driving wheel in ACE, HDT is two times larger than that from the fuel tank to the driving wheel. In other words, compared with chemical energy of a fuel in the fuel tank, electric energy in the battery packs of the ACE HDT is one against three of the fuel energy when driving the vehicle to apply work. The secret of the ACE HDT saving fuel under the working condition of expressways is to maximize the zero cost "regenerative braking charge" accumulated in the battery packs 130*a*&*b*, supply a portion of the driving powers of the vehicles, to increase the accumulated throughput electric energy turnover rate of the 130*a*&*b* in the whole transport event, particularly, the regenerative braking charge turnover rate, and to reduce the engine charge turnover rate, thereby achieving the optimum fuel saving effect.

The VCU 201 evaluates the situation and makes decisions in real time according to the priori 3D road data in the electronic horizon of the MU 240, so as to ensure that there is sufficient time to command the clutch 111 to engage and lock before it encounters a long slope with a length of more than 10 km and a longitudinal slope of more than 2.0%. When switched to the parallel hybrid mode, the iPS is implemented on the engine 101 and the generator (MG1) 110, and when the vehicle arrives at the foot of the long slope, the battery packs 130a &b are fully charged in time (JIT) (SoC reaches URL) and the vehicle speed is safely increased to the legal upper speed limit, so as to delay and reduce the undesirable condition that on the way uphill, the ACE HDT 010 only has to switch to low gear to run uphill at lower speed because the peak power of the engine is insufficient to independently support the vehicle to run uphill at constant high speed after the battery pack is used up in the vehicle climbing process to the maximum extent, which affects the vehicle power performance and transportation timeliness of the vehicle. According to the 3D map stored by the onboard MU 240, particularly the high accuracy longitudinal slope spatial distribution function in the electronic horizon, configuration parameters, dynamic working conditions and positioning data of the vehicle, the VCU 201 can dynamically predict the longitudinal slope power time-varying function and a road-load instantaneous power time-varying function of the vehicle in the electronic horizon (hour level or hundred km-level) at a kw-level accuracy at a refreshing frequency over 1 Hz through the vehicle dynamic equation (1-1) so as to achieve predictive control of the average SoC function of the battery packs 130a&b through PM control (series hybrid iSS or parallel hybrid iPS) on the instantaneous power function of the engine 101 and PAM control on the instantaneous power function of the battery packs 130a&b. According to different sub modes of the PACC of the vehicle selected by the driver, under the precondition that the driving safety and the real emission (RDE) meet regulation all the time, the optimum dynamic balance between the fuel saving performance and the power performance of the ACE HDT is sought to meet the vehicle dynamic equation (1-1) and the power balance equation (2-4) or (3-3) in real time, thereby achieving a beneficial effect of energy saving and emission reduction of the vehicle. It needs to be emphasized that the minimum value of the comprehensive fuel consumption (liter/100 km) of a certain ACE HDT that completes a special freight event is highly correlated with the configuration parameters and load of this vehicle, the longitudinal slope spatial function along the way of the specific journey (or route), weather conditions along the way on that day, dynamic working condition data of the vehicle among the way, etc., but is weakly associated with the macroscopic large number average fuel consumption value of the HDTs with similar configurations and loads throughout the country. The minimum average fuel consumption is realized when the ACE HDT operates per minute or drives per km. By means of accumulation and linear superposition, it can ensure the cumulative comprehensive fuel consumption of this ACE HDT is optimal daily, monthly, annually and throughout its full life cycle. For all ACE HDTs with different configurations and loads, the fuel saving data set of running in a specific freight route that are formed from month to month is precious "data petroleum" that trains machine learning fuel saving algorithm. A default fuel saving control strategy recommended by the cloud fuel saving algorithm has common reference and guiding significance for each ACE HDT that is operated in this journey.

How to timely (minute or hour-level time delay) upload the fuel saving data set that is collected and locally stored in the above-mentioned ACE HDT 010 during the driving period to the cloud computing platform 001 for storage via a mobile Internet 002 through an onboard wireless gateway 210 after desensitization and encryption for subsequent analysis and processing is described below. The cloud platform 001 assembles enough computing power of a public cloud or a private cloud and uses the preferred ML fuel saving algorithm, trains the AI brain of the cloud "fuel-saving robot" by means of the accumulated fuel saving data set of the ACE HDT stored at cloud, automatically establishes and continuously improves a DNN model, and seeks for the optimal control strategy for fuel saving; the cloud platform downloads a fuel consumption benchmark value and a default fuel saving control strategy for the specific route to each ACE HDT through the wireless mobile communication network, so that each ACE HDT can be benefited from collective intelligence; each ACE HDT can perform vehicle-end "edge computing", i.e., AI inference operation as its VCU 201 cooperates with the AIU 202, and dynamically modifies the default fuel saving control strategy of this vehicle in real time according to environment, road conditions and dynamic data of vehicle operation of the ACE HDT this time and this place, so as to the minimum comprehensive fuel consumption of the transport event (i.e., a truck with cargoes from the starting point to the finishing point) of this vehicle.

In some embodiments, in the driving process of the ACE HDT 010, various configuration parameters or dynamic operating data from every major powertrain subsystem such as the generator set (including the engine 101, the ECU 102, the generator 110 and the inverter 121), the ePSD 123, the clutch 111, the driving motor 140 or 170, the automatic transmission 150, TCU 151, the braking resistor 131, and the battery packs 130a or 130b all can be measured and collected (the refresh frequency for measurement and record is above 5 Hz) by "Internet of Things" formed by the onboard multi-sensor on the ACE HDT 010 in real time, and stored in the format of structured big data commonly used in the industry in a concentrated way, such as the onboard VCU 201 memory or other onboard memories. Of course, the above-mentioned measured data is dispersedly stored in memories of microprocessors corresponding to several subsystems. The so called "fuel saving structured big data" (the "fuel saving data set" for short) refers to a multi-dimensional time sequence set "associatively" recorded with a certain "mapping relation" about operating dynamic data of every subsystem in the driving process of the ACE HDT.

For example, it can timely (minute-level time day) and repeatedly calibrate clocks of microprocessors of onboard subsystems including the VCU 201 clock by taking 10-nanosecond level ultrahigh precision timing of the GNSS 220 as the sole reference clock of the whole vehicle system, annotate and synchronize dynamic operating data of each subsystem of the ACE HDT automatically with an ordered and unique operating time sequence of the vehicle system for the convenience of splicing and synthesizing a multi-dimensional time sequence subsequently so as to generate the fuel saving data set for the specific ACE HDT and the specific freight event. As shown in FIG. 1-5, important subsystems on the vehicle 010, including the VCU 201, the AIU 202, the engine 101, the engine control module 102, the generator 110, the electrical power split device (ePSD) 123 (including the inverters 121, 122a&b; the voltage-controlled switch 133; the choppers 132a& b and the like), the clutch 111, the driving motors 140&170, the battery packs 130a&b, the brake resistor 131, the AC switchboard 135, the transmission 150, the transmission control unit 151, the millimeter wave radar 230, the mobile communication gateway 210, the map unit 240, the GNSS 220 and the like have corresponding dedicated microprocessors, memories and sensors. All these subsystems can measure, calculate and record or store the time sequence of main operating data uniquely annotated with vehicle operation time in real time at the local vehicle end within a measurement frequency ($f_\omega$) range of 1.0 Hz<$f_\omega$<50.0 Hz. For example, the engine control module 102 can calculate and record the dynamic operating data such as the longitudinal vehicle speed, the rotating speed, the torque and the brake specific fuel consumption (BSFC) of the engine 101 at a measuring frequency over 10 Hz; the generator control unit (inverter) 121 can record the dynamic data such as the rotating speed and torque of the generator 110, the internal temperature of the motor or the output DC voltage, current and internal temperature of the generator control unit 121 at a measuring frequency over 10 Hz; the ePSD 123 can record the dynamic data such as a unique DC voltage function at the DC bus junction X and DC current functions of all branch circuits at a measurement frequency over 10 Hz; the battery management module (BMS) configured on the battery packs 130a&b can record dynamic data such as its output DC voltage and current, and current, voltage, temperature and SoC of its internal cell and battery module levels at a measuring frequency of 10.0 Hz; the inverters 122a&b can record the dynamic data such as the rotating speed and torque of the mechanical shaft of the driving motors 140 and 170, internal temperature of the motors, current and voltage at the DC end of the inverters at a measuring frequency over 10 Hz; the choppers 132a&b can calculate and record dynamic data such as DC voltage and current at its high voltage end of low voltage end at a measuring frequency over 10 Hz; the transmission controller 151 can record the dynamic data such as the transmission gear, the input end rotating speed and the output end rotating speed at a measuring frequency over 2.0 Hz; the satellite navigator 220 can calculate and record the dynamic data such as the longitudinal vehicle speed and acceleration, the longitude and latitude, the longitudinal slope and timing of the vehicle at a measuring frequency over 5 Hz; the millimeter wave radar 230 can calculate and record the dynamic data such as the absolute distance and the relative speed between the vehicle and the front vehicle at a measuring frequency over 10 Hz; and the voltage-controlled switch 133 can record the dynamic data such as its DC voltage and current at a measuring frequency over 10 Hz. The sensor measurement data of subsystems may overlap each other, and data overlapping redundancy helps to improve the fault tolerance and error correction of the whole system.

Next, as shown in FIG. 1-5, the VCU 201 generates the dedicated structured big data ("fuel saving data set" for short) highly correlated with the whole vehicle energy saving and emission reduction strategy of the ACE HDT generated in the operating process of the ACE HDT 010 through automatic splicing, integration, desensitization and encryption by taking a unidirectional unique annotation of the vehicle operation reference time sequence as the reference of the measurement data time sequence of all subsystems. Later, the "fuel saving data set" will be "instantaneously" (sub-second-level delay) or "timely" (hour-level delay) uploaded to the cloud computing platform 001 for centralized or distributed storage via a mobile Internet 002 or wired Internet, for subsequent data analysis and processing.

Figure 5:
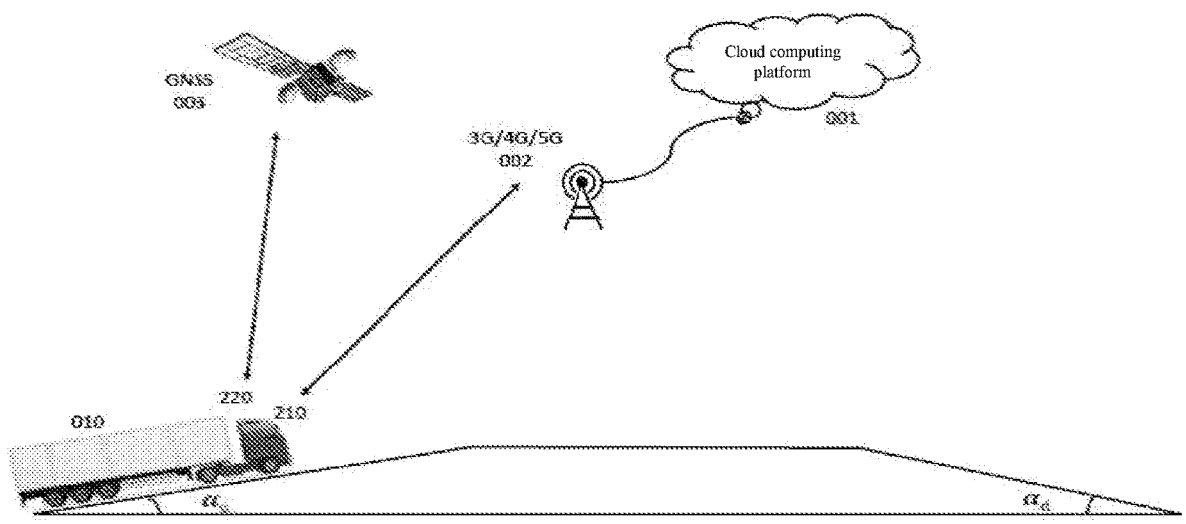
FIG. 5 illustrates a terminal-channel-cloud system block diagram of network communication between the ACE HDT and cloud computing platform through the mobile Internet of one embodiment of the present disclosure.

For example, as shown in FIG. 1 and FIG. 5, the fuel saving data set of the ACE HDT can be timely (minute-level or hour-level time delay) uploaded to, e.g., the cloud computing platform 001 on the mobile Internet to be dispersedly or centrally stored via the wireless communication gateway 210 and the cellular mobile network 002 for subsequent data processing. Optionally, the data packet can be desensitized and encrypted before being uploaded to ensure data security and protect privacy and trade secrets of customers (driver or company). The cloud platform 001 will collect fuel saving data sets of numerous ACE HDTs using the invention. AI chips at cloud and vehicle end of the "fuel-saving robot" are trained by utilizing the operating structured big data (i.e., the fuel saving sets) accumulated by a cluster of these ACE HDTs and deploying the computing abilities of corresponding cloud computers by focusing the fuel saving machine learning algorithm, where the cloud has the AI training chip and the vehicle end has the AI inference chip. A DNN model is automatically established and continuously improved, and the optimum control strategy for each ACE HDT and each freight event are sought for, and therefore, beneficial effects that the actual fuel consumption of the ACE. HDT for long-haul freight is reduced by over 25% compared with that of the modern diesel engine HDT, the fuel consumption is basically decoupled with the skill of the driver and the performance of the engine. The commercially available AI training chip is preferably used by the cloud end 001, which has the characteristics of high universality, high performance, high power consumption and high cost; while the AI inference chip is preferably used by the vehicle-end AIU 202, which has the characteristics of specificity, moderate performance, low power consumption and low cost. The real-time linkage of the vehicle-end fuel saving AI inference chip 202 and the cloud-end fuel saving AI training chip can enable tens of millions of calculations per second (TOPS level) at the vehicle end according to the constantly changing driving conditions of the ACE HDT, seek for a dynamically optimal fuel saving control strategy in each second and minute of time frame (corresponding to 20 m to two kin of driving distance); combustion to work of the engine 101 is free of hysteresis effect or memory effect, thereby finally achieving the macroscopically optimal fuel saving effect of the whole journey for the ACE HDT 010 through the microcosmically lowest fuel consumption (liter/100 km) in each time frame by means of constant accumulation and linear superposition. The AI brain of the fuel-saving robot (referring to VCU 201 plus the AIU 202) commanding the ACE HDT 010 to drive on expressway ODD achieves the 1D longitudinal autonomous driving function through the PACC, and converts the optimizing problem of energy saving and emission reduction of the HDT into an equivalent narrow artificial intelligence problem (also known as a narrow AI problem) of playing the game of go. Like AlphaGo playing the game of go can far surpass human being. The "fuel-saving robot" of the ACE HDT of the present disclosure can surpass human driver in actual fuel consumption and emission metrics of the long-haul freight HDT. It should also be emphasized that the "fuel-saving robot" of the present invention will be a good assistant of the HDT driver in long-haul freight rather than completely replacing the human driver.

The starting point and finishing point of each freight event of the HDT for long-haul freight are predictable, the freight weight is also known and fixed, and there is very few temporary random change; the mileages range from hundreds of kilometers to thousands of kilometers, and the duration ranges from several hours to several days. Before start of freight event, the fuel-saving robot (VCU 201) or driver of the ACE HDT 010 can automatically require the AI "fuel saving brain" of the cloud platform 001 through the wireless mobile gateway 210 or the mobile phone to download the optimal fuel saving control default program and current optimal fuel consumption metric (liter/100 km) for the freight event journey, to serve as a reference for locally real-time operation (edge computing) and the dynamic regulation for the fuel saving machine learning algorithm of the VCU 201 and AIU 202 of the vehicle. Thus, each ACE HDT can use collective intelligence of the ACE HDTs operating in the same road section, thereby achieving the optimal fuel saving effect of the long-haul freight industry. After driving the ACE HDT to a closed expressway, the driver can select the sub mode (normal mode N/Eco mode/high-performance mode P) with the PACC function, activate the PACC function, and replace partial driving function of the drivers with the VCU 201 in cooperation with the AIU 202, so as to achieve continuous automatic control (i.e., L1 autonomous driving) of 1D longitudinal movement (acceleration/cruise/slide/deceleration) of the ACE HDT, relax driver's feet for a long time, reduce the labor intensity in driver's long-way driving, and achieve the beneficial effects that the actual fuel consumption is optimum (i.e., the minimum) and it is decoupled with the driving level of the driver and the like. It needs to emphasize that hands, eyes, ears and brain of the driver still work to take charge of Object and Event Detection and Response (OEDR) around the vehicle, control steering or emergency braking of the vehicle in real time, are fully responsible for safe driving of the HDT. The other beneficial effect of the present invention is that the fuel-saving robot realizes optimization of energy saving and emission reduction of the vehicle, can effectively solve the well-known long-term problem in the long-haul freight industry that the actual comprehensive fuel consumption variation is up to 20% due to human factors (road familiarity, driving skill, working attitude, fatigue and the like), guarantees that every ACE HDT can reliably and uniformly achieve the optimal fuel saving result when operating on the same road section, which is very important for transportation companies in terms of reducing cost and increasing efficiency.

In summary, the essential difference between the ACE HDT 010 with PACC function in the present invention and any hybrid vehicle or conventional heavy duty diesel truck with similar functions available on the market today is that the former highly focuses on optimization of energy saving and emission reduction of the HDTs of long-haul freight, effectively solves the worldwide hard problem in global transportation industry, i.e., the fuel saving effect of hybrid HDTs in long-haul freight is not significant (the fuel saving rate is always less than 10%) compared with that of the conventional fuel HDTs, and can achieve multiple beneficial effects that the actual comprehensive fuel consumption in long-haul freight is reduced by more than 25%, and the power performance and the braking effectiveness of the vehicle can be further enhanced greatly, and it is ensured that the ACE HDT can reliably meet the pollutant emission and carbon emission regulations for a long life (700,000 km emission standard warranty period) under the actual driving environment (RDE) of the three major HDT markets in Chinar/US/EU. In other words, when the ACE HDT 010 is driven on a non-congested controlled-access expressway, the driver may only be responsible for the perception of objects or events (OEDR) around the vehicle and lateral vehicle control in a dynamic driving task (DDT), and the fuel-saving robot of the HDT will realize the HDT longitudinal L1 autonomous driving function of the vehicle through the technical measures of the PACC, thereby achieving optimization of energy saving and emission reduction of the vehicle. The 1D longitudinal L1 autonomous driving function based on the PACC technology in the expressway ODD is a foundational function prerequisite from the basic Level I fuel-saving robot to an advanced Level IV fuel-saving robot, and specifically focuses on optimizing energy saving and emission reduction of the ACE HDT by AI, which is the "economic foundation" of the more advanced autonomous driving system. The Level IV fuel-saving robot further has a 2D horizontal L4 autonomous driving system compared with the Level I fuel-saving robot, which is a "superstructure".

In the driver preset sub mode (one of common mode N/fuel saving mode Eco/high-performance mode P is selected) of PACC, the fuel-saving robot of the HDT performs AI inference operation by using the vehicle energy management control strategy based on the ML fuel saving algorithm and the onboard real-time computing power according to performance characteristics and configuration parameters of key subsystems of the vehicle, dynamic data of the driving working condition of the vehicle and the priori data of the three-dimensional road within the electronic horizon, performs iSS or iPS or iMS on the instantaneous output power of the engine 101, and performs PAM on the instantaneous power function of the battery packs 130a&b, so that the battery packs 130a&b work stably or switch smoothly among the three modes of CS, CD and CL so as to meet the vehicle dynamic equation (1-1) and the power balance equation (2-4) or (3-3) in real time while meeting the constraints of vehicle power performance, active safety, long-term compliance of exhaust emission RDE and the like, and realize the minimization of the actual fuel consumption in the whole freight event. Compared with the conventional diesel HDT, the actual comprehensive fuel saving rate can be as high as 30%. The "adaptive cruise control (ACC)" function of passenger vehicles or commercial vehicles in the prior art mainly provides the driving convenience and improves the active safety, with a negligible impact (less than 2%) on the actual comprehensive fuel saving rate of vehicles; the "predictive cruise control" of the conventional HDT with the internal combustion engine focuses on the vehicle energy management control strategy, but the actual fuel saving effect is only about 3% as energy cannot be recovered effectively. Different from the prior art, the technical solution of PACC of the ACE HDT of the present invention includes a set of any combination of various technical measures such as iSS, iPS, iMS, CGS, predicative SoC control (PSC), predicative energy management (PEM) based on ML fuel saving algorithm and iCC, and focuses on optimization of energy saving and emission reduction of the vehicle in the long-haul freight. Compared with the conventional diesel HDT, the actual comprehensive fuel saving rate of an ACE truck can reach up to 30%. The fuel saving rate is extremely high in consistency and is basically independent of the skill of the driver and the performance of the engine 101. Furthermore, the technical solution provides driving convenience, reduces the labor intensity of the driver and improves the power performance and the active safety of the vehicle.

Figure 3:
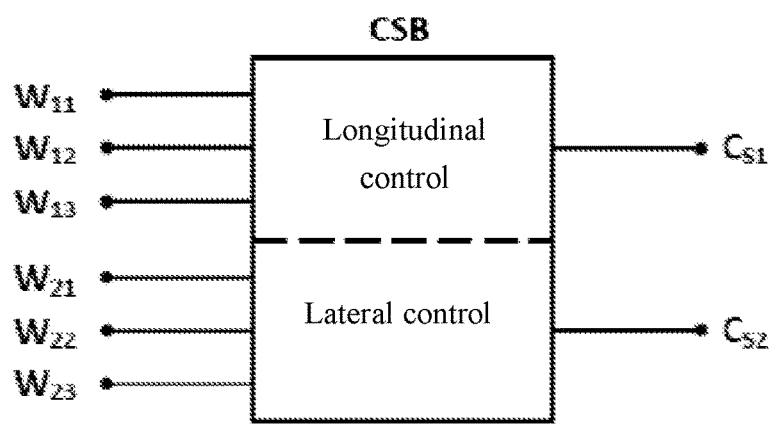
FIG. 3 illustrates a system block diagram of the Comparator of the ACE HDT of one embodiment of the present disclosure.

The comparator (CSB) 203 in FIG. 3 is an ASIL-D-level high reliability electronic module including at least six input channels and at least two output channels. The module can be in bidirectional communication with the vehicle control unit (VCU) 201 or the onboard AI unit (AIU) 202 through a data bus of the ACE HDT 010 (for example, a CAN bus, referring to the dotted line in FIG. 1). Upgraded from the Level I fuel-saving robot of the ACE1 HDT to the Level IV fuel-saving robot of the ACE4 HDT, its main change is to upgrade hardware and software of the onboard AI unit (AIU) 202 and hardware and software of an onboard suite, which upgrades the perceiving and decision-making ability of the AI driver. The parts such as parallel serial powertrain, steering and brake responsible for vehicle driving control are essentially unchanged. The millimeter wave radar (mWR) 230 in FIG. 1 should be construed as a sensor suite including a plurality of automotive-grade mass-produced millimeter wave radar, a camera, laser radar (LiDAR) that are combined specifically, which sufficiently supports any one of L1 to L4 autonomous driving systems. The L4 sensor suite 230 and the L4 AI unit 202 are combined to form the perceiving and decision-making module (also called OEDR module) of the L4 system of the ACE4 HDT, i.e., the core part (including hardware and software) of the to-be-validated L4 system; the vehicle wire control signals $W_{13}$ and $W_{23}$ of the AI driver of the L4 system are generated in real time by the AI unit 202 according to an OEDR software stack of the L4 system responsible for Object and Event Detection and Response and are in bidirectional real-time communication with the vehicle control unit (VCU) 201 and the comparator (CSB) 203 through the vehicle data bus. The comparator (CSB) 203 dynamically determines the final horizontal or longitudinal wire control signals of the vehicle according to a preselected comparing and switching strategy.

The comparator (CSB) 230 can define and dynamically adjust $k_{ij}$ values of six weighting factors (the value of i can be 1 or 2, and the value of j can be 1 or 2 or 3) to stably operate one of L2 shadow mode, L3 disengagement mode or L4 AI driving mode or dynamically switch among these three modes via software according to the wire control signal equation (5-1). i=1 refers to the longitudinal wire control signal, i=2 refers to the horizontal wire control signal, j=1 refers to the wire control signal of the driver, j=2 refers to the wire control signal of the mass-produced commercialized L1 or L2 ADAS system, and j=3 refers to the wire control signal of the to-be-validated L4 system. In the L2 shadow mode, for the sake of driving safety, the most stable and conservative comparing and switching strategy can be preferably set as follows: the value of $k_{i1}$ is 0.6-0.9, the value of $k_{i2}$ is 0.1-04 and $k_{i3}$=0; the limiting condition: $k_{i1}+k_{i2}+k_{i3}=1.0$. In other words, in the shadow mode, the comparator 203 fully shields actual impact of the horizontal or longitudinal wire control signal of the to-be-validated L4 system on driving control of the whole vehicle by setting $k_{i3}$ to be zero and only compares the wire control signal $W_{i1}$ of the driver with the wire control signal $W_{i3}$ of the L4 system in real time, with the comparison refresh frequency not less than 20 Hz. If the absolute value of the difference value between $W_{i1}$ and $W_{i3}$ is greater than a preset threshold, the comparator 203 cooperates with the VCU 201 to automatically generate an electronic record (i.e., an original script of a discrepancy report) of a "discrepancy report" with system time as a unique annotation, and uploads privacy and trade secret of the drivers and the company subjected to desensitization and encryption to the cloud computing platform 001 timely (hour-level time delay) through the wireless gateway 210 to be stored for subsequent analysis and processing. It is apparent that in the L2 shadow mode, the to-be-validated L4 system will not affect the actual driving safety of the mass-produced commercialized ACE2 HDT, and equivalently, when the ACE2 HDT is driven by the driver to operate normally, the to-be-validated L4 system is a copilot with the truck or an apprentice, and equivalent to carrying an advertising board for the to-be-validated L4 system. By taking the human driver as the role model, the OEDR performance of the L4 system is compared and validated in real time.

As mentioned above, in the expressway ODD, the weight of the 1D longitudinal wire control signal is 98%, and the weight of the 2D horizontal wire control signal is 2% which is negligible in energy saving and emission reduction of the vehicle. The weight of the 1D longitudinal wire control signal is 65% and the weight of the 2D horizontal wire control signal is 35%, both are important in driving safety of the vehicle. The comparator 203 can set different weighting factors $k_{ij}$ make a difference between the longitudinal wire control signal $W_{1j}$ and the horizontal wire control signal $W_{2j}$. The to-be-validated L4 system learns and masters 1D longitudinal control (i.e., PACC function) first, and then learn and master the 2D horizontal control which is more important and complicated for driving safety. In the shadow mode, a weighting factor 3×2 matrix k can be further preferably set as:

| 0.3 | 0.35 | 0.35 |
|-----|------|------|
| 0.7 | 0.20 | 0.10 |

The to-be-validated L4 system is dimensionality-reduced to the L2 system under the L2 shadow mode, shoulders more responsibilities in 1D longitudinal control, and learns to optimize energy saving and emission reduction of the vehicle first, and shoulders fewer responsibilities in 2D horizontal control, so as to ensure the safety of a 3R test.

The key to operate the ACE HDT and optimize the driving safety and energy saving and emission reduction lies in that the driver and the fuel-saving robot not only perform their duties individually, but also cooperate with each other. In the expressway ODD, 1D longitudinal control shall treat the Level II fuel-saving robot as a teacher, the driver as an assistant and the to-be-validated L4 system as a student. 2D horizontal control shall take the driver as a teacher, the Level II fuel-saving robot as an assistant, and the to-be-validated L4 system as a student. In the L2 shadow mode, the driver must be prepared to take charge of all dynamic driving tasks (DDT) within 1 second anytime, and is in full charge of the driving safety of the vehicle all the time. In the L3 disengagement mode, the L3 system is responsible for DDT, the driver is the fallback of the DDT and must be prepared to take charge of all DDT within 15 seconds, the L3 system is in full charge of the driving safety of the vehicle before the disengagement event and the driver is in full charge of the driving safety of the vehicle after the disengagement event. In the L4 operating mode, the L4 system is provided with DDT fallback capability, realizes unmanned driving within a long time (tens of hours-level) in the OEM, and is in full charge of the driving safety of the vehicle. The driver can leave the driver's seat and go to the rear cabin of the vehicle to rest in L4 mode. The single driver and the Level IV fuel-saving robot drives the vehicle alternately to realize 24-h continuous operation day and night of the ACE4 HDT, thereby improving the labor productivity of the human driver greatly, significantly shortening the freight time of an ultra-long transportation event (single trip is over 1000 miles) and lowering the cost.

In the L3 disengagement mode, a weighting factor 3×2 matrix k can be further preferably set as:

| 0.2 | 0.20 | 0.60 |
| 0.3 | 0.20 | 0.50 |

In the L3 disengagement mode, the to-be-validated L4 system is dimensionality-reduced to the L3 system to operate. Longitudinal and horizontal movements of the vehicle are continuously controlled primarily by the L3 system and secondarily by the human driver.

In the L2 shadow mode, although the mass-produced commercialized L2 ADAS system is mainly responsible for longitudinal or horizontal continuous control of the vehicle, the driver is in full charge of the driving safety all the time, the driver wire control signal $W_{i1}$ shall be construed as an active control signal of the driver or a default control signal (i.e., the control signal $W_{i2}$ of the ADAS system, and at the moment, it can be considered that $W_{i1}$ is equivalent to $W_{i2}$), and the driver has the supreme authority and can intervene and take charge of longitudinal or horizontal continuous control of the vehicle anytime. In the L3 disengagement mode, the L3 system is responsible for DDT, and the driver is DDT fallback and must be prepared to take charge of all DDT within 15 seconds anytime. The comparator 203 compares the wire control signal $W_{i1}$ of the driver with the wire control signal $W_{i3}$ of the to-be-validated L4 system in real time. If the absolute value of the difference value between $W_{i1}$ and $W_{i3}$ is greater than the preset threshold, the comparator 203 cooperates with the VCU 201 to automatically generate an electronic record (i.e., an original script of a disengagement report) of the disengagement event with system time as a unique annotation, and uploads the electronic record subjected to desensitization and encryption to the cloud computing platform 001 timely (hour-level time delay) through the wireless gateway 210 to be stored for subsequent analysis and processing. It needs to emphasize that in the L3 disengagement mode, all DDT is completed by the L3 system in most time, and at the moment, the wire control signal of the driver can be regarded as being equivalent to the wire control signal of the L3 system, i.e., the driver defaults that the L3 system controls the vehicle in real time. Once the driver actively or passively takes charge of the DDT of the vehicle, the comparator (CSB) 203 can find immediately (millisecond-level time delay) that the absolute value of the difference value of $W_{i1}$ and $W_{i3}$ is greater than the preset threshold, generates a digital disengagement report automatically and sends out various alert signals such as sound, light and vibration. The human driver has the supreme authority and can open or close the L3 or L4 system anytime.

In the expressway ODD, the knack of the ACE2 HDT lies in that the driver is responsible for OEDR of the vehicle and is in full charge of the driving safety. Long-term 1D longitudinal control and short-term 2D horizontal control of the vehicle are delivered to the Level I fuel-saving robot, and particularly, the fuel-saving robot performs 1D longitudinal PACC control on the vehicle according to the fuel saving ML algorithm, the parameters and dynamic working condition data of the vehicle and the priori information of the 3D road of the electronic horizon, so as to realize optimization of energy saving and emission reduction of the vehicle, where the fuel saving effect and consistency thoroughly defect those of the human driver. In other words, when the ACE2 HDT is driven normally, the driver shall be feet-off for a long time (Feet-Off; the driver does not step on the accelerator or the brake pedal in hours), hands-off temporarily (Hands-Off: the driver does not hold the steering wheel in sub-minutes), but the driver shall be eyes-on (Eyes-on; the driver is observant and alert with eyes and ears wide open) and is less able to be brain-off. The driver intervenes accelerator or brake temporarily only at emergency moment involving safety. With respect to 2D horizontal control such as temporarily lane changing or vehicle pass-over, the driver shall be dominant and the L2 ADAS system is assistant. With respect to the Level I-IV fuel-saving robots of the ACE HDT operating in the expressway ODD, the AI driver is mainly responsible for 1D longitudinal control, so as to realize optimization of energy saving and emission reduction, and the fuel saving effect and consistency can far surpass those of the human driver. The Level I-IV fuel-saving robots have no difference in energy saving and emission reduction function, performance and actual effect and all can reach the same ceiling (i.e., the limit of fuel consumption) and are substantially irrelevant to 2D horizontal control level. However, in autonomous driving safety, 1D longitudinal control is equivalent to 2D horizontal control in significance. The advanced fuel-saving robots have higher requirements on function, performance, safety redundancy and the like than lower level fuel-saving robots and are compatible downwards with all functions and performance. The L4 system to be validated can easily learn and master the 1D longitudinal control PACC function of the L2 system with the mass-produced commercialized Level II fuel-saving robot, rapidly learns well and finishes its apprenticeship, and gradually replaces the L2 system. With respect to 2D horizontal control, the L4 system cannot reach ceilings of functions and performance (particularly driving safety and reliability) of the L4 system by fully using experience of the Level II fuel-saving robot for reference, and can statistically verify that the L3 system is not unsafe through billion mile-level 3R batch validations in the time-consuming and costly L3 disengagement mode. It is further needed to accumulate 3R operating data of the ten billion mile-level L3 system to verify with degree of confidence that the L3 AI driver is safer and more reliable than the human driver. To accumulate the ten billion mile-level 3R operating data, a cluster of about 50 thousand ACE4 HDTs need to be approved by government to commercially operate in the disengagement mode of the L3 system countrywide (the trucks are equipped with safety drivers), and the annual accumulated mileage of each ACE4 HDT is 100 thousand miles to finish within two years. Then, government, public and other road traffic safety related panics may agree to modify related laws and regulations under the precondition of guaranteeing the traffic safety of current road users according to sufficient statistic data, and open the L4 autonomous driving commercialized operation. The commercialization of ACE4 HDT can be compared with issuing a doctorate to each of batch validated Level IV fuel-saving robot by the government, allowing it to pair with a human driver to start commercial operation in HDT long-haul freight. The Level IV fuel-saving robot of the ACE HDT of the present invention can finish 3R batch validations (disengagement mode) of the billion mile-level L3 system initiatively with higher cost performance and within shorter time compared with those of integration of the prior art in the world in the expressway ODD, thereby statistically verifying that the L3 disengagement mode commercialized operation is not unsafe; then obtains public understanding and special law and regulation exemption of the government to completer batched commercialized operation of the ten billion mile-level L3 system, and incidentally finishes ten billion mile-level batch validations of the to-be-validated L4 system in the L3 disengagement mode with lower marginal cost, thereby statistically verifying with high degree of confidence that commercialized operation of the AI driver in the L3 disengagement mode is safer than that of the L2 ADAS system led by the human driver; and promotes the government to modify the current whole set of laws and regulations that supervise the countrywide operation range of the HDTs for long-haul freight, so that the industry of the HDTs for long-haul freight can enter an era of volume commercialization of the L4 autonomous driving system timely.

Drivers, companies or representatives of scientific and technical corporations and the like can command the comparator (CSB) 203 to dynamically adjust six parameters of the 2×3 weighting factor matrix k through software specification or remote iterative update (OTA), so as to meet the wire control signal equation (5-1) and related boundary conditions or limiting conditions in real time; the Level IV fuel saving toot of the ACE HDT is dimensionality-reduced to stably operate in one of the L2 shadow model or the L3 disengagement mode or switches smoothly therebetween, and gains government approval and public understanding under the precondition of guaranteeing that there are no adverse effects to the traffic safety of current expressways, 3R batch validations and commercialized operation of the L3 system are conducted gradually and prudently to finally enter volume commercialization of the L4 system, thereby achieving beneficial effects of optimizing energy saving and emission reduction of the ACE HDT, improving the driving active safety and reducing the traffic accidents. The above-mentioned set of many technical measures focusing on the driving active safety of the ACE HDT is defined as intelligent compare & switch (iCS) technology. It is apparent that the PACC technology focusing on optimization of energy saving and emission reduction of the ACE HDT is the economic foundation, and the iCS technology is the superstructure.

The Level I-IV fuel-saving robots of the HDT of the present disclosure will not replace the human driver and are always a loyal and reliable assistant or copilot of the human driver. The operational design domain (ODD) is the closed expressway. The Level I fuel-saving robot can dynamically predict the road load power time-varying function of the vehicle by integrating the priori 3D road data of the electronic horizon, the real-time positioning and orientation dynamic data of the vehicle, the vehicle configurations or driver set information such as constant parameters and dynamic operating data according to the longitudinal power equation (1-1) of the vehicle; and performs iSS or iPS or iMs on the vehicle, namely, meets the requirement on road load instantaneous power of the vehicle according to the ML algorithm of the fuel-saving robot, and further performs PSC on the battery packs (the battery packs stably work in one of the CS mode or the CD mode or the CI mode or switches dynamically thereamong), so as to realize the PACC function (i.e., 1D longitudinal L1 ADAS function) of the ACE HDT, thereby achieving multiple beneficial effects of optimizing energy saving and emission reduction of the vehicle, improving the power performance of the vehicle, alleviating the long distance driving labor intensity of the HDT driver, improving the active driving performance of the vehicle and the like. Different from a condition that the current L1 technology ACC used by the conventional HDT with the internal combustion engine focuses on driving convenience in the expressway ODD, the technical measure of the L1 PACC used by the Level I fuel-saving robot in the present invention first focuses on optimization of energy saving and emission reduction of the vehicle, converts the energy and emission management optimization problem of the ACE heady duty truck into an equivalent narrow AI problem; playing the game of go by a computer, and realizes the beneficial technical benefit that the actual comprehensive fuel consumption of the ACE HDT is reduced by 30% compared with that of the conventional diesel HDT and is substantially decoupled with the skill of the driver in long-haul freight. Then, it provides driving convenience and frees up the driver's feet.

In addition, all advanced fuel-saving robots (i.e., Level II/III/IV fuel-saving robots), particularly the Level IV fuel-saving robot, have the 1D longitudinal L1 autonomous driving foundational core function of PACC in the expressway ODD, and further has the 2D horizontal control function by taking the function as the "economic foundation" to establish the "superstructure" of the L4 autonomous driving function. The IV fuel-saving robot configured for the ACE4 HDT first operates in the L2 "shadow mode" to generate a digital discrepancy report automatically, and then conducts operation in the L3 "disengagement mode" to generate a digital disengagement report automatically. The high variable cost for "three-real" (Real Vehicle/Real Road/Real Load) batch validations of the ACE4 HDT is turned into the low marginal cost for daily operation of the ACE1 HDT, and 3R batch validations on L4 DDT safety and reliability executed by the ten billion mile-level Level IV fuel-saving robot can be finished with the actual comprehensive verification cost that is over 80% lower than that of the conventional L4 HDT with the internal combustion engine, thereby effectively solving the global technical hard problem of how to finish ten billion mile-level 3R batch validations of the L4 system having high degree of statistical confidence by means of a technical solution that is economically and technically highly feasible in the expressway ODD under the precondition of guaranteeing the traffic safety of the current road users, and opening up a shortcut for the ACE4 HDT that is approved by the government and recognized by the public early worldwide and enters volume commercialization of the L4 system of the HDTs for long-haul freight.

Although the language specific to structural features and/or method logical actions has been used to describe the topic, it should understand that the restricted topic in the claims may not be restricted to the above specific characteristics or actions described. On the contrary, the above specific characteristics and actions described are only example forms of achieving the claims.

The invention claimed is:

1. An electrical power split device (ePSD) for Automated-Connected-Electrified (ACE) Heavy-Duty Trucks (HDTs) comprising:
   a first port, adapted to be AC connected with a generator set of the ACE HDT bidirectionally and electrically;
   a second port, adapted to be AC connected with at least one driving motor of the ACE HDT bidirectionally and electrically;
   a third port, adapted to be DC connected with at least one power battery pack of the ACE HDT bidirectionally and electrically;
   a fourth port, adapted to be DC connected with a brake resistor of the ACE HDT unidirectionally and electrically;
   a DC junction, adapted for collecting and distributing direct current from the first port, the second port and the third port;

an AC-DC converter, connected between the first port and the DC junction;

a DC-AC converter, connected between the DC junction and the second port;

a DC-DC converter, connected between the DC junction and the third port; and a voltage-controlled switch, connected between the DC junction and the fourth port and configured to: be in an ON state or OFF state based on a voltage of the DC junction.

2. The ePSD of claim 1, wherein the voltage-controlled switch is configured to:

be switched from the OFF state to the ON state in response to the voltage of the DC junction being greater than a first threshold; and be switched from the ON state to the OFF state in response to the voltage of the DC junction being less than a second threshold which is less than the first threshold.

3. The ePSD of claim 1, wherein the DC-DC converter comprises a first converter and a second converter which are adapted for DC connection with a first power battery pack and a second power battery pack of the ACE HDT bidirectionally and electrically, via the third port, respectively.

4. The ePSD of claim 3, wherein the first converter and the second converter are adapted for cyclic charge-discharge operation between the first power battery pack and the second power battery pack, and the charge-discharge operation comprises the following steps:

in a first period of a charge-discharge cycle, charging the second power battery pack with a first current by using electric energy from the first power battery pack; and in a second period of a charge-discharge cycle, charging the first power battery pack with a second current by using electric energy from the second power battery pack;

wherein the first period is shorter than the second period, and an amplitude of the first current is greater than that of the second current.

5. An Automated-Connected-Electrified (ACE) HDT, comprising:

the generator set, comprising an engine and a generator connected bidirectionally and mechanically;

the electrical power split device (ePSD) of claim 1, wherein the first port of the ePSD is AC-connected with the generator set bidirectionally and electrically;

the at least one power battery pack, DC connected with the third port of the ePSD bidirectionally and electrically;

an automatic transmission, with an output shaft connected with a primary driving axle of the ACE HDT bidirectionally and mechanically;

the at least one driving motor, connected with the second port of the ePSD bidirectionally and electrically, wherein an output shaft of a primary driving motor in the at least one driving motor is connected with an input shaft of the automatic transmission bidirectionally and mechanically;

a controllable clutch, arranged on a direct mechanical connection between the generator set and the primary driving motor and operable to couple or decouple the direct mechanical connection; and a vehicle control unit (VCU), configured to perform dynamic real-time control on at least one of the generator set, the ePSD, the automatic transmission, the at least one power battery pack, the at least one driving motor and the controllable clutch.

6. An Automated-Connected-Electrified (ACE) Heavy Duty Truck (HDT), comprising:

a generator set, comprising an engine and a generator connected bidirectionally and mechanically;

an electrical power split device (ePSD), configured as a power electronic network with three ports, wherein the first port of the ePSD is AC-connected with the generator set bidirectionally and electrically;

at least one power battery pack, DC connected with the third port of the ePSD bidirectionally and electrically;

an automatic transmission, with an output shaft connected with a primary driving axle of the ACE HDT bidirectionally and mechanically;

at least one driving motor, connected with the second port of the ePSD bidirectionally and electrically, wherein an output shaft of a primary driving motor in the at least one driving motor is connected with an input shaft of the automatic transmission bidirectionally and mechanically;

a controllable clutch, arranged on a direct mechanical connection between the generator set and the primary driving motor and operable to couple or decouple the direct mechanical connection;

a first controller vehicle control unit (VCU), configured to generate a first control signal based on environmental information of the ACE HDT;

a second controller AI unit (AIU), configured to generate a second control signal based on the environmental information and historical operation information of the ACE HDT, as well as on historical operation information on other vehicles received from an external device; and a comparator, configured to generate a composite control signal based on a weighted sum of the first control signal, the second control signal and a manual control signal, wherein the composite control signal is used to control at least one of the generator set, the ePSD, the automatic transmission, the at least one power battery pack, the at least one driving motor and the controllable clutch dynamically in real time, wherein the manual control signal is generated based on a manual operation of a human driver on the ACE HDT.

7. The ACE HDT of claim 6, wherein the environmental information comprises at least one of the following items automatically annotated and combined by a unique time sequence based on a precise time service of a Global Navigation Satellite System (GNSS) of the ACE HDT:

a unique dynamic DC voltage and a plurality of dynamic DC currents at the DC bus junction from the electrical power split device (ePSD);

real-time longitude, real-time latitude and real-time road longitudinal slope from the GNSS;

longitude, latitude and road longitudinal slope from a map unit of the ACE HDT; and dynamic configuration parameters and dynamic operating data from the generator set, the at least one power battery pack, the automatic transmission and the at least one driving motor.

8. The ACE HDT of claim 6, wherein the comparator is further configured to:

detect a discrepancy event which indicates that an absolute value of a difference between the second control signal and the manual control signal is greater than a threshold; and generate discrepancy event information in response to the discrepancy event being detected, wherein the discrepancy event information comprises information on the environmental information, the manual control signal and the second control signal in a predetermined time period before and after occurrence of the discrepancy event.

9. The ACE HDT of claim 8, wherein the AIU updates at least one of the historical operation information of the ACE HOT and the historical operation information on other vehicles based on the discrepancy event information received from the comparator.

10. The ACE HDT of claim 8, wherein the VCU sends the discrepancy event information received from the comparator to the external device.

* * * * *